US012697197B2

(12) United States Patent
Shutta et al.

(10) Patent No.: US 12,697,197 B2
(45) Date of Patent: Aug. 4, 2026

(54) ELECTRIC TOOTHBRUSH

(71) Applicant: Panasonic Intellectual Property Management Co., Ltd., Osaka (JP)

(72) Inventors: Yusaku Shutta, Kyoto (JP); Wei Wang, Shiga (JP); Yoshinori Masuko, Shiga (JP); Harumi Fukuki, Shiga (JP); Hitoshi Ogawa, Shiga (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 347 days.

(21) Appl. No.: 18/553,702

(22) PCT Filed: Mar. 29, 2022

(86) PCT No.: PCT/JP2022/015305
§ 371 (c)(1),
(2) Date: Oct. 2, 2023

(87) PCT Pub. No.: WO2022/215588
PCT Pub. Date: Oct. 13, 2022

(65) Prior Publication Data
US 2024/0197454 A1 Jun. 20, 2024

(30) Foreign Application Priority Data
Apr. 8, 2021 (JP) ................................. 2021-065960

(51) Int. Cl.
*A61C 17/34* (2006.01)
*A61C 17/22* (2006.01)
(Continued)

(52) U.S. Cl.
CPC ........ *A61C 17/3481* (2013.01); *A61C 17/222* (2013.01); *A61C 17/225* (2013.01); *B26B 19/48* (2013.01); *B26B 19/148* (2013.01)

(58) Field of Classification Search
CPC .. A61C 17/3481; A61C 17/222; A61C 17/225
See application file for complete search history.

(56) References Cited

U.S. PATENT DOCUMENTS 6,230,717 B1 5/2001 Marx et al.
2011/0041268 A1 2/2011 Iwahori et al.
(Continued)

FOREIGN PATENT DOCUMENTS

CN 101965160 A 2/2011
CN 204698736 U 10/2015
(Continued)

OTHER PUBLICATIONS

International Search Report issued on Apr. 26, 2022 in International Patent Application No. PCT/JP2022/015305, with English translation.
(Continued)

*Primary Examiner* — Shay Karls
(74) *Attorney, Agent, or Firm* — Rimon P.C.

(57) ABSTRACT

The present disclosure provides an electric toothbrush capable of more reliably suppressing transmission of vibration generated during use to the hand. Electric toothbrush according to the present disclosure includes body having drive shaft driven by rotary motor. In addition, electric toothbrush further includes head detachably attached to body, head including power transmission mechanism capable of transmitting power of rotary motor, and acting member operated by the power transmitted from power transmission mechanism. Further, electric toothbrush includes brush handle having bristle and detachably attached to head. Then, power transmission mechanism includes power transmission unit attachable to drive shaft in a state where idling is suppressed.

11 Claims, 46 Drawing Sheets

(51) Int. Cl.
B26B 19/48 (2006.01)
B26B 19/14 (2006.01)

(56) References Cited

U.S. PATENT DOCUMENTS

| | | | | |
|---|---|---|---|---|
| 2011/0239388 A1 * | 10/2011 | Lee | .................... | A46B 11/0003 |
| | | | | 15/104.94 |
| 2012/0216635 A1 | 8/2012 | Headstrom | | |
| 2012/0233789 A1 | 9/2012 | Kitagawa et al. | | |
| 2021/0030145 A1 | 2/2021 | Lee et al. | | |

FOREIGN PATENT DOCUMENTS

| | | | |
|---|---|---|---|
| CN | 105411165 | A | 3/2016 |
| JP | 2011-130971 | A | 7/2011 |
| JP | 2011-143057 | A | 7/2011 |
| JP | 2013-510623 | A | 3/2013 |
| JP | 5547468 | B2 | 7/2014 |
| WO | 2011/058465 | A1 | 5/2011 |
| WO | 2019/208846 | A1 | 10/2019 |

OTHER PUBLICATIONS

English Translation of Chinese Search Report dated Mar. 20, 2026 for the related Chinese Patent Application No. 202280026940.0.

* cited by examiner

FIG. 34
FIG. 35
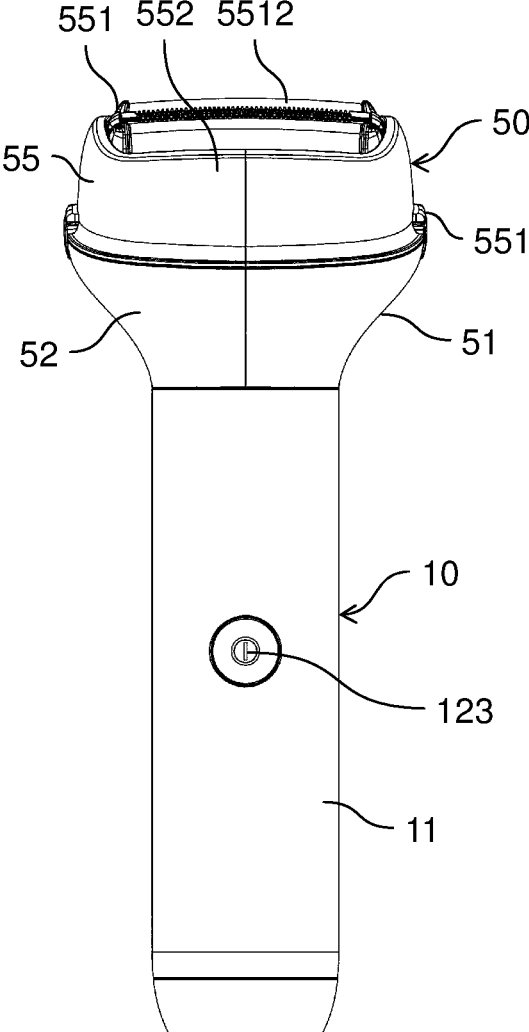
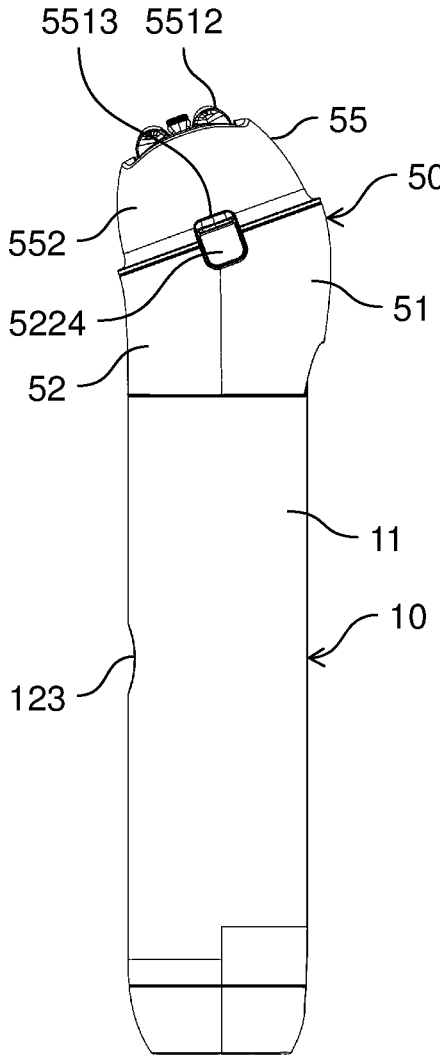

63

62(61)

60

6222

6221

6222

641(64)   6222

11

123

10

14a

841(84)

811(81)

83

80

8121
8111
8121

8121   861(86)

11

123

10

14a

FIG. 60
FIG. 61
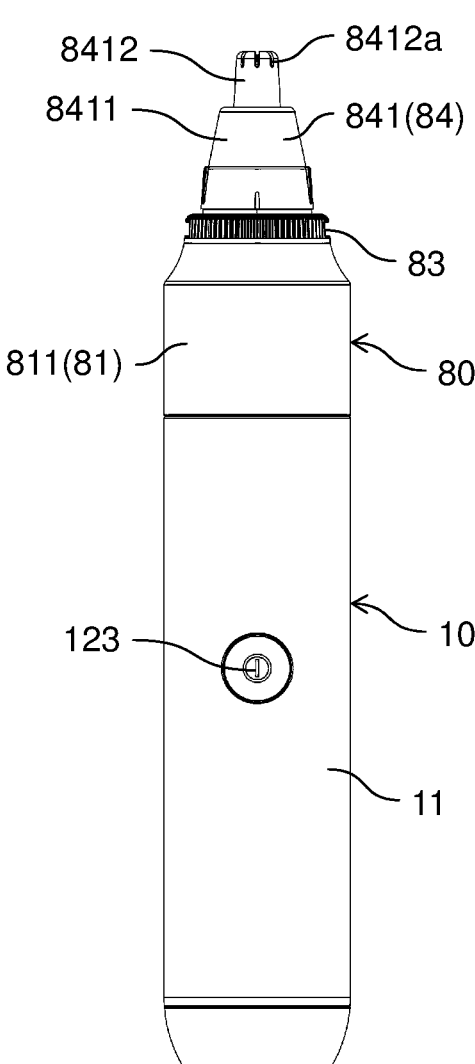
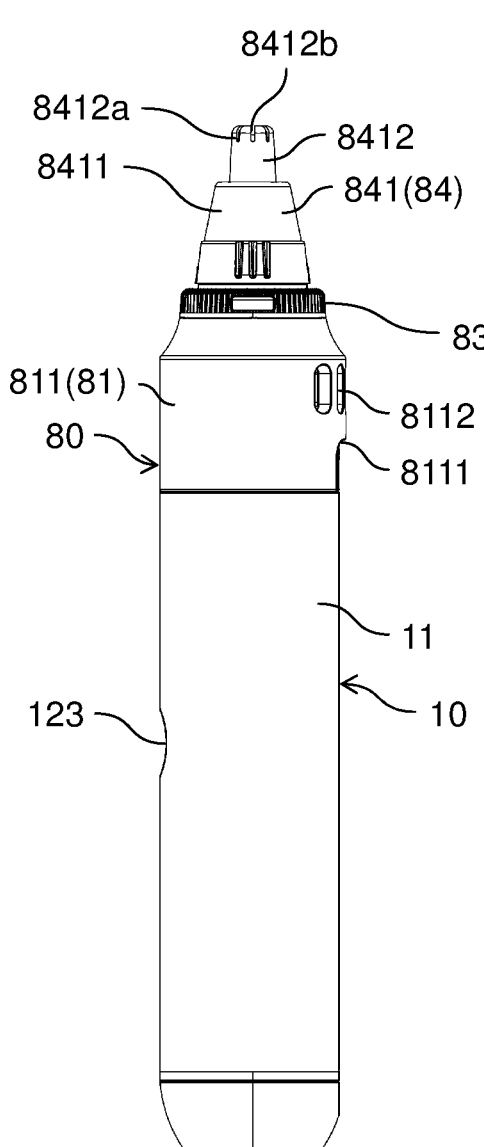

ELECTRIC TOOTHBRUSH

CROSS-REFERENCE OF RELATED APPLICATIONS

This application is the U.S. National Phase under 35 U.S.C. § 371 of International Patent Application No. PCT/JP2022/015305, filed on Mar. 29, 2022, which in turn claims the benefit of Japanese Patent Application No. 2021-065960, filed on Apr. 8, 2021, the entire disclosures of which Applications are incorporated by reference herein.

TECHNICAL FIELD

The present disclosure relates to an electric toothbrush.

BACKGROUND ART

PTL 1 discloses an electric toothbrush including a body that is capable of being held by hand, and a brush handle provided with bristles and detachably attached to the body.

In PTL 1, a rotary motor and an eccentric weight attached to a motor shaft of the rotary motor are incorporated in the body. By driving the rotary motor to rotate the eccentric weight, vibration is generated in the body, and the vibration generated by the eccentric weight is transmitted from the body to the bristles of the brush handle. In such a manner, dirt in the oral cavity can be cleaned (that is, brushing can be performed). As a result, vibration of the bristles inserted into the oral cavity.

CITATION LIST

Patent Literature

PTL 1: Japanese Patent No. 5547468

SUMMARY OF THE INVENTION

Technical Problem

When such an electric toothbrush is used, it is preferable to suppress transmission of vibration generated during use to the hand.

An object of the present disclosure is to provide an electric toothbrush capable of more reliably suppressing transmission of vibration generated during use to the hand.

Solution to Problem

An electric toothbrush according to one aspect of the present disclosure includes a body having a drive shaft driven by a rotary motor. In addition, the electric toothbrush includes a head detachably attached to the body, the head including a power transmission mechanism capable of transmitting power of the rotary motor, and an acting member operated by the power transmitted from the power transmission mechanism. The electric toothbrush further includes a brush handle having bristles and detachably attached to the head. The power transmission mechanism includes a power transmission unit that is attachable to the drive shaft in a state where idling is suppressed.

Advantageous Effect of Invention

According to the present disclosure, it is possible to provide an electric toothbrush capable of more reliably suppressing transmission of vibration generated during use to the hand.

BRIEF DESCRIPTION OF THE DRAWINGS

FIG. 21 is a side sectional view schematically illustrating an example of the brush handle.

FIG. 22 is a side sectional view schematically illustrating an example of the head.

FIG. 34 is a front view schematically showing a state where an example of the shaver head has been attached to the body.

FIG. 35 is a side view schematically showing a state where an example of the shaver head has been attached to the body.

FIG. 60 is a front view schematically showing a state where an example of the nose/ear hair trimmer head has been attached to the body.

FIG. 61 is a side view schematically showing a state where an example of the nose/ear hair trimmer head has been attached to the body.

DESCRIPTION OF EMBODIMENT

Hereinafter, exemplary embodiments will be described in detail with reference to the drawings. However, descriptions more in detail than necessary may be omitted. For example, detailed descriptions of already well-known matters and redundant descriptions of substantially the same configurations are sometimes omitted.

Note that, the accompanying drawings and the following description are merely presented to help those skilled in the art fully understand the present disclosure, and are not intended to limit the subject matters described in the scope of claims.

In addition, in the following description, a longitudinal direction of the body is defined as an up-down direction, a side of the body on which the power switch is provided is defined as a front side in a front-rear direction, and a direction orthogonal to the up-down direction and the front-rear direction is defined as a width direction. In addition, a side of the body on which the head is arranged is defined as an upper side in the up-down direction.

Example of Electric Toothbrush

Figure 1:
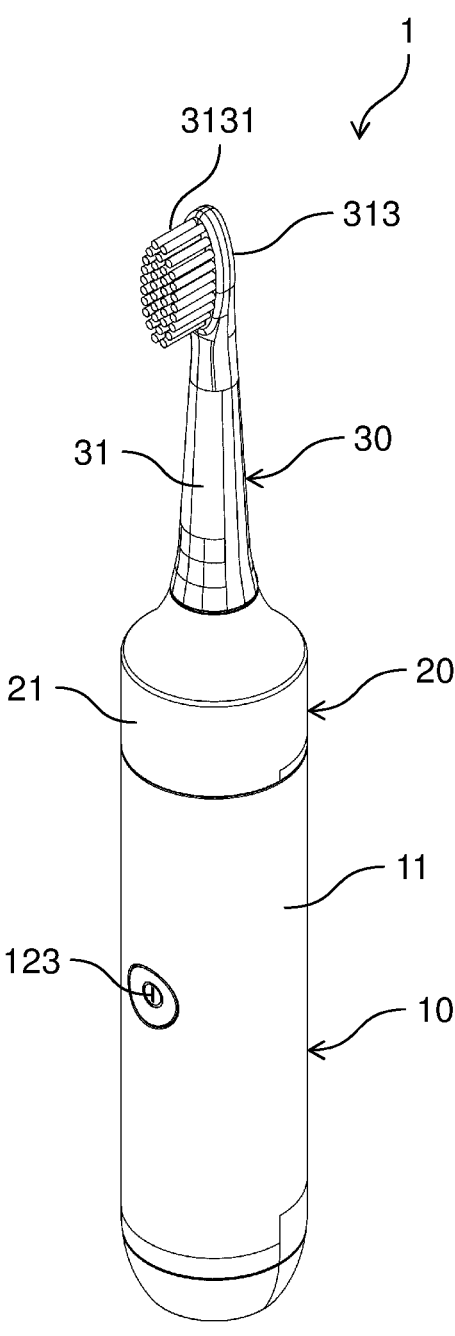
FIG. 1 is a perspective view schematically illustrating a state where an example of an electric toothbrush is viewed from one direction.
Figure 2:
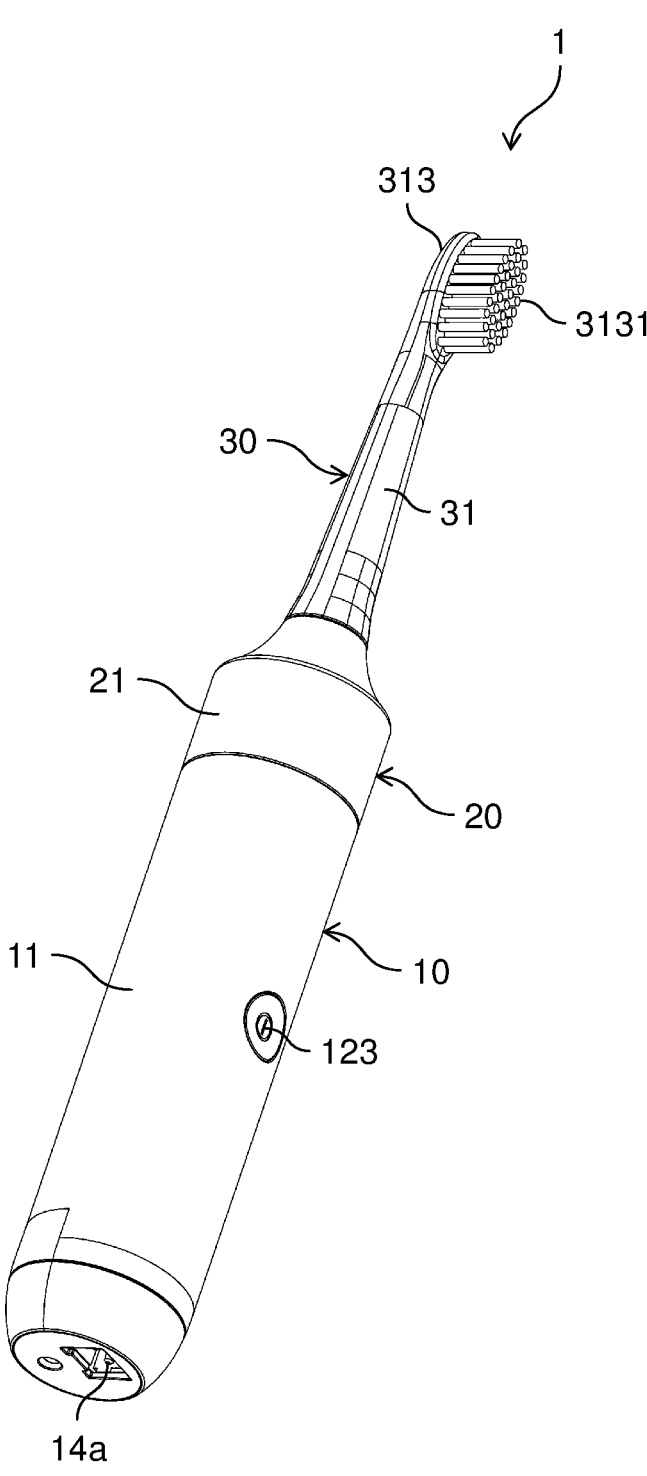
FIG. 2 is a perspective view schematically illustrating a state where an example of the electric toothbrush is viewed from another direction.
Figure 3:
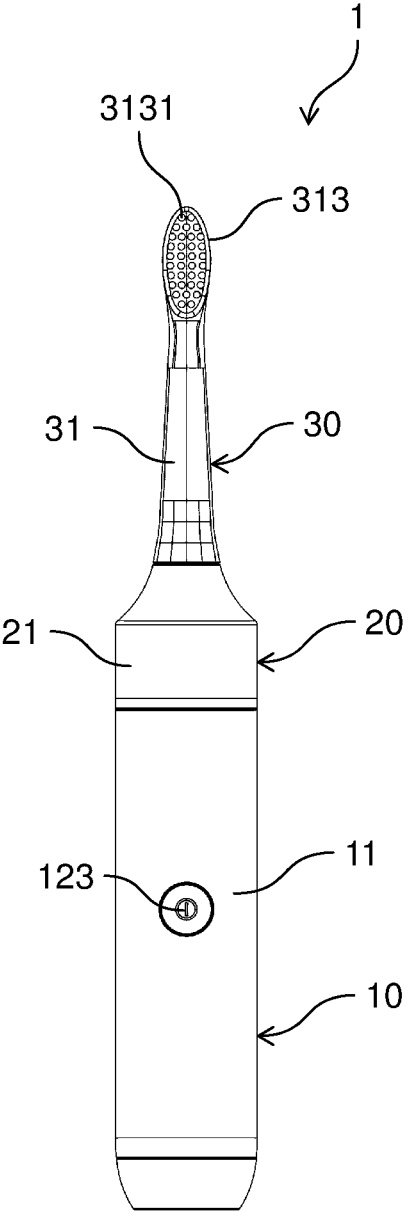
FIG. 3 is a front view schematically illustrating an example of the electric toothbrush.
Figure 4:
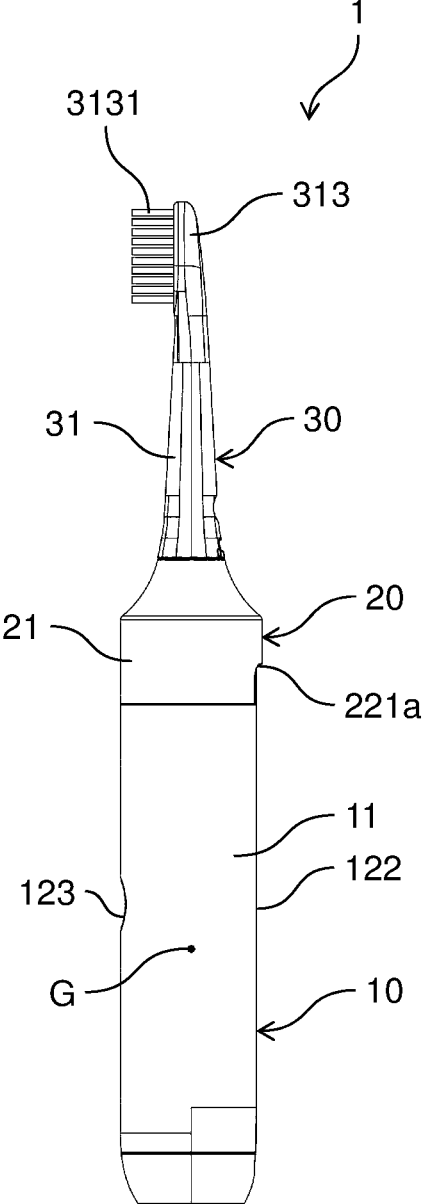
FIG. 4 is a side view schematically illustrating an example of the electric toothbrush.
Figure 5:
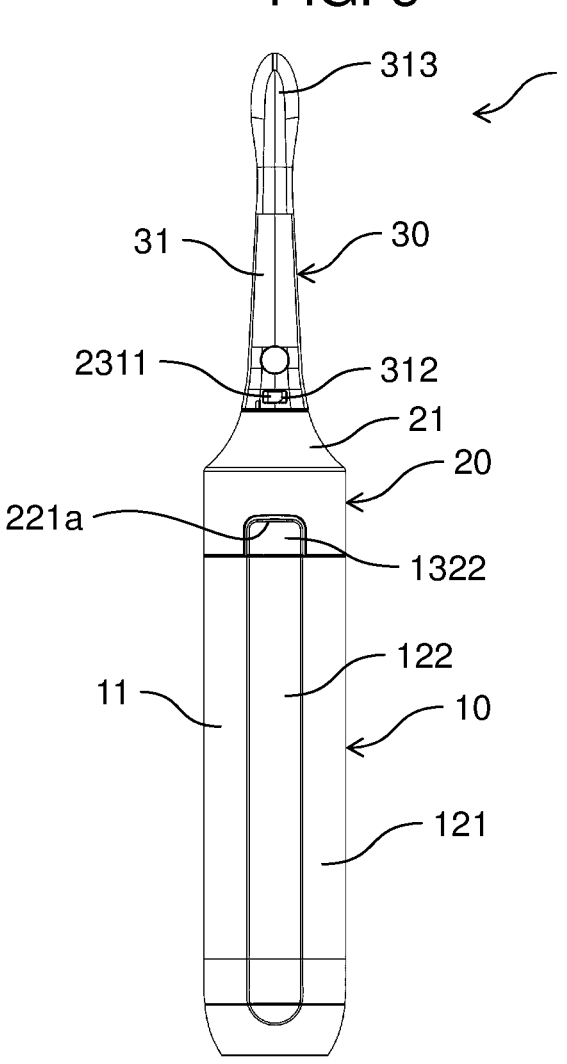
FIG. 5 is a rear view schematically illustrating an example of the electric toothbrush.
Figure 6:
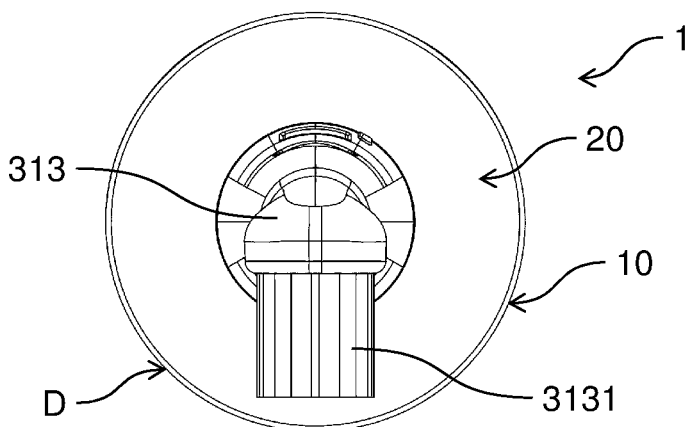
FIG. 6 is a plan view schematically illustrating an example of the electric toothbrush.
Figure 7:
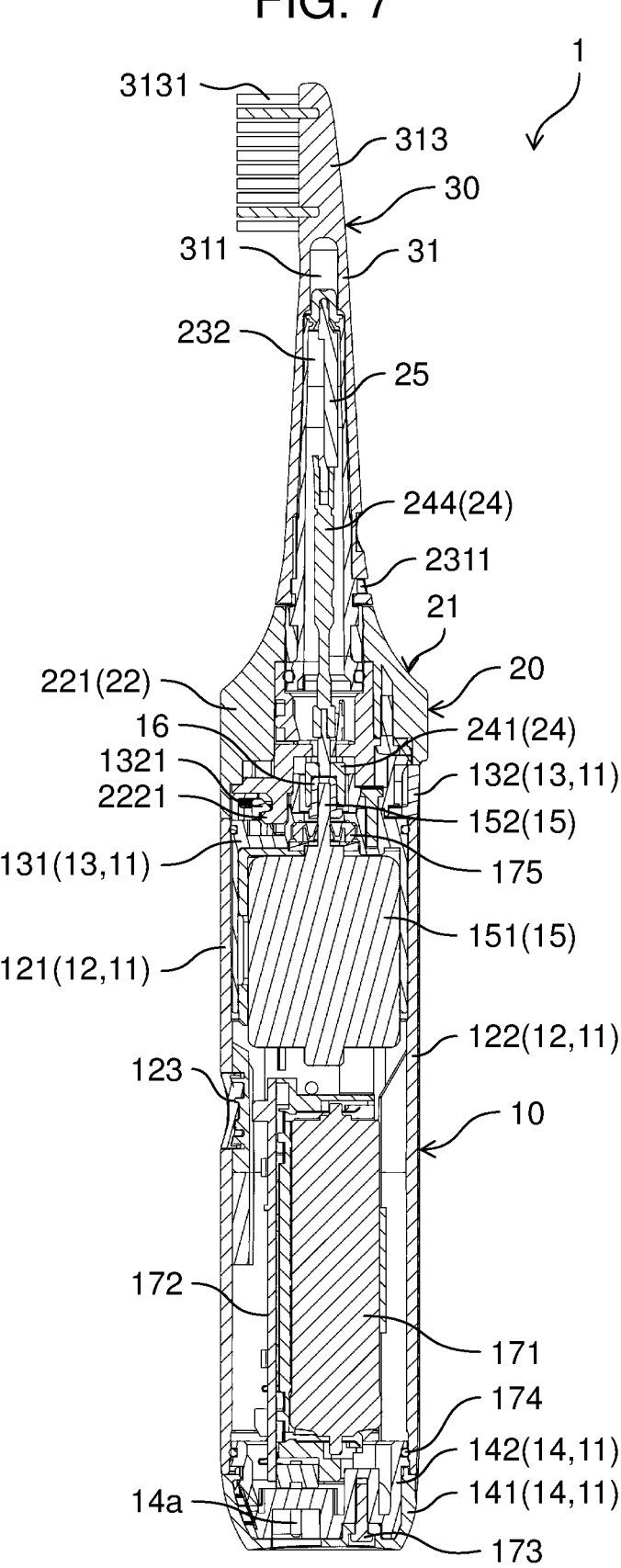
FIG. 7 is a side sectional view schematically illustrating an example of the electric toothbrush.
Figure 8:
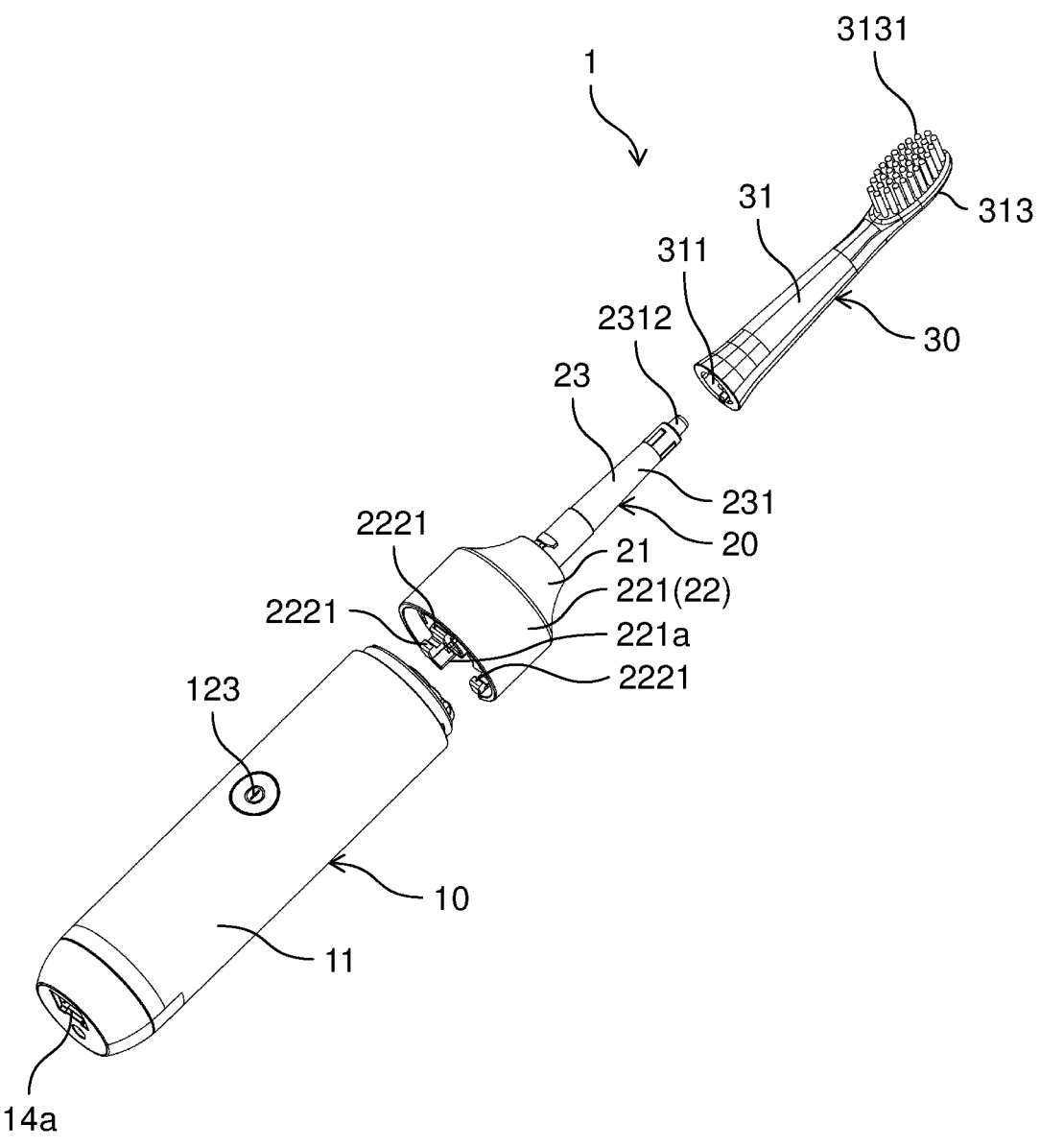
FIG. 8 is a perspective view schematically illustrating a state where an example of the electric toothbrush is disassembled into three parts of a body, a head, and a brush handle.
Figure 9:
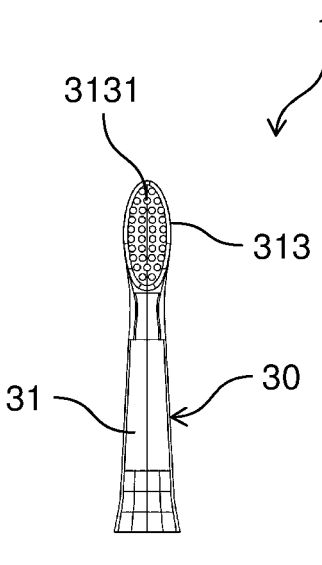
FIG. 9 is a front view schematically illustrating a state where an example of the electric toothbrush is disassembled into three parts of the body, the head, and the brush handle.
Figure 9:
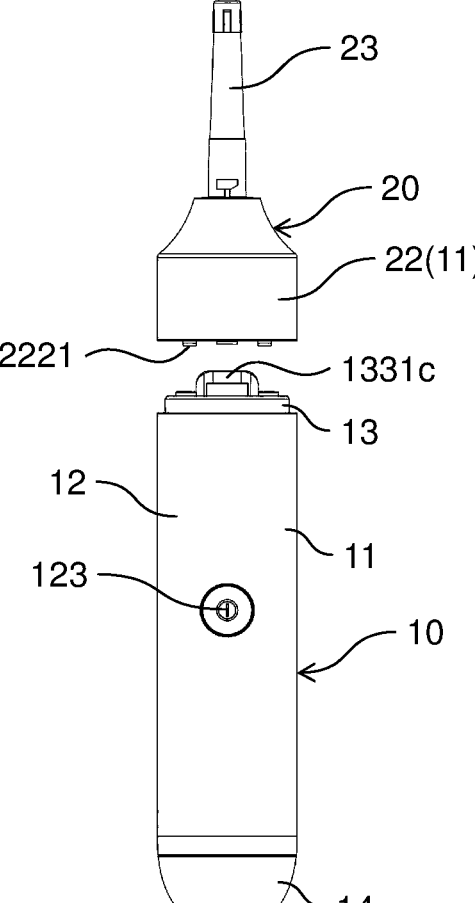

As illustrated in FIGS. 1 to 9 (particularly FIG. 7), electric toothbrush 1 according to the present exemplary embodiment includes body 10 having drive shaft 16 driven by rotary motor 15. Here, FIG. 1 is a perspective view schematically illustrating a state where an example of electric toothbrush 1 is viewed from one direction. FIG. 2 is a perspective view schematically illustrating a state where an example of electric toothbrush 1 is viewed from another direction. FIG. 3 is a front view schematically illustrating an example of electric toothbrush 1. FIG. 4 is a side view schematically illustrating an example of electric toothbrush 1. FIG. 5 is a rear view schematically illustrating an example of electric toothbrush 1. FIG. 6 is a plan view schematically illustrating an example of electric toothbrush 1. FIG. 7 is a side sectional view schematically illustrating an example of electric toothbrush 1. FIG. 8 is a perspective view schematically illustrating a state where an example of electric toothbrush 1 is disassembled into three parts of body 10, head 20, and brush handle 30. FIG. 9 is a front view schematically illustrating a state where an example of electric toothbrush 1 is disassembled into three parts of body 10, head 20, and brush handle 30.

As illustrated in FIG. 7, electric toothbrush 1 includes head 20 detachably attached to body 10, head 20 including power transmission mechanism 24 capable of transmitting power of rotary motor 15, and eccentric weight 25 (that is, one example of acting member) operated by the power transmitted from power transmission mechanism 24.

As illustrated in FIGS. 1 to 6, electric toothbrush 1 further includes brush handle 30 detachably attached to head 20, brush handle 30 having bristle 3131.

As described above, electric toothbrush 1 according to the present exemplary embodiment is capable of being divided into three parts, body 10, head 20, and brush handle 30, as illustrated in FIGS. 8 and 9.

Example of Body

Here, in the present exemplary embodiment, body 10 has an elongated columnar shape in the up-down direction, and is formed in a size that allows a user to hold with one hand. That is, it is designed to allow the user to use electric toothbrush 1 by holding body 10.

Figure 14:
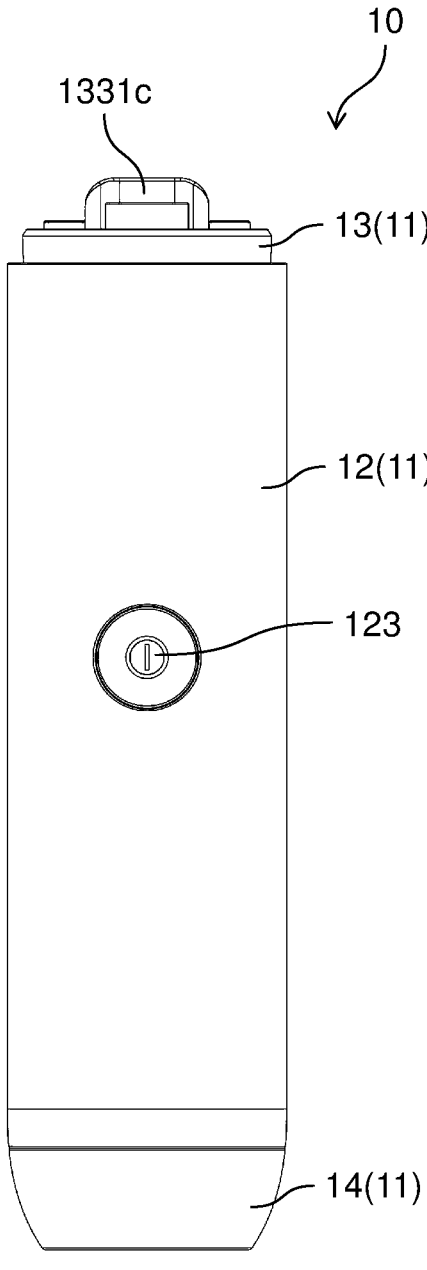
FIG. 14 is a front view schematically illustrating an example of the body.
Figure 15:
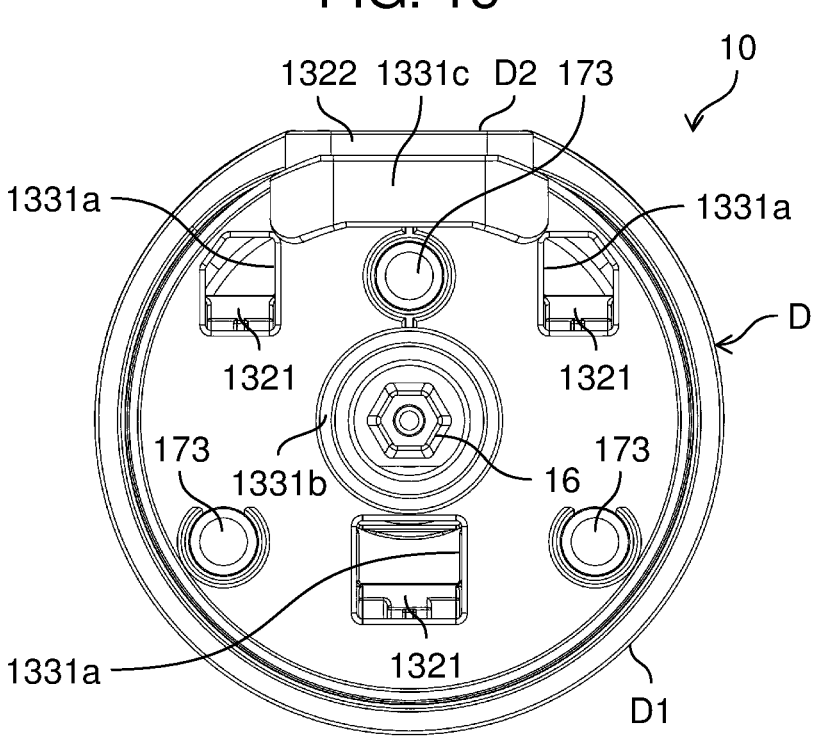
FIG. 15 is a plan view schematically illustrating an example of the body.
Figure 16:
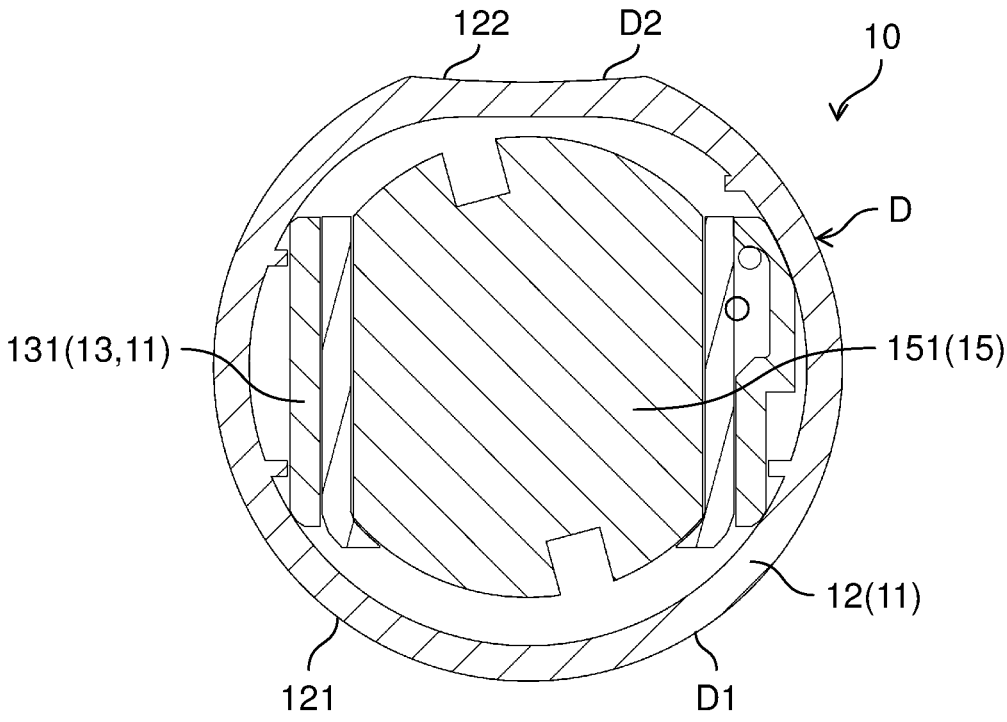
FIG. 16 is a horizontal sectional view schematically illustrating an example of the body.
Figure 17:
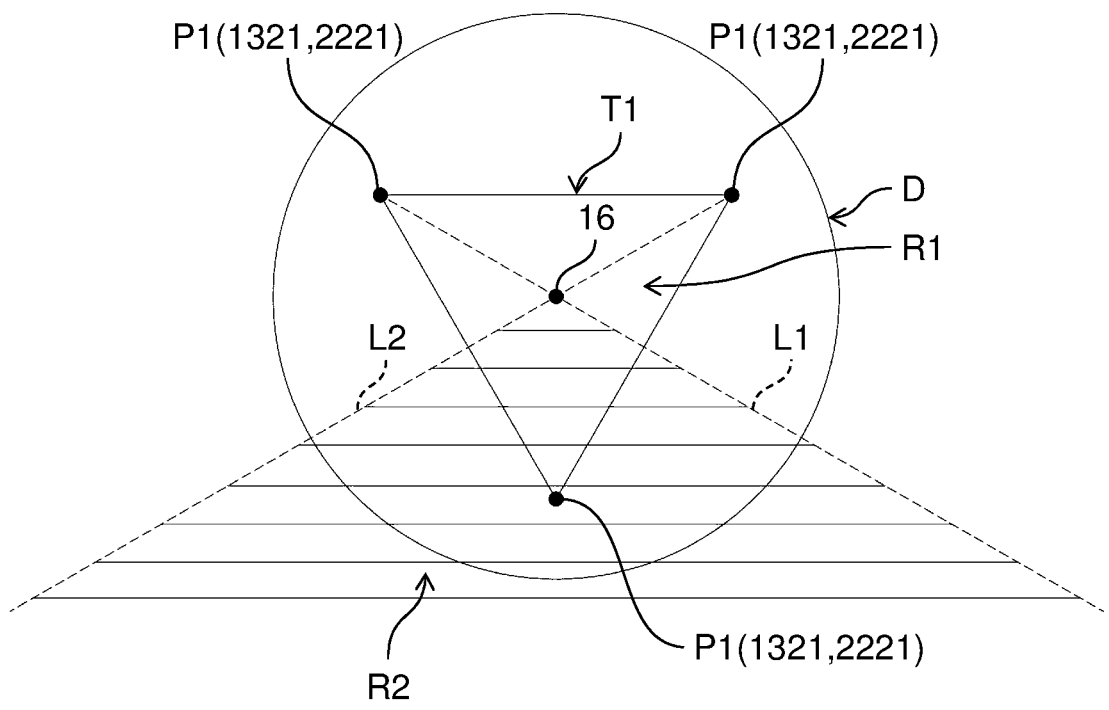
FIG. 17 is a diagram for explaining a preferable arrangement place of hooks provided in the body.
Figure 18:
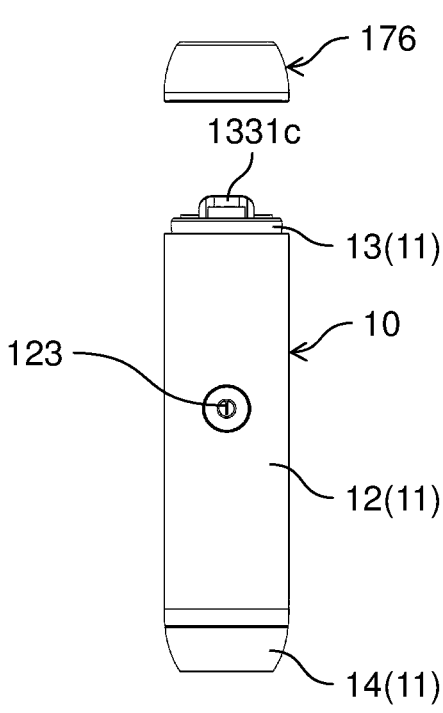
FIG. 18 is a front view schematically showing a state where a cap is to be attached to the body.
Figure 19:
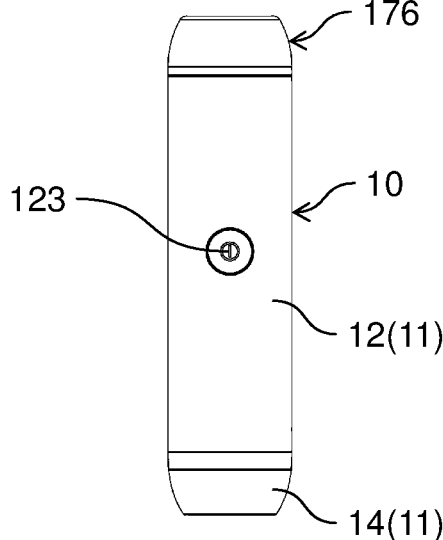
FIG. 19 is a front view schematically showing a state where the cap has been attached to the body.
Figure 20:
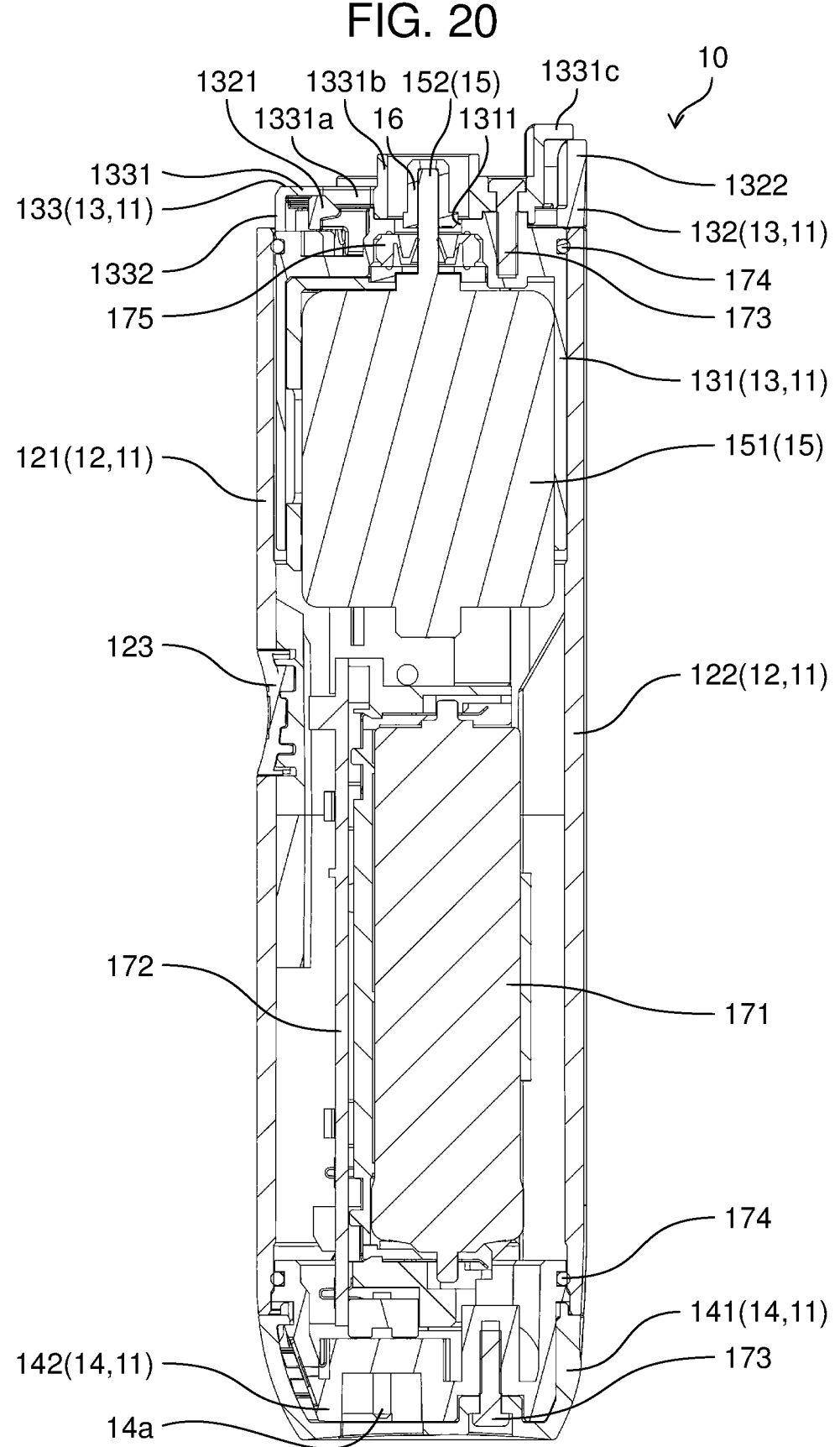
FIG. 20 is a side sectional view schematically illustrating an example of the body.

In the present exemplary embodiment, as illustrated in FIGS. 14 to 20, body 10 includes housing 11 constituting an outer shell. Housing 11 may be formed using, for example, an insulating synthetic resin material. Here, FIG. 14 is a front view schematically illustrating an example of body 10. FIG. 15 is a plan view schematically illustrating an example of body 10. FIG. 16 is a horizontal sectional view schematically illustrating an example of body 10. FIG. 17 is a diagram for explaining a preferable arrangement place of hooks 1321 provided in body 10. FIG. 18 is a front view schematically showing a state where cap 176 is to be attached to body 10. FIG. 19 is a front view schematically showing a state where cap 176 has been attached to body 10. FIG. 20 is a side sectional view schematically illustrating an example of body 10.

In addition, in the present exemplary embodiment, housing 11 is formed by joining a plurality of divided bodies, and a cavity is formed inside housing 11 formed by joining the divided bodies. Various electric components are contained in the cavity.

Specifically, as illustrated in FIG. 20, housing 11 includes cylindrical wall 12, which is substantially cylindrical and penetrating in the up-down direction, upper lid 13 arranged to cover the upper opening of cylindrical wall 12, and lower lid 14 arranged to cover the lower opening of cylindrical wall 12.

Here, in the present exemplary embodiment, a surface having a curvature different from those of the other portions is formed at the rear portion of cylindrical wall 12 in the front-rear direction to extend in an elongated manner in the up-down direction. That is, as illustrated in FIGS. 5 and 16, cylindrical wall 12 has first surface 121 curved in an arc shape and second surface 122 connected to both ends of first surface 121 with a curvature different from that of first surface 121. In the present exemplary embodiment, the curvature of second surface 122 is smaller than that of first surface 121. Specifically, the curvature of second surface 122 is substantially 0, and second surface 122 is formed to be a substantially flat surface. At this time, second surface 122 may be formed to have the same curvature at any position in the up-down direction (that is, the axial direction of drive shaft 16, which will be described later). In addition, second surface 122 may be formed such that the curvature at any position in the up-down direction (that is, the axial direction of drive shaft 16) is different from those of other portions. In the present exemplary embodiment, as illustrated in FIGS. 15 and 16, second surface 122 is formed to be a flat surface (that is, the curvature is zero) at a portion where vertical wall 1322 is formed, and to be a recessed surface slightly curved inward (that is, toward drive shaft 16) at other portions.

Further, in the present exemplary embodiment, the outer peripheral surface of cylindrical wall 12 becomes the contour shape D of body 10 in a state viewed from the up-down direction (that is, the axial direction of drive shaft 16). Therefore, in the present exemplary embodiment, as illustrated in FIGS. 15 and 16, the contour shape D of body 10 in a state viewed from the up-down direction (that is, the axial direction of drive shaft 16) has a shape including first line D1 having a predetermined curvature and an arc shape, and second line D2 having a curvature different from that of first line D1. Here, in the present exemplary embodiment, the curvature of second line D2 is smaller than that of first line D1. Specifically, the curvature of second line D2 is substantially 0, and second line D2 is formed to be a substantially straight line. As described above, in the present exemplary embodiment, second surface 122 is formed to be a flat surface at a portion where vertical wall 1322 is formed, and to be a recessed surface at other portions. Therefore, second line D2 is a straight line at a portion where vertical wall 1322 is formed, and an arc line curved inward at other portions. In such a manner, body 10 has a shape of a D-cut structure.

As described above, if body 10 has the shape of the D-cut structure, the front-rear direction of body 10 can be easily distinguished when body 10 is held, etc. Note that, if body 10 has the shape of the D-cut structure, body 10 can be prevented from rolling when electric toothbrush 1 is placed on a wash basin or the like.

In addition, in the present exemplary embodiment, as illustrated in FIG. 20, rotary motor 15, rechargeable battery 171 that supplies power to rotary motor 15, control board 172 that controls on/off of a power supply (on/off of driving of rotary motor 15), and the like are contained in a cavity formed inside housing 11.

Specifically, rotary motor 15 is contained in an upper part of housing 11, and rechargeable battery 171 is contained in a lower part of housing 11, that is, a lower part of rotary motor 15, in a state where the longitudinal direction of rechargeable battery 171 is substantially identical to the up-down direction. As described above, body 10 may be made compact in the width direction when rotary motor 15 and rechargeable battery 171 are arranged to be parallel in the up-down direction. Control board 172 is contained in front of rechargeable battery 171 in the cavity of housing 11.

Note that, rotary motor 15 includes rotary motor body 151 and rotary motor shaft 152, and is contained in a cavity of housing 11 in a state where rotary motor shaft 152 protrudes upward from rotary motor body 151. That is, rotary motor 15 is contained in the cavity of housing 11 in a state where the rotation axis direction is substantially identical to the up-down direction. Drive shaft 16 is attached to rotary motor shaft 152 protruding upward.

Note that, as rechargeable battery 171, a lithium ion rechargeable battery, a nickel metal hydride rechargeable battery, or the like may be used.

In addition, As illustrated in FIGS. 18 to 20, pressing type power switch 123 that switches on/off of the power supply (that is, on/off of driving of rotary motor 15) is formed at a substantially central portion in the up-down direction in the front portion of cylindrical wall 12 so as to face control board 172. Note that, in the present exemplary embodiment, pressing type power switch 123 is exemplified as the power switch, but other switches including a sliding type may be used as long as the switch is capable of turning on/off the power supply.

In addition, upper lid 13 is a wall arranged to cover the upper opening of cylindrical wall 12, and includes a rotary motor holding wall 131 that holds rotary motor 15. Upper lid 13 further includes movable wall 132 arranged above rotary motor holding wall 131 to be slidable in the front-rear direction, and retaining wall 133 that suppresses relative movement of movable wall 132 in the up-down direction. In the present exemplary embodiment, upper lid 13 is formed by fixing rotary motor holding wall 131 and retaining wall 133 with screw 173 in a state where movable wall 132 is sandwiched between rotary motor holding wall 131 and retaining wall 133.

Rotary motor 15 held by rotary motor holding wall 131 is inserted into cylindrical wall 12 from the upper opening of cylindrical wall 12 in a state where rotary motor holding wall 131 faces downward, so that the upper opening of cylindrical wall 12 is covered with upper lid 13. At this time, rotary motor holding wall 131 is inserted into cylindrical wall 12 in a state where a gap between the outer peripheral surface of rotary motor holding wall 131 and the inner peripheral surface of cylindrical wall 12 is sealed with packing 174.

In addition, through-hole 1311 is formed in rotary motor holding wall 131 at a position corresponding to drive shaft 16, and rotary motor 15 is held by rotary motor holding wall 131 in a state where drive shaft 16 attached to rotary motor shaft 152 is inserted into through hole 1311. At this time, rotary motor 15 is held by rotary motor holding wall 131 in a state where a gap between rotary motor shaft 152 and through-hole 1311 is sealed by waterproof rubber 175. In such a manner, entrance of water into the cavity of housing 11 when body 10 is washed with water, for example, is prevented.

Further, in the present exemplary embodiment, a plate material is not present at a position corresponding to drive shaft 16 either in movable wall 132 or retaining wall 133, and drive shaft 16 is exposed to the outside at least in a plan view of body 10 (that is, viewing body 10 from the upper side in the up-down direction). In such a manner, when head 20 is attached to body 10, power transmission unit 241 provided in head 20 is capable of being attached to drive shaft 16. Power transmission unit 241 will be described later.

Note that, as illustrated in FIG. 15, drive shaft 16 has a polygonal shape, such as a regular hexagonal shape, in a plan view of body 10 (that is, viewing body 10 from the upper side in the up-down direction), and power transmission unit 241 is capable of being attached to drive shaft 16 in a state where idling is suppressed. Drive shaft 16 and power transmission unit 241 only require to be attached in a state where idling is suppressed, and the shapes of drive shaft 16 and power transmission unit 241 are not limited to a polygonal shape. For example, it is also possible to use a drive shaft to which a D-cut structure such as body 10 described above is applied, that is, a drive shaft having a D-cut structure. In addition, idling may also be suppressed by using a means for increasing the frictional force between drive shaft 16 and power transmission unit 241.

Figure 10:
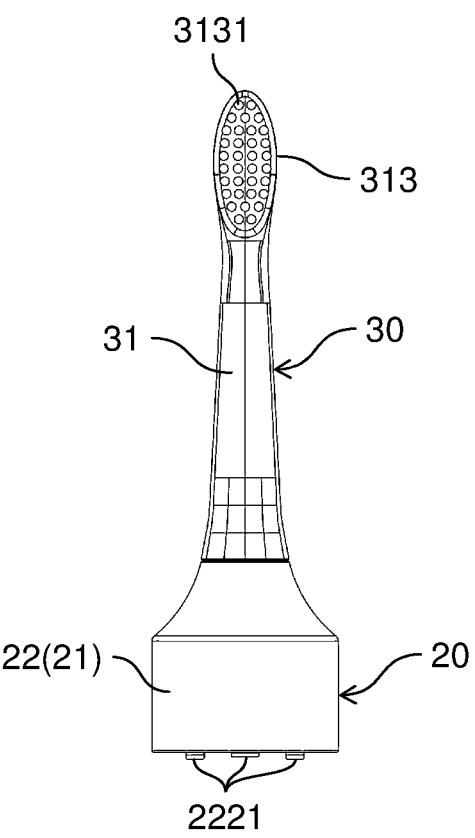
FIG. 10 is a front view schematically showing a state where the brush handle is attached to the head.

In addition, in the present exemplary embodiment, when head 20 is attached to body 10, hook 1321 (that is, one example of fitting member) fitted to hook 2221 (that is, one example of fitting member, see FIGS. 10 and 22) provided on head 20 is provided on movable wall 132 so as to protrude upward. Here, FIG. 10 is a front view schematically showing a state where brush handle 30 is attached to head 20.

In the present exemplary embodiment, as illustrated in FIGS. 15 and 20, a plurality of (three in FIG. 15) hooks 1321 are provided on movable wall 132 in a state of being separated from each other. Each of these three hooks 1321 is provided so that a portion for hooking hook 2221 protrudes rearward in the front-rear direction.

Further, at the rear end of movable wall 132, vertical wall 1322 erected so as to extend upward is provided. By pushing vertical wall 1322 forward in the front-rear direction, hook 1321 (that is, one example of movable wall 132) moves forward relative to rotary motor holding wall 131 and retaining wall 133.

By providing such hook 1321 and vertical wall 1322 on movable wall 132, vertical wall 1322 functions as a release button for releasing the fitting between hook 1321 and hook 2221.

In the present exemplary embodiment, retaining wall 133 includes top wall 1331 that covers movable wall 132 from above, and peripheral wall 1332 that extends downward from outer peripheral edge of top wall 1331. In top wall 1331, at least a part of hook 1321 is exposed in a plan view of body 10, and through-hole 1331a is formed, into which hook 2221 (see FIGS. 10 and 22) provided on head 20 is inserted when head 20 is attached to body 10. Cylindrical rib 1331b protruding upward so as to surround the entire circumference of drive shaft 16 is formed on top wall 1331. Cylindrical rib 1331b functions as guiding the connection between drive shaft 16 and power transmission unit 241 when head 20 is attached to body 10. Further, restriction wall 1331c that restricts excessive forward movement of vertical wall 1322 is formed in top wall 1331.

Note that, peripheral wall 1332 is a portion to be inserted into peripheral wall 221 (see FIG. 22) of head 20 when head 20 is attached to body 10.

In the present exemplary embodiment, body 10 and head 20 are provided with vibration receivers capable of receiving vibration in three or more directions intersecting each other on a plane orthogonal to drive shaft 16. Details of the vibration receivers will be described later. In this way, vibration can be reduced when any of the various heads vibrating in different directions is attached to body 10.

In the present exemplary embodiment, three hooks 1321 (that is, one example of fitting member) and three hooks 2221 (that is, one example of fitting member) provided in body 10 and head 20 respectively also serve as vibration receivers.

For example, by determining the arrangement state of three hooks 1321 (that is, one example of fitting member), three hooks 2221 (that is, one example of fitting member), and drive shaft 16 according to method 1 or method 2 described below, three hooks 1321 (that is, one example of fitting member) and three hooks 2221 (that is, one example of fitting member) can also serve as vibration receivers.

First, method 1 will be described.

In method 1, a place where three hooks 1321 (that is, one example of fitting member) and three hooks 2221 (that is, one example of fitting member) are arranged so as not to overlap each other in a state viewed from the up-down direction (that is, the axial direction of drive shaft 16) is set. In such a manner, as illustrated in FIG. 17, three hooks 1321 (that is, one example of fitting member) and three hooks 2221 (that is, one example of fitting member) are arranged on a plane in a state viewed from the up-down direction (that is, the axial direction of drive shaft 16) so that virtual triangle T1 having hooks 1321 (that is, one example of fitting member) and hooks 2221 (that is, one example of fitting member) as vertex P1 is formed.

Next, drive shaft 16 is arranged to be present in region R1 surrounded by three sides of virtual triangle T1.

In such a manner, three hooks 1321 (that is, one example of fitting member) and three hooks 2221 (that is, one example of fitting member) are arranged so that virtual triangle T1 in which drive shaft 16 is arranged is formed in region R1 when viewed from the up-down direction (the axial direction of drive shaft 16). That is, three hooks 1321 (that is, one example of fitting member) and three hooks 2221 (that is, one example of fitting member) are arranged on vertex P1 of virtual triangle T1 in which drive shaft 16 is arranged in region R1.

Next, method 2 will be described.

First, in method 2, a place where first hook 1321 (that is, one example of fitting member) and drive shaft 16 are arranged so as not to overlap each other in a state viewed from the up-down direction (that is, the axial direction of drive shaft 16) is set. Next, virtual straight line L1 passing through first hook 1321 (that is, one example of fitting member) and drive shaft 16 is drawn. A place where second hook 1321 (that is, one example of fitting member) is arranged is set so as not to overlap first hook 1321 (that is, one example of fitting member) and drive shaft 16 on which virtual straight line L1 is drawn. Next, virtual straight line L2 passing through second hook 1321 (that is, one example of fitting member) and drive shaft 16 is drawn.

Note that, the places where two hooks 1321 (that is, one example of fitting member), including first hook 1321 (that is, one example of fitting member) and second hook (that is, one example of fitting member), and drive shaft 16 are disposed may be set in any order. It is also possible to set all or any two arrangement places of two hooks 1321 (that is, one example of fitting member) and drive shaft 16 simultaneously.

In such a manner, virtual straight line L1 connecting one hook 1321 (that is, one example of fitting member) of two hooks 1321 (that is, one example of fitting member) and drive shaft 16 can be drawn on FIG. 17. In addition, virtual straight line L2 connecting the other hook 1321 (that is, one example of fitting member) and drive shaft 16 can also be drawn on FIG. 17. Note that these two straight lines L1 and L2 are virtual straight lines drawn on FIG. 17. In addition, the notation of straight line L1 and straight line L2 is for convenience, and does not mean that straight line L1 is drawn before straight line L2. In this method 2, hook 2221 (that is, one example of fitting member) may also be used instead of hook 1321 (that is, one example of fitting member) in order to draw straight line L1 and straight line L2.

In this manner, when two virtual straight lines L1 and L2 are drawn on FIG. 17, region R2 (that is, the hatched region in FIG. 17) that is a part of an region between straight line L1 and straight line L2 is formed on a plane in a state viewed from the up-down direction (that is, the axial direction of drive shaft 16) on a side opposite to a side where two hooks 1321 (that is, one example of fitting member) and two hooks 2221 (that is, one example of fitting member) is present, through which straight line L1 and straight line L2 pass respectively.

Then, a place where third hook 1321 (that is, one example of fitting member) and third hook 2221 (that is, one example of fitting member) are arranged is set so that the third hooks are arranged in region R2 so as not to overlap drive shaft 16.

When the arrangement state of three hooks 1321 (that is, one example of fitting member), three hooks 2221 (that is, one example of fitting member), and drive shaft 16 is determined by method 2, three hooks 1321 (that is, one example of fitting member) and three hooks 2221 (that is, one example of fitting member) are arranged so that virtual triangle T1 in which drive shaft 16 is arranged is formed in region R1 when viewed from the up-down direction (that is, the axial direction of drive shaft 16). That is, three hooks 1321 (that is, one example of fitting member) and three hooks 2221 (that is, one example of fitting member) are arranged on vertex P1 of virtual triangle T1 in which drive shaft 16 is arranged in region R1.

Then, when three hooks 1321 (that is, one example of fitting member) and three hooks 2221 (that is, one example of fitting member) are arranged on vertex P1 of virtual triangle T1 in which drive shaft 16 is arranged in region R1, three hooks 1321 (that is, one example of fitting member) and three hooks 2221 (that is, one example of fitting member) are arranged to surround drive shaft 16. As a result, vibration in various directions is received by three hooks 1321 (that is, one example of fitting member) and three hooks 2221 (that is, one example of fitting member) arranged to surround drive shaft 16.

As described above, by determining the arrangement state of three hooks 1321 (that is, one example of fitting member), three hooks 2221 (that is, one example of fitting member), and drive shaft 16 according to method 1 or method 2, three hooks 1321 (that is, one example of fitting member) and three hooks 2221 (that is, one example of fitting member) is also capable of serving as vibration receivers.

Note that hook 1321 (that is, one example of fitting member) and hook 2221 (that is, one example of fitting member) may also be provided at four or more positions in body 10 and head 20. In this case, it is preferable to provide four or more hooks 1321 (that is, one example of fitting member) and four or more hooks 2221 (that is, one example of fitting member) so that drive shaft 16 is arranged in at least one triangular region of two or more virtual triangles formed by connecting hooks 1321 (that is, one example of fitting member) 1321 and hooks 2221 (that is, one example of fitting member).

In addition, three or more hooks 1321 (that is, one example of fitting member) and three or more hooks 2221 (that is, one example of fitting member) are preferably provided to be positioned on the same virtual circumference about drive shaft 16. At this time, it is more preferable to provide the hooks at equal intervals on the same virtual circumference centered on drive shaft 16.

Note that, if the fitting member is provided to surround drive shaft 16 over the entire circumference, vibration in various directions can be received by one fitting member. In addition, by providing two semicircular fitting members so as to surround drive shaft 16, vibration in various directions can also be received.

In addition to the fitting member, it is also possible to provide vibration receivers capable of receiving vibration in three or more directions intersecting each other on a plane orthogonal to drive shaft 16.

As illustrated in FIG. 20, lower lid 14 is a wall arranged to cover the lower opening of cylindrical wall 12, and includes outer wall 141 having a shape of substantially truncated sphere whose diameter decreases downward, and inner wall 142 arranged inside outer wall 141. In the present exemplary embodiment, lower lid 14 is formed by fixing outer wall 141 and inner wall 142 with screw 173.

Then, by inserting the upper portion of inner wall 142 into cylindrical wall 12 from the lower opening of cylindrical wall 12, the lower opening of cylindrical wall 12 is covered with lower lid 14. At this time, the upper portion of inner wall 142 is inserted into cylindrical wall 12 in a state where a gap between the outer peripheral surface of the upper portion of inner wall 142 and the inner peripheral surface of cylindrical wall 12 is sealed with packing 174.

In addition, as illustrated in FIGS. 2, 7, 8, and 20, connector 14a is formed on the lower surface of lower lid 14, and a charging cable or the like (not illustrated) is capable of being inserted. That is, rechargeable battery 171 is capable of being charged by inserting a charging cable or the like into connector 14a. Note that, the method of charging rechargeable battery 171 is not limited to the method of inserting a charging cable or the like into connector 14a, and may be, for example, a charging method by contactless power supply, a charging method by long-distance power transmission using a power transmission system.

Furthermore, in the present exemplary embodiment, as illustrated in FIGS. 18 and 19, body 10 includes cap 176 capable of covering an upper portion (that is, the upper end of drive shaft 16), and drive shaft 16 is protected by attaching cap 176 when not in use, such as during a carry or the like. In the present exemplary embodiment, cap 176 has a shape of substantially truncated sphere whose diameter decreases upward.

Example of Head

Figures 21, 22:
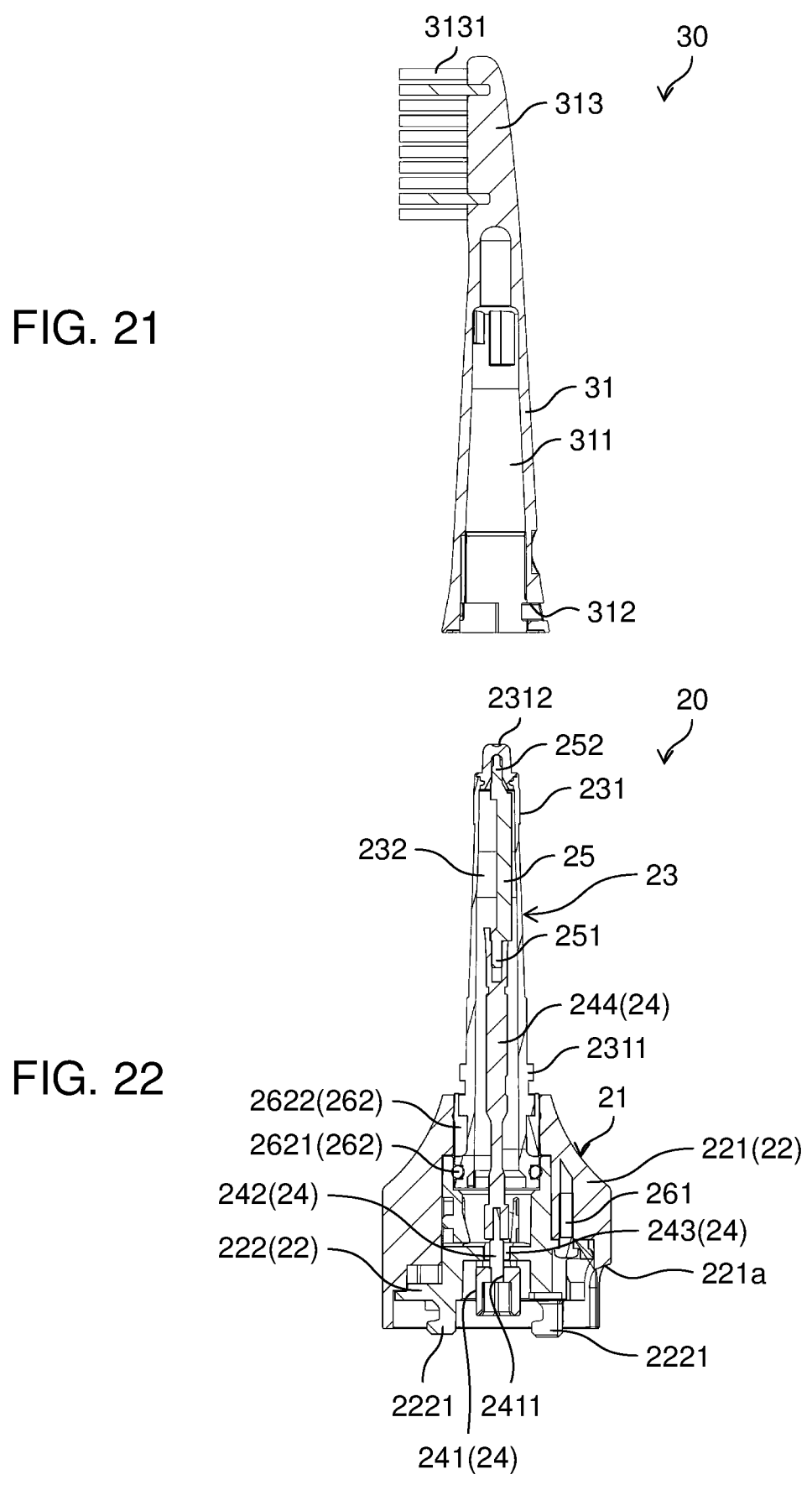
Figure 23:
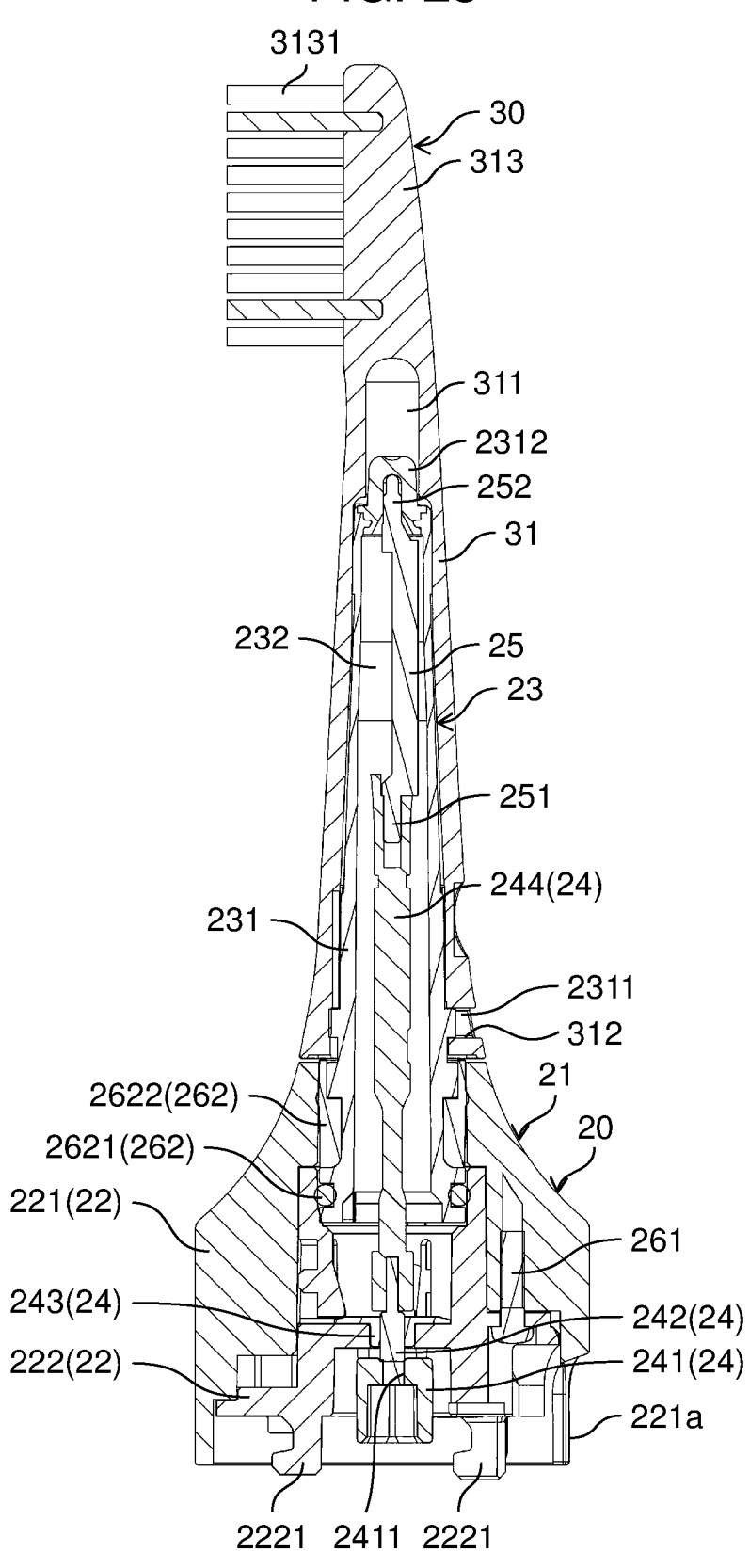
FIG. 23 is a side sectional view schematically showing a state where the brush handle is attached to the head.

In the present exemplary embodiment, as illustrated in FIGS. 22 and 23, head 20 includes base 21 attached to body 10, and shaft 23 attached to base 21, to which brush handle 30 is attached. Here, FIG. 22 is a side sectional view schematically illustrating an example of head 20. FIG. 23 is a side sectional view schematically showing a state where brush handle 30 is attached to head 20.

In the present exemplary embodiment, base 21 includes base housing 22. Base housing 22 may be formed using, for example, an insulating synthetic resin material.

In addition, in the present exemplary embodiment, base housing 22 includes peripheral wall 221 penetrating in the up-down direction and constituting the outer shell of base 21, and holding wall 222 inserted into peripheral wall 221 so as to cover the lower opening of peripheral wall 221. Holding wall 222 is fixed to peripheral wall 221 with screw 261.

Shaft 23 includes shaft housing 231. Shaft housing 231 may also be formed using, for example, an insulating synthetic resin material.

In the present exemplary embodiment, shaft housing 231 has an elongated shape in the up-down direction, and space 232 opened downward is formed inside shaft housing 231. Eccentric weight 25 (that is, one example of acting member) operated by power transmitted from power transmission mechanism 24 is contained in space 232.

In addition, in the present exemplary embodiment, shaft 23 is attached to base 21 by inserting the lower end of shaft housing 231 from the upper opening of peripheral wall 221. At this time, shaft 23 is held by base 21 in a state where a gap between peripheral wall 221 and shaft housing 231 is sealed with packing 262. Specifically, packing 262 includes first packing 2621 and second packing 2622, and shaft 23 is held by base 21 in a state where a gap between peripheral wall 221 and shaft housing 231 is sealed with first packing 2621 and second packing 2622. As described above, in the present exemplary embodiment, shaft 23 is supported by base 21 intermediated by first packing 2621 and second packing 2622.

In addition, in the present exemplary embodiment, in a state where shaft 23 is attached to base 21, engagement protrusion 2311 to be engaged with brush handle 30 is formed on a lower outer periphery of a portion exposed from peripheral wall 221 of shaft housing 231. Bearing protrusion 2312 that holds upper end 252 of eccentric weight 25 (that is, one example of acting member) is provided at the upper end of shaft housing 231.

Head 20 further includes power transmission mechanism 24 capable of transmitting power of rotary motor 15 (that is, rotational force), and power transmission mechanism 24 is held by holding wall 222.

Peripheral wall 221 has a lower portion having a substantially columnar shape and an upper portion having a shape of substantially truncated cone whose diameter decreases upward. Cutout 221a is formed at the rear lower end of peripheral wall 221 so that peripheral wall 221 does not interfere with restriction wall 1331c and vertical wall 1322 (see FIG. 20) of body 10 when head 20 is attached to body 10. In addition, restriction wall 1331c, vertical wall 1322, and cutout 221a define one mounting direction of head 20 when head 20 is attached to body 10.

On the other hand, three hooks 2221 (that is, one example of fitting member) are provided on holding wall 222 so as to protrude downward. These three hooks 2221 are provided at positions respectively corresponding to three hooks 1321 of body 10, and are each provided so that a portion to be hooked by hooking hook 1321 protrudes forward in the front-rear direction.

Figure 11:
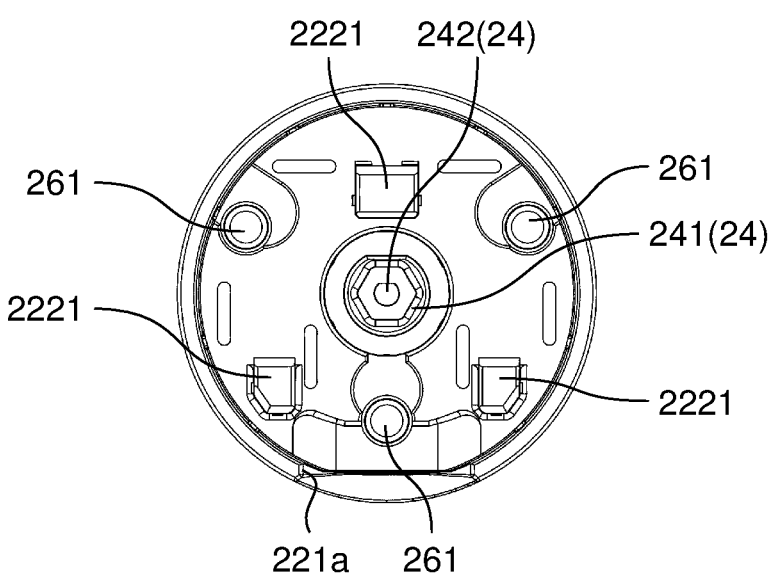
FIG. 11 is a bottom view schematically showing a state where the brush handle is attached to the head.

As illustrated in FIG. 11, power transmission unit 241 of power transmission mechanism 24 is held at the center portion of holding wall 222 so as to be surrounded by three hooks 2221. Here, FIG. 11 is a bottom view schematically showing a state where brush handle 30 is attached to head 20. In a bottom view of head 20 (that is, in a state where the head is viewed from the lower side in the up-down direction), a polygonal space such as a regular hexagon is formed inside power transmission unit 241 so as to open downward. The polygonal space such as a regular hexagon is formed so as to have substantially the same size as the outer diameter of drive shaft 16, and when head 20 is attached to body 10, drive shaft 16 is inserted into the polygonal space such as a regular hexagon. As described above, in the present exemplary embodiment, when head 20 is attached to body 10, power transmission unit 241 is capable of being attached to drive shaft 16 in a state where idling is suppressed.

Power transmission mechanism 24 includes power transmission unit 241, which has been described above, and operation shaft 242 attached to power transmission unit 241 to operate. In the present exemplary embodiment, as illustrated in FIGS. 22 and 23, operation shaft 242 having the D-cut structure is inserted and fixed into insertion hole 2411 formed in the upper portion of power transmission unit 241. Therefore, in the present exemplary embodiment, operation shaft 242 rotates together with power transmission unit 241 that rotates by power of rotary motor 15 (that is, by rotational force) transmitted from drive shaft 16.

In addition, in the present exemplary embodiment, operation shaft 242 is held by bearing 243. That is, power transmission mechanism 24 includes operation shaft 242 attached to power transmission unit 241 to operate, and bearing 243 supporting operation shaft 242.

As described above, the rotational motion of operation shaft 242 is supported by bearing 243. As a result, bearing 243 prevents operation shaft 242 from swinging in the radial direction when operation shaft 242 is rotated.

In addition, in the present exemplary embodiment, power transmission mechanism 24 includes joint 244 for connecting eccentric weight 25 (that is, one example of acting member) to operation shaft 242. Specifically, lower end of joint 244 is attached to the upper end of operation shaft 242, and the upper end of joint 244 is attached to lower end 251 of eccentric weight 25 (that is, one example of acting member).

When rotary motor 15 is driven by pressing power switch 123 in a state where head 20 having such a configuration is attached to body 10 and power transmission unit 241 is attached to drive shaft 16, drive shaft 16 rotates. Then, the rotation of drive shaft 16 is transmitted to power transmission unit 241, and power transmission unit 241 rotates together with drive shaft 16. At this time, operation shaft 242 attached to power transmission unit 241, joint 244 attached to operation shaft 242, and eccentric weight 25 (that is, one example of acting member) attached to joint 244 also rotate together with power transmission unit 241. Then, as eccentric weight 25 (that is, one example of acting member) rotates, shaft 23 vibrates. In such a manner, head 20 vibrates.

As described above, head 20 according to the present exemplary embodiment is a head having a function of generating vibration in shaft 23 by rotating eccentric weight 25 (that is, one example of acting member) via power transmission mechanism 24 by the power of rotary motor 15 (that is, by rotational force). That is, shaft 23 is vibrated by transmitting the power of rotary motor 15 (that is, by rotational force) as it is (that is, without being converted into linear motion) to eccentric weight 25 (that is, one example of acting member). In such a manner, transmission loss of power of rotary motor 15 (that is, transmission loss of rotational force) is reduced. In addition, by not converting into linear motion and not providing conversion mechanism, the configuration can be simplified and the size can be made compact.

Further, in the present exemplary embodiment, the rotation centers of power transmission unit 241, operation shaft 242, joint 244, and lower end 251 and upper end 252 of eccentric weight 25 (that is, one example of acting member) are substantially identical to the rotation center of drive shaft 16. In such a manner, transmission loss of power of rotary motor 15 (that is, transmission loss of rotational force) is further reduced.

Example of Brush Handle

In the present exemplary embodiment, brush handle 30 includes handle housing 31. Handle housing 31 may also be formed using, for example, an insulating synthetic resin material. Here, FIG. 21 is a side sectional view schematically illustrating an example of brush handle 30.

As illustrated in FIGS. 21 and 23, space 311 opened downward is formed in handle housing 31, and brush handle 30 is attached to head 20 by inserting shaft 23 of head 20 into space 311.

In the present exemplary embodiment, engagement hole 312 is formed in the lower end of handle housing 31, and brush handle 30 is attached to head 20 by inserting and engaging engagement protrusion 2311 of shaft housing 231 into engagement hole 312.

In addition, bristle 3131 formed by providing a plurality of hair bundles are formed at distal end portion 313 of handle housing 31. In the present exemplary embodiment, as illustrated in FIG. 4, in a state where head 20 is attached to body 10 and brush handle 30 is attached to head 20, center of gravity G of entire electric toothbrush 1 is located closer to body 10 than brush handle 30 in the axial direction of drive shaft 16. In such a manner, when electric toothbrush 1 is placed on a wash basin or the like in a lying posture, the electric toothbrush 1 prevents bristle 3131 from inclining downward and being brought into contact with the wash basin or the like.

In addition, as illustrated in FIG. 6, when viewed from the axial direction of drive shaft 16 in a state where head 20 is attached to body 10 and brush handle 30 is attached to head 20, entire bristle 3131 is present in the region of body 10 (that is, the inner side of contour shape D). In such a manner, even when electric toothbrush 1 laid on a wash basin or the like rotates about the axis of drive shaft 16, contact of the tip of bristle 3131 with the surface of the wash basin or the like can be suppressed.

Figure 12:
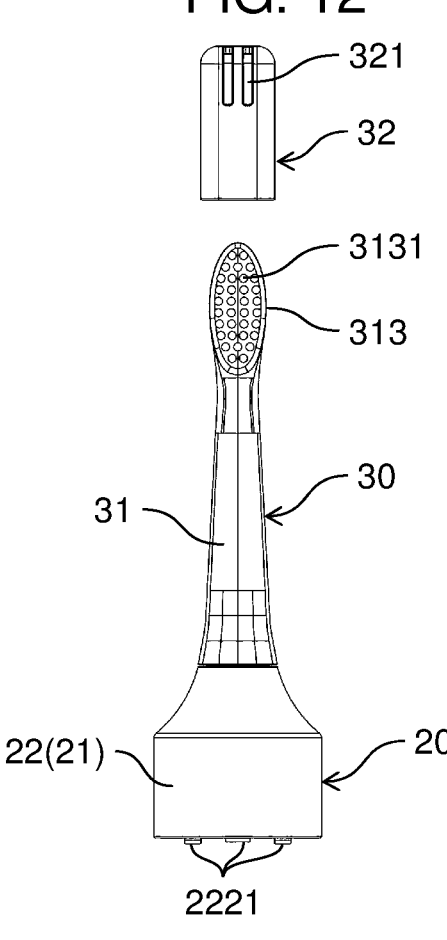
FIG. 12 is a front view schematically showing a state where a cap is to be attached to the brush handle attached to the head.
Figure 13:
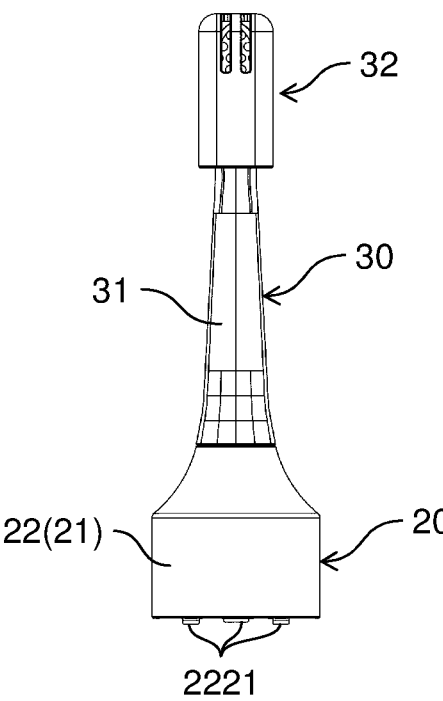
FIG. 13 is a front view schematically showing a state where the cap has been attached to the brush handle attached to the head.

Further, in the present exemplary embodiment, as illustrated in FIGS. 12 and 13, brush handle 30 includes cap 32 that is detachably attached to handle housing 31 and covers bristle 3131. Here, FIG. 12 is a front view schematically showing a state where cap 32 is to be attached to brush handle 30 attached to head 20. FIG. 13 is a front view schematically showing a state where cap 32 has been attached to brush handle 30 attached to head 20. bristle 3131, which are the functional units of electric toothbrush 1, are protected by attaching cap 32 when electric toothbrush 1 is not in use, such as when electric toothbrush 1 is carried. Note that hole 321 for more efficiently drying bristle 3131 is formed in cap 32.

When brush handle 30 having such a configuration is attached to head 20, vibration of shaft 23 (that is, one example of element of head 20) generated by power of rotary motor 15 (that is, by the rotational force) is transmitted to brush handle 30, and brush handle 30 vibrates. At this time, bristle 3131 provided at distal end portion 313 of brush handle 30 also vibrate.

Example of Using Electric Toothbrush

Electric toothbrush 1 having the configuration described above can be used, for example, as below.

First, brush handle 30 is attached to head 20 while head 20 is attached to body 10. Next, rotary motor 15 is driven by operating power switch 123 to vibrate bristle 3131. Then, in a state where bristle 3131 are vibrated, the user grips body 10 by hand, puts the portion of bristle 3131 in the oral cavity, and brushes the teeth to clean food debris, dental plaque, and the like.

Note that the use method described above is merely an example, and electric toothbrush 1 can be used with various methods.

Another Example of Head

Figure 24:
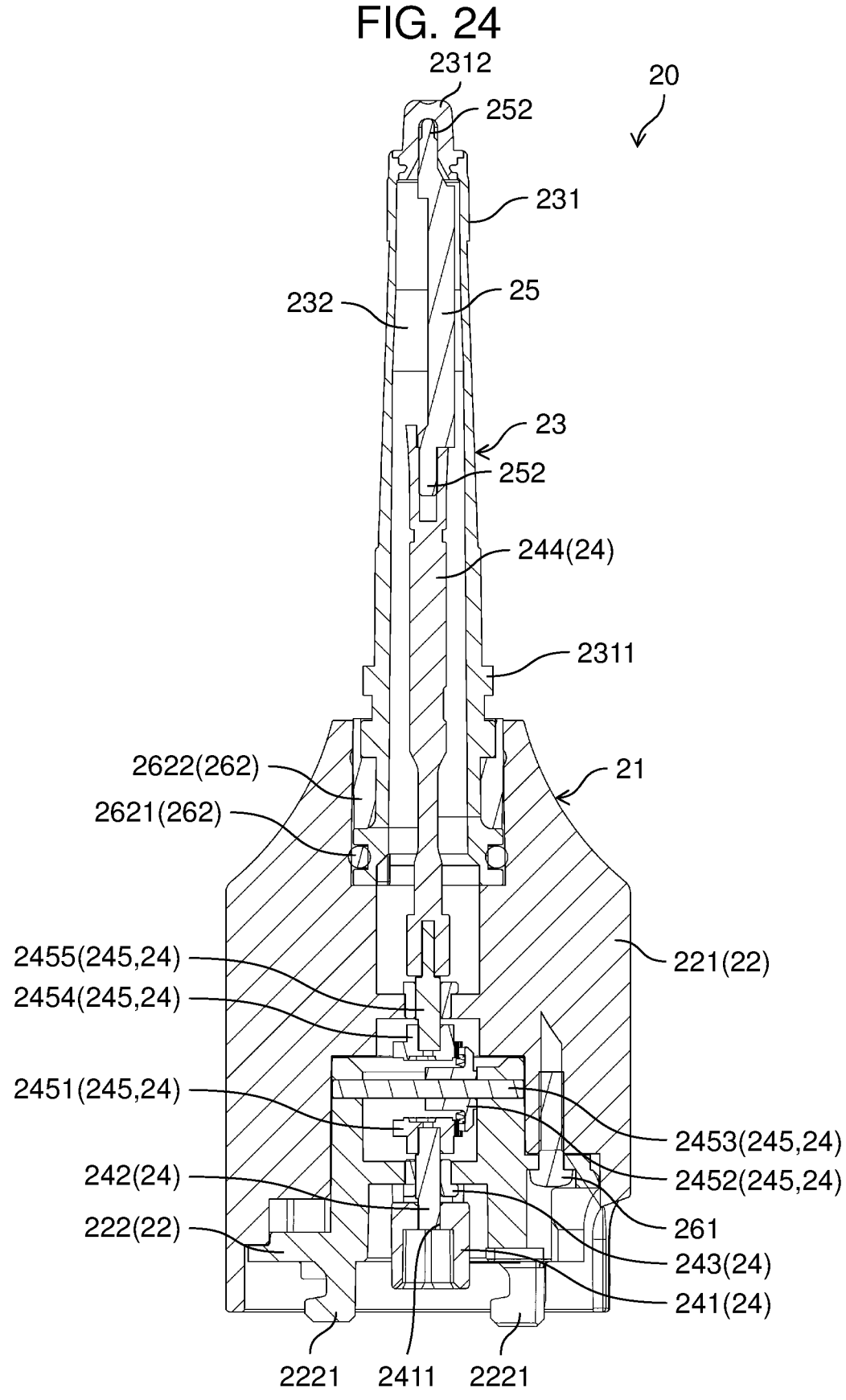
FIG. 24 is a side sectional view schematically illustrating a first modification of the head.

In addition, the head of electric toothbrush 1 may also be head 20 illustrated in FIG. 24. FIG. 24 is a side sectional view schematically illustrating a first modification of the head.

Head 20 illustrated in FIG. 24 basically has the same configuration as head 20 illustrated in the above exemplary embodiment, and includes base 21 attached to body 10 and shaft 23 attached to base 21 and to which brush handle 30 is attached.

In addition, head 20 illustrated in FIG. 24 includes power transmission mechanism 24 having power transmission unit 241.

Eccentric weight 25 (that is, one example of acting member) operated by power transmitted from power transmission mechanism 24 is contained in a space 232 formed in shaft housing 231 of shaft 23.

Here, head 20 illustrated in FIG. 24 includes a transmission mechanism 245 that shifts the power of rotary motor 15. Specifically, power transmission mechanism 24 includes a transmission mechanism 245, and transmission mechanism 245 is interposed between operation shaft 242 and joint 244. In such a manner, eccentric weight 25 (that is, one example of acting member) is rotated at a rotation speed different from the rotation speed of rotary motor 15.

Transmission mechanism 245 includes first gear 2451 attached to the upper end of operation shaft 242. First gear 2451 is attached to operation shaft 242 to rotate together with operation shaft 242.

In addition, transmission mechanism 245 includes second gear 2452 that meshes with first gear 2451 in the lower portion and rotates about the horizontal direction (that is, the front-rear direction), and a horizontal shaft 2453 to which second gear 2452 is attached in a state of extending in the horizontal direction.

Further, transmission mechanism 245 includes third gear 2454 that meshes with the upper portion of second gear 2452 and rotates about the vertical direction (that is, the up-down direction), and connecting shaft 2455 that extends in the up-down direction and to which third gear 2454 is attached. In head 20 illustrated in FIG. 24, connecting shaft 2455 is arranged to be coaxial with operation shaft 242. Joint 244 is connected to the upper end of connecting shaft 2455.

At this time, the gear ratio between first gear 2451 and third gear 2454 is set to a value other than 1. In such a manner, eccentric weight 25 (that is, one example of acting member) is rotated at a rotation speed different from the rotation speed of rotary motor 15.

Figure 25:
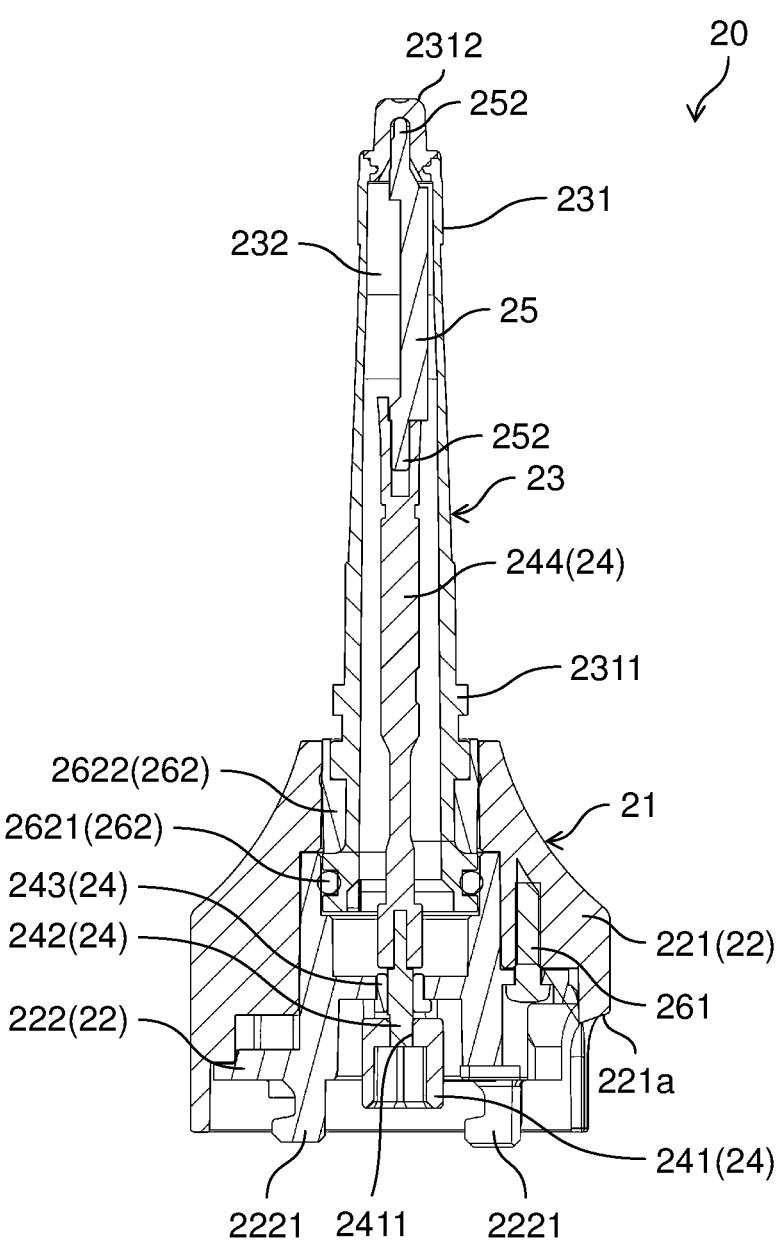
FIG. 25 is a side sectional view schematically illustrating a second modification of the head.

In addition, the head of electric toothbrush 1 may also be head 20 illustrated in FIG. 25. FIG. 25 is a side sectional view schematically illustrating a second modification of head 20.

Head 20 illustrated in FIG. 25 basically has the same configuration as head 20 illustrated in the above exemplary embodiment, and includes base 21 attached to body 10 and shaft 23 attached to base 21 and to which brush handle 30 is attached.

In addition, head 20 illustrated in FIG. 25 also includes power transmission mechanism 24 having power transmission unit 241.

Eccentric weight 25 (that is, one example of acting member) operated by power transmitted from power transmission mechanism 24 is contained in a space 232 formed in shaft housing 231 of shaft 23.

Here, in head 20 illustrated in FIG. 25, the length of eccentric weight 25 (that is, one example of acting member) is different from the length of eccentric weight 25 (that is, one example of acting member) 25 illustrated in the above exemplary embodiment. In such a manner, the weight of eccentric weight 25 (that is, one example of acting member) is made different. Note that, it is also possible to change the weight of eccentric weight 25 (that is, one example of acting member) by changing the material.

As described above, if the weight of eccentric weight 25 (that is, one example of acting member) is made different, the amplitude of bristle 3131 vibrating during use can be changed.

Figure 26:
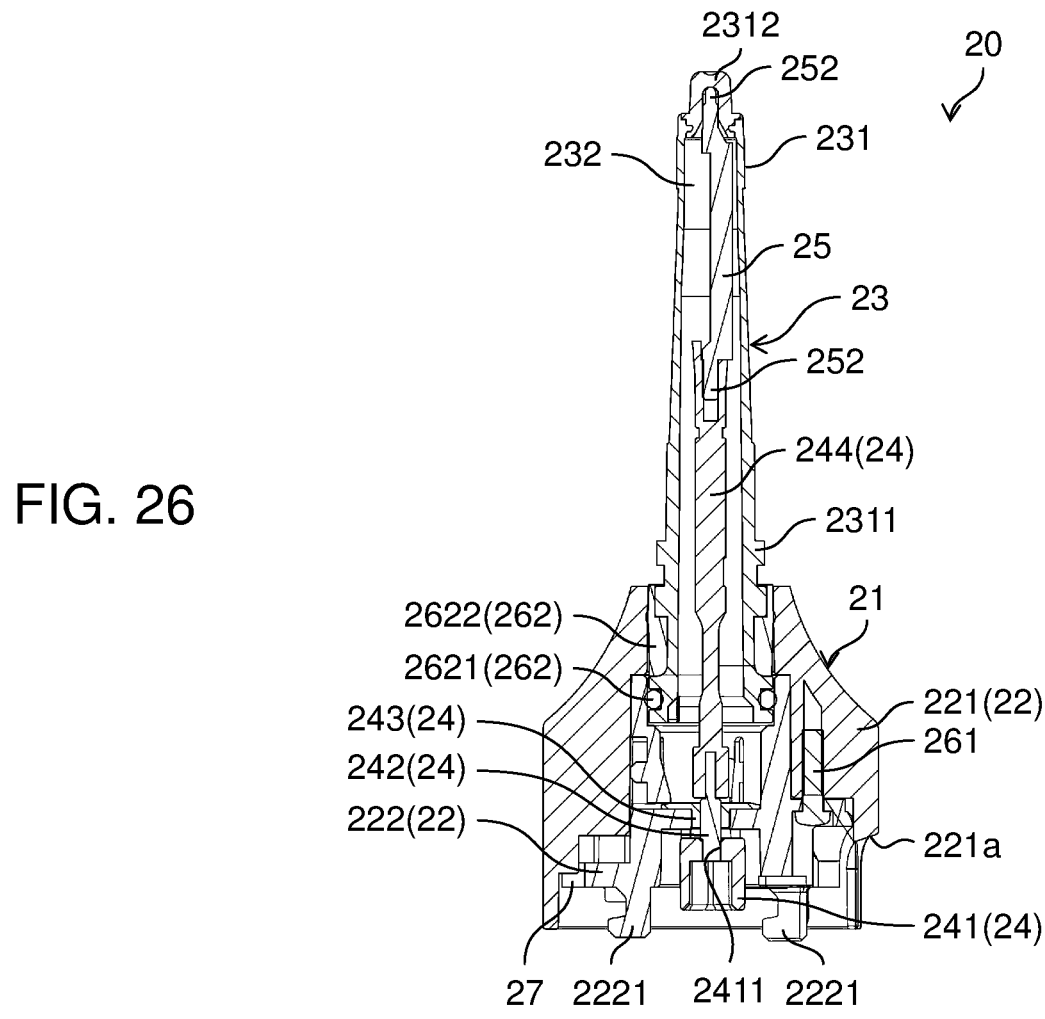
FIG. 26 is a side sectional view schematically illustrating a third modification of the head.
Figure 27:
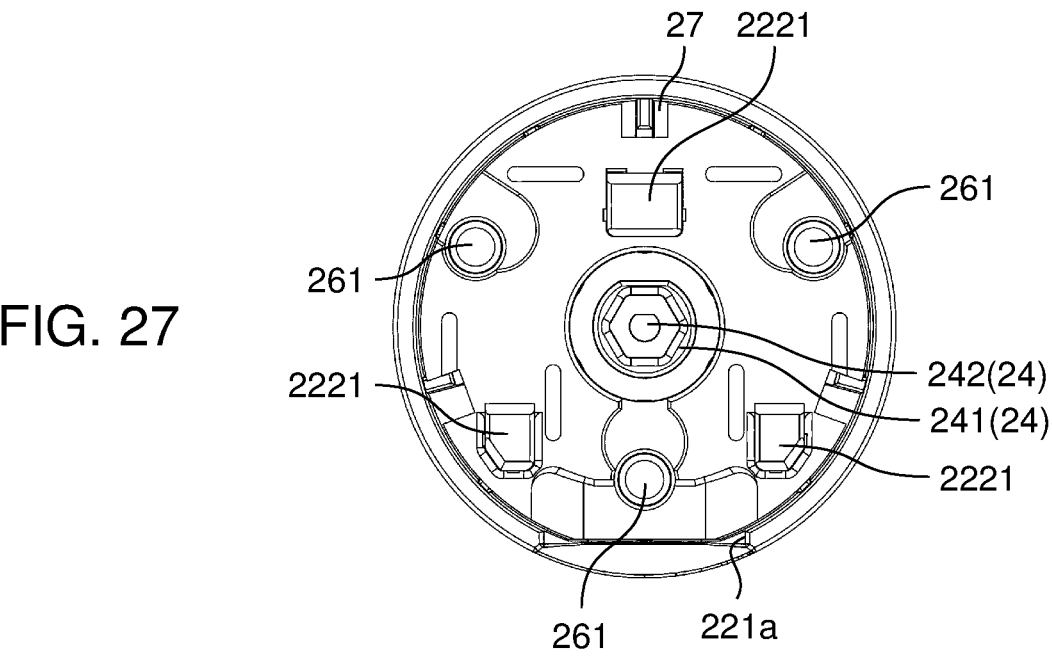
FIG. 27 is a bottom view schematically illustrating the third modification of the head.

In addition, the head of electric toothbrush 1 may also be head 20 illustrated in FIGS. 26 and 27. FIG. 26 is a side sectional view schematically illustrating the third modification of head 20. FIG. 27 is a bottom view schematically illustrating the third modification of head 20.

Head 20 illustrated in FIGS. 26 and 27 basically has the same configuration as head 20 illustrated in the above exemplary embodiment, and includes base 21 attached to body 10 and shaft 23 attached to base 21 and to which brush handle 30 is attached.

In addition, head 20 illustrated in FIGS. 26 and 27 also includes power transmission mechanism 24 having power transmission unit 241.

Eccentric weight 25 (that is, one example of acting member) operated by power transmitted from power transmission mechanism 24 is contained in a space 232 formed in shaft housing 231 of shaft 23.

Here, in head 20 illustrated in FIGS. 26 and 27, communication hole 27 communicating with eccentric weight 25 (that is, one example of acting member) is formed. Specifically, communication hole 27 communicating with space 232 in which eccentric weight 25 (that is, one example of acting member) is contained is formed in the lower portion of base 21.

In such a manner, it is possible to more reliably wash away food debris or the like adhering to head 20 after using electric toothbrush 1.

Note that head 20 of electric toothbrush 1 is not limited to one type, and it is also possible to include one head 20 selected from a plurality of types of heads 20 by the user of electric toothbrush 1.

For example, a plurality of types of head 20 having different operation performances of eccentric weights 25 (that is, one example of acting member) may be provided, and any head 20 may be attached to body 10.

Specifically, a plurality of types of head 20 having different transmission ratios may be provided, and any head 20 may be attached to body 10.

In addition, a plurality of types of head 20 having different weights of eccentric weights 25 (that is, one example of acting member) may be provided in electric toothbrush 1, and any head 20 may be attached to body 10.

Further, a plurality of types of head 20 having respectively different transmission ratios and weights of eccentric weights 25 (that is, one example of acting member) may be provided, and any head 20 may be attached to body 10.

At this time, the plurality of types of heads may or need not include head 20 described in the above exemplary embodiment.

In addition, communication hole 27 may be formed in at least one head among the plurality of heads.

In addition, electric toothbrush 1 described in the above exemplary embodiment and the modifications thereof may be used as one of the personal care kits in which heads having various functions is capable of being attached to a common body 10. That is, electric toothbrush 1 may further include another head having a different function of the acting member.

For example, in addition to the head to which brush handle 30 is attached, any one or more types of heads among a head having a hair cutting function, a head having an oral cavity washing function, a head having a massage function, a head having a face washing function, and the like, may be further included.

Hereinafter, other heads having different functions of the acting member will be described.

Example of Oral Cavity Cleaning Head

Electric toothbrush 1 can include oral cavity cleaning head 40 that is a head having an oral cavity washing function.

Figure 28:
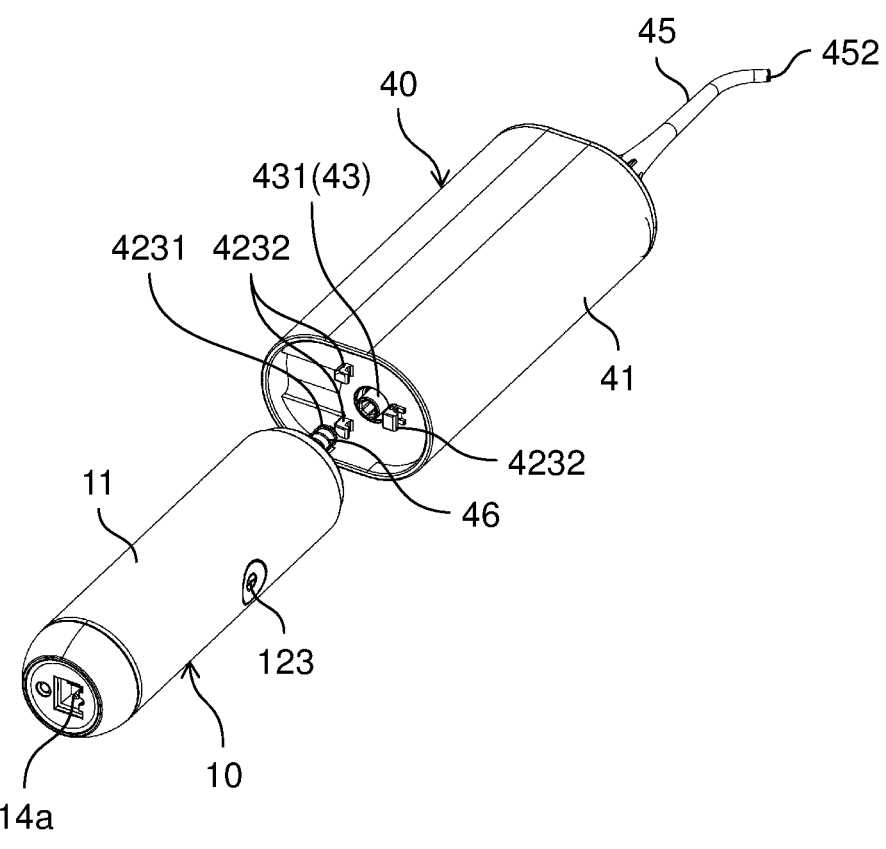
FIG. 28 is a perspective view schematically showing a state where an example of an oral cavity cleaning head is to be attached to the body.
Figure 29:
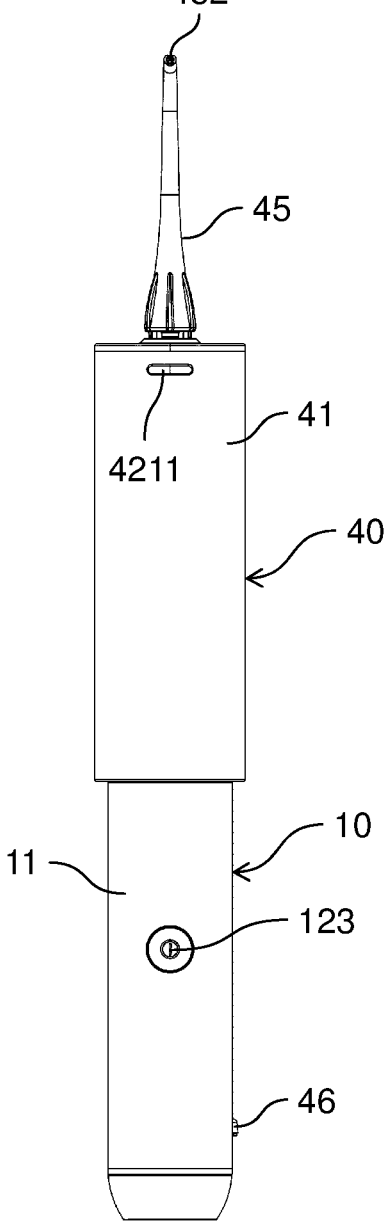
FIG. 29 is a front view schematically showing a state where an example of the oral cavity cleaning head has been attached to the body.
Figure 30:
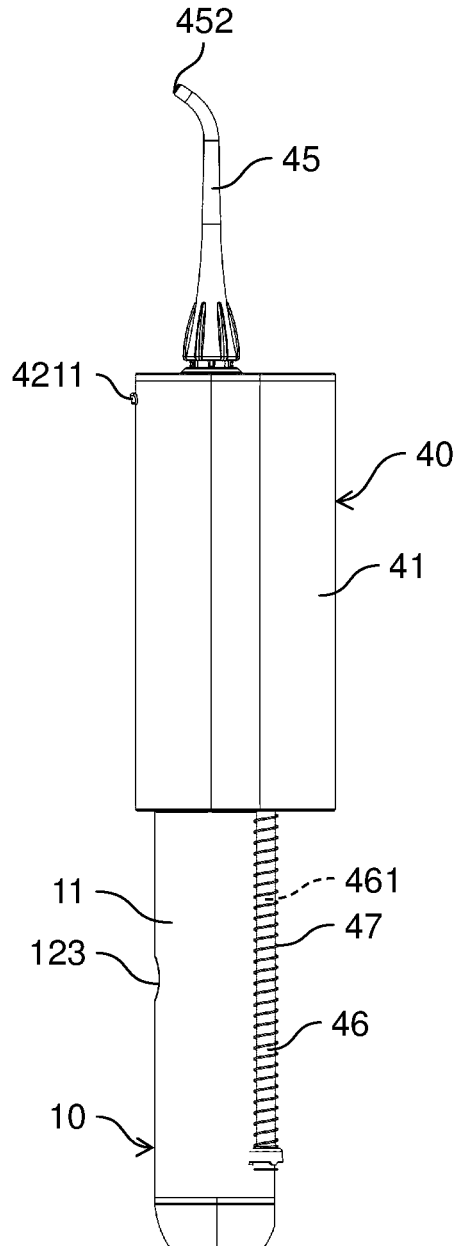
FIG. 30 is a side view schematically showing a state where an example of the oral cavity cleaning head has been attached to the body.
Figure 31:
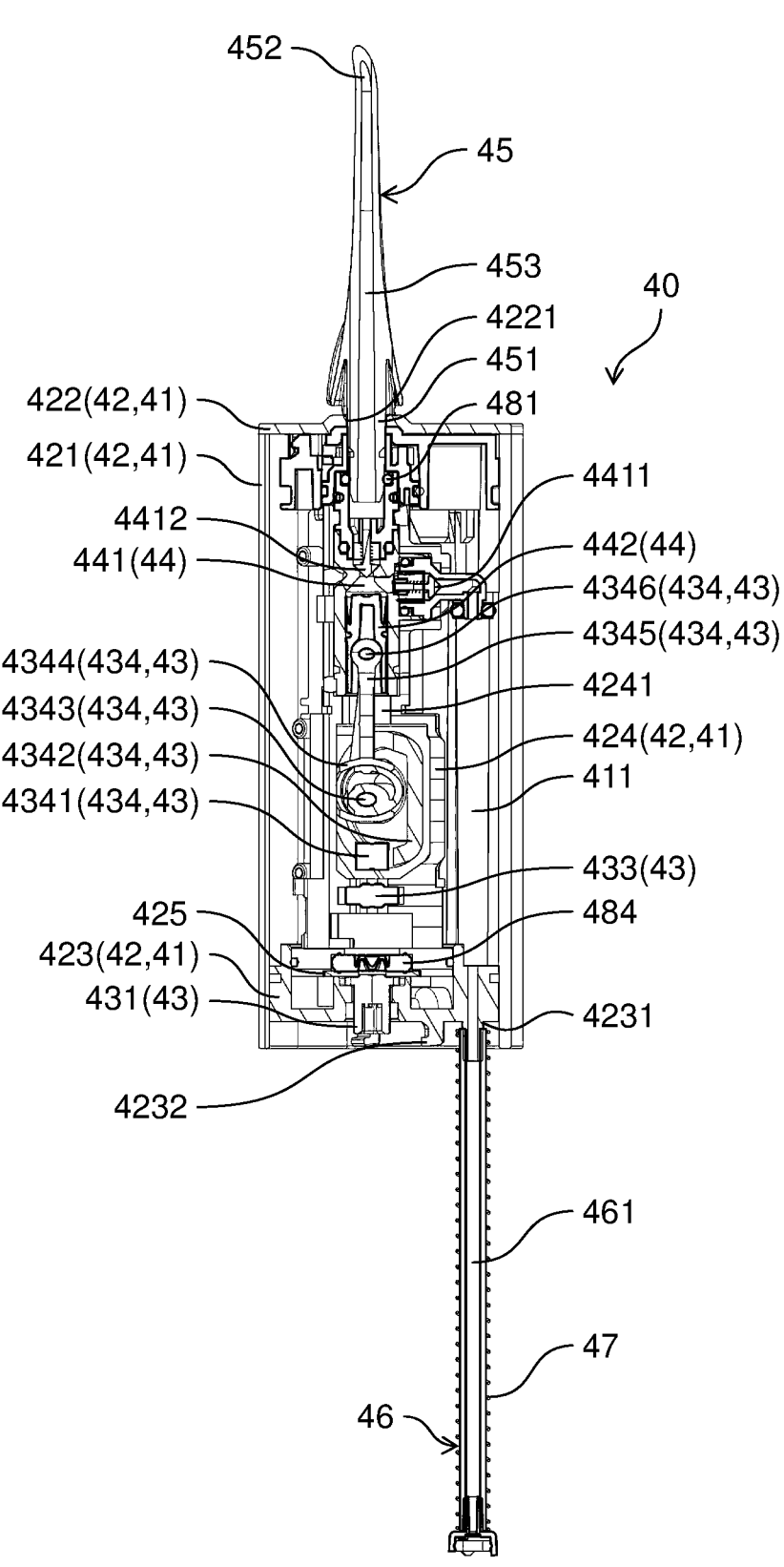
FIG. 31 is a side sectional view schematically showing a flow path of an example of the oral cavity cleaning head.
Figure 32:
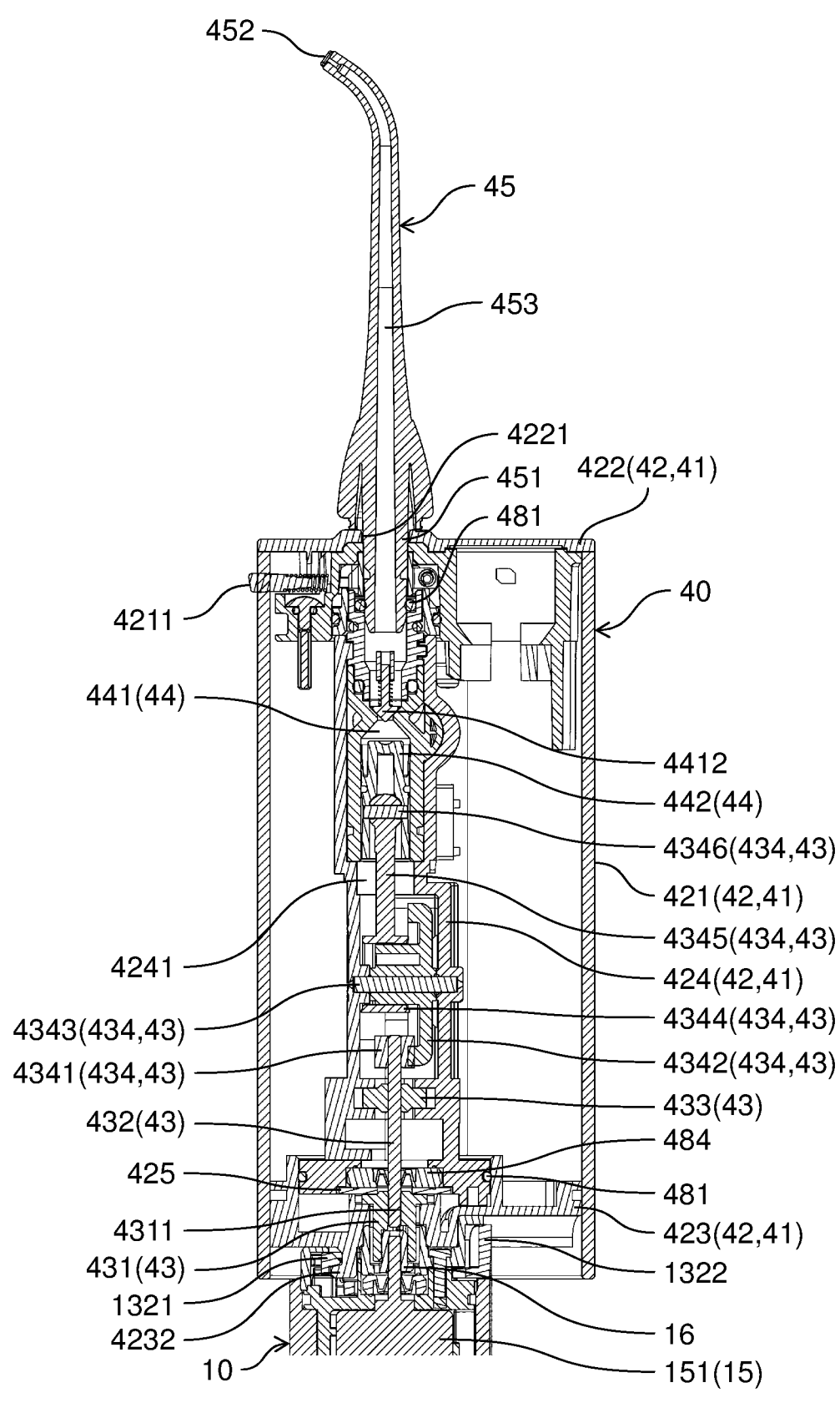
FIG. 32 is a side sectional view schematically showing an example of the oral cavity cleaning head attached to the body in an enlarged manner.

Hereinafter, a specific configuration of an example of oral cavity cleaning head 40 will be described with reference to FIGS. 28 to 32. FIG. 28 is a perspective view schematically showing a state where an example of oral cavity cleaning head 40 is to be attached to body 10. FIG. 29 is a front view schematically showing a state where an example of oral cavity cleaning head 40 has been attached to body 10. FIG. 30 is a side view schematically showing a state where an example of oral cavity cleaning head 40 has been attached to body 10. FIG. 31 is a side sectional view schematically showing flow path 411 of an example of oral cavity cleaning head 40. FIG. 32 is a side sectional view schematically showing an example of oral cavity cleaning head 40 attached to body 10 in an enlarged manner.

As illustrated in FIG. 31, oral cavity cleaning head 40 includes head body 41 in which flow path 411 is formed, and nozzle 45 that is detachably attached to the upper part of head body 41 and capable of jetting liquid (for example, water, washing liquid, and the like) into an oral cavity. In addition, oral cavity cleaning head 40 includes liquid supply tube 46 that is provided in the lower portion of head body 41 and capable of supplying liquid into flow path 411. Note that, liquid supply tube 46 has flexibility, and coil-shaped spring 47 capable of suppressing bending of liquid supply tube 46 is arranged on the outer periphery of liquid supply tube 46 as illustrated in FIGS. 30 and 31.

As illustrated in FIGS. 28 and 32, head body 41 has a substantially elliptical shape in plan view, and includes head housing 42 constituting an outer shell of head body 41. Head housing 42 may be formed using, for example, an insulating synthetic resin material.

In addition, head housing 42 is formed by joining a plurality of divided bodies, and a cavity is formed inside head housing 42 formed by joining the divided bodies. As illustrated in FIG. 31, a part of the cavity serves as flow path 411, and a pump 44 for discharging liquid introduced into flow path 411 through nozzle 45 is contained in the cavity.

Specifically, head housing 42 includes cylindrical wall 421 penetrating in the up-down direction, upper lid 422 arranged so as to cover the upper opening of cylindrical wall 421, and lower lid 423 arranged so as to cover the lower opening of cylindrical wall 421.

In addition, partition wall 424 partitioning the inside of the cavity is formed in the cavity formed inside head housing 42, and pump 44 is arranged in space 4241 partitioned by partition wall 424. Partition wall 424 is held by lower lid 423 in a state where a gap between the outer peripheral surface of partition wall 424 and the inner peripheral surface of lower lid 423 is sealed with packing 481. Note that flow path 411 is formed outside space 4241 partitioned by partition wall 424, and communicates with pump chamber 441 of pump 44 via suction valve 4411.

Here, nozzle insertion portion 4221 into which nozzle 45 is inserted is formed in upper lid 422, and nozzle lock release button 4211 (see FIG. 29) for removing nozzle 45 attached to head body 41 is formed in cylindrical wall 421.

In addition, nozzle 45 includes insertion end 451 inserted into nozzle insertion portion 4221 and discharge end 452 that is capable of being inserted into the oral cavity, and flow path 453 is formed inside nozzle 45. Note that nozzle insertion portion 4221 is formed to communicate with space 4241 partitioned by partition wall 424, and when nozzle 45 is attached, flow path 453 of nozzle 45 communicates with space 4241 partitioned by partition wall 424. At this time, nozzle 45 is inserted into nozzle insertion portion 4221 in a state where a gap between the inner peripheral surface of partition wall 424 and the outer peripheral surface of insertion end 451 is sealed with packing 481.

On the other hand, liquid supply tube insertion portion 4231 into which liquid supply tube 46 is inserted is formed in lower lid 423. Then, by inserting liquid supply tube 46 into liquid supply tube insertion portion 4231, flow path 461 in liquid supply tube 46 communicates with flow path 411 in head body 41.

Further, three hooks 4232 (that is, one example of fitting member) are provided so as to protrude downward at positions deviated from the portion of lower lid 423 where liquid supply tube insertion portion 4231 is formed. Three hooks 4232 are provided at positions corresponding to three hooks 1321 of body 10, respectively, and are each provided so that a portion to be hooked by hooking hook 1321 protrudes forward in the front-rear direction.

Power transmission unit 431 of power transmission mechanism 43 is held in lower lid 423 so as to be surrounded by three hooks 4232. In a bottom view of oral cavity cleaning head 40 (that is, in a state where the head is viewed from the lower side in the up-down direction), a polygonal space such as a regular hexagon is formed inside power transmission unit 431 as to open downward. The polygonal space such as a regular hexagon is formed to have substantially the same size as the outer diameter of drive shaft 16, and when oral cavity cleaning head 40 is attached to body 10, drive shaft 16 is inserted into the polygonal space such as a regular hexagon.

Further, oral cavity cleaning head 40 further includes power transmission mechanism 43 capable of transmitting power of rotary motor 15 (that is, rotational force), and power transmission mechanism 43 is held by lower lid 423.

As illustrated in FIG. 32, power transmission mechanism 43 includes power transmission unit 431, which will be described above, and operation shaft 432 attached to power transmission unit 431 to operate. Operation shaft 432 is inserted into and fixed to insertion hole 4311 formed in the upper portion of power transmission unit 431, and rotates together with power transmission unit 431 that rotates by power of rotary motor 15 transmitted from drive shaft 16 (that is, by rotational force). Further, operation shaft 432 is held by bearing 433.

Note that power transmission mechanism 43 is held by lower lid 423 and partition wall 424 in a state where the upper end of operation shaft 432 is arranged in space 4241 partitioned by partition wall 424. Specifically, power transmission mechanism 43 is held by lower lid 423 and partition wall 424 by sandwiching power transmission unit 431 between lower lid 423 and partition wall 424. At this time, power transmission mechanism 43 is held in a state where a gap between operation shaft 432 and partition wall 424 is sealed with waterproof rubber 484 and retaining plate 425. In such a manner, direct water entrance from the outside into space 4241 partitioned by partition wall 424 can be suppressed.

In addition, power transmission mechanism 43 includes a conversion mechanism 434 that is attached to operation shaft 432 and converts the rotational motion into a reciprocating linear motion in the up-down direction, and conversion mechanism 434 is connected to a piston 442 (that is, one example of acting member) of pump 44. That is, conversion mechanism 434 is interposed between operation shaft 432 and piston 442 (that is, one example of acting member). In such a manner, piston 442 (that is, one example of the acting member) is reciprocated linearly in the up-down direction with the power of rotary motor 15.

Conversion mechanism 434 includes first gear 4341 attached to the upper end of operation shaft 432. First gear 4341 is attached to operation shaft 432 so as to rotate together with operation shaft 432.

In addition, conversion mechanism 434 includes second gear 4342 that meshes with first gear 4341 in the lower portion and rotates about the horizontal direction (that is, the front-rear direction), and horizontal shaft 4343 to which second gear 4342 is attached in a state of extending in the horizontal direction.

Further, conversion mechanism 434 includes cam 4344 attached to second gear 4342 and connecting rod 4345 extending in the vertical direction and attached to cam 4344. Piston 442 (that is, one example of acting member) is connected to the upper end of connecting rod 4345 with connecting shaft 4346.

Next, an example of a method of using oral cavity cleaning head 40 having such a configuration will be described.

First, while oral cavity cleaning head 40 is attached to body 10 and power transmission unit 431 is attached to drive shaft 16, liquid supply tube 46 is inserted into a container (for example, pleatic bottles and the like) in which liquid is stored. Then, in this state, drive shaft 16 is rotated by pressing power switch 123 to drive rotary motor 15.

In such a manner, the rotation of drive shaft 16 is transmitted to power transmission unit 431, and power transmission unit 431 rotates together with drive shaft 16. At this time, operation shaft 432 attached to power transmission unit 431, first gear 4341 attached to operation shaft 432, and second gear 4342 attached to first gear 4341 also rotate together with power transmission unit 431. As second gear 4342 rotates, cam 4344 also rotates. Then, the rotation of cam 4344 causes connecting rod 4345 and piston 442 (that is, one example of acting member) attached to connecting rod 4345 to reciprocate linearly in the up-down direction in pump chamber 441. As described above, when piston 442 (that is, one example of acting member) reciprocates linearly in the up-down direction in pump chamber 441, the volume of pump chamber 441 varies.

When the volume of pump chamber 441 increases, the suction valve provided between flow path 411 of head body 41 and pump chamber 441 is opened, and the liquid flows into pump chamber 441 via flow path 411. Specifically, the liquid in the container (for example, pleatic bottles or the like) is sucked into liquid supply tube 46 from the tip of liquid supply tube 46 inserted into the container (for example, pleatic bottles and the like), and flows into flow path 411 of head body 41 from liquid supply tube 46. Then, the liquid flows into pump chamber 441 connected to flow path 411 of head body 41. At this time, discharge valve 4412 provided between pump chamber 441 and nozzle 45 is closed. Note that it is preferable to provide a filter at the tip of liquid supply tube 46 in order to suppress the foreign matter from flowing into pump chamber 441 together with the liquid.

On the other hand, when the volume of pump chamber 441 decreases, discharge valve 4412 provided between pump chamber 441 and nozzle 45 is opened, and the liquid is discharged from pump chamber 441. Specifically, the liquid discharged from pump chamber 441 is discharged from discharge end 452 to the outside through nozzle insertion portion 4221 provided at the upper end of head body 41 and flow path 453 formed in nozzle 45. At this time, the suction valve provided between flow path 411 of head body 41 and pump chamber 441 is closed.

By repeating such an operation, the liquid in flow path 411 is ejected from discharge end 452 of nozzle 45 while the liquid stored in the container (for example, pleatic bottles and the like) is sucked into flow path 411 of head body 41 via liquid supply tube 46. Then, the liquid ejected from discharge end 452 of nozzle 45 is brought into contact with teeth, a tongue, and the like in the oral cavity, so that dirt in the oral cavity can be cleaned.

Example of Shaver Head

It is also possible that electric toothbrush 1 includes shaver head 50 which is a head having a function of cutting hair.

Figure 33:
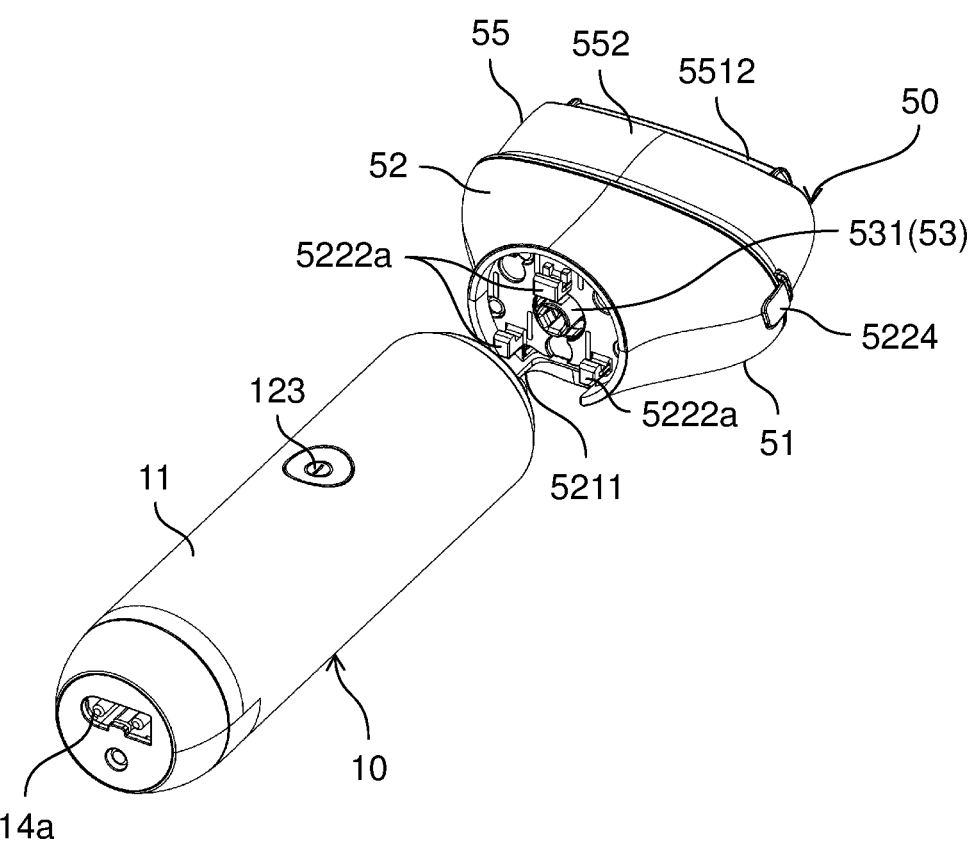
FIG. 33 is a perspective view schematically showing a state where an example of a shaver head is to be attached to the body.
Figure 36:
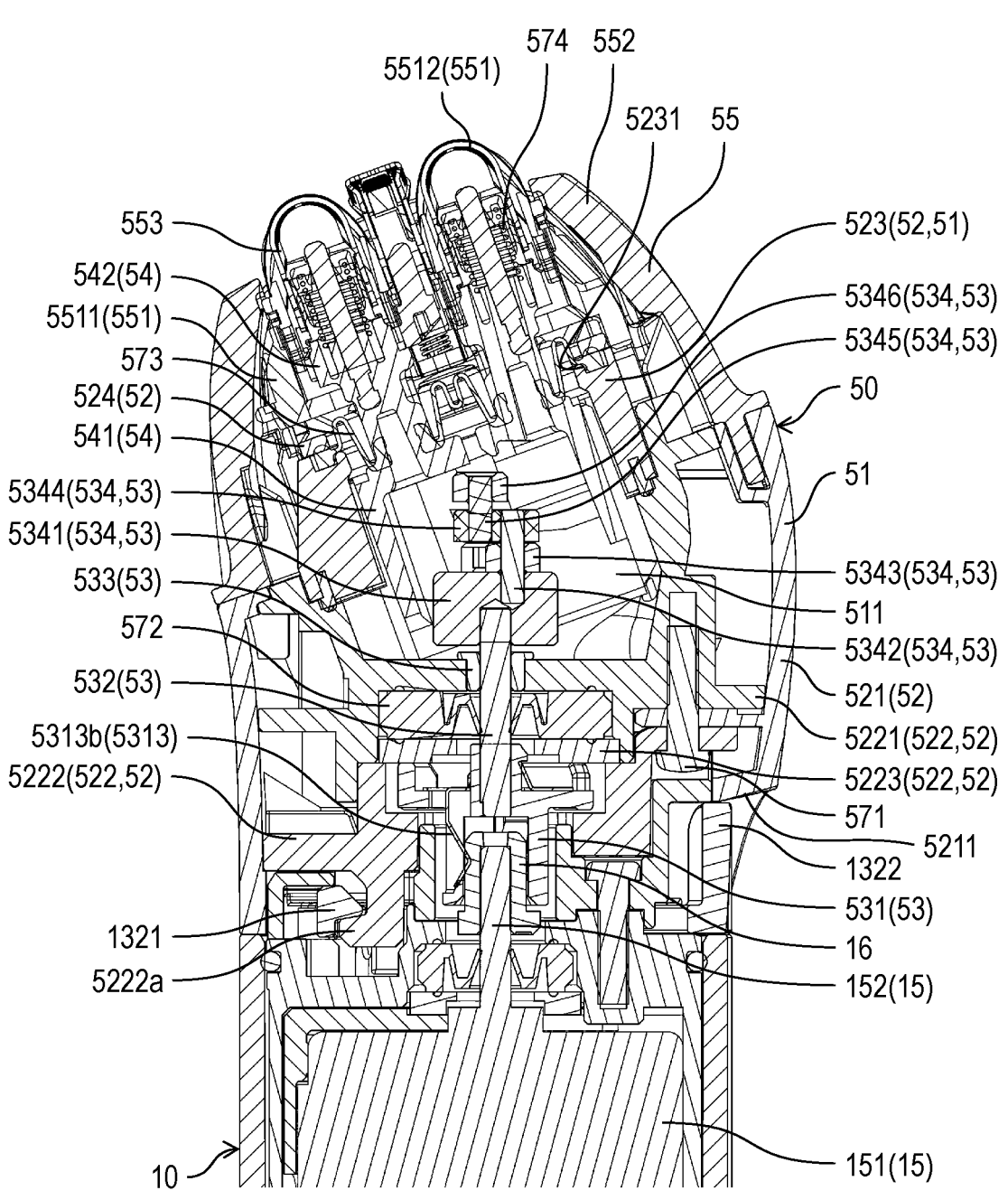
FIG. 36 is a side sectional view schematically showing an example of the shaver head attached to the body in an enlarged manner.
Figure 37:
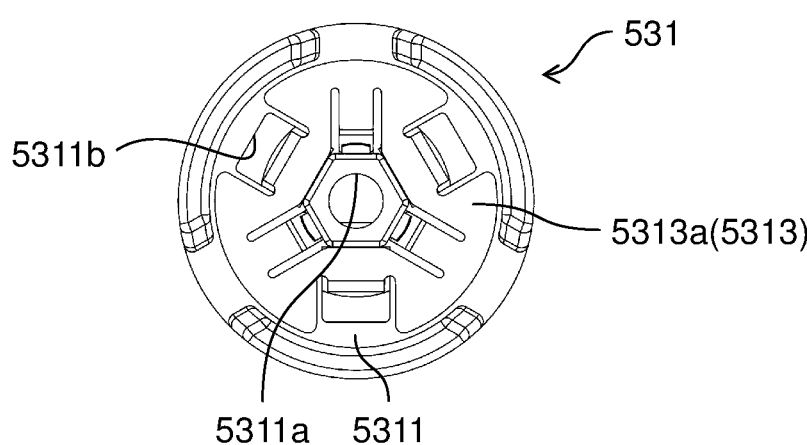
FIG. 37 is a plan view schematically illustrating an example of a power transmission unit used in the example of the shaver head.
Figure 38:
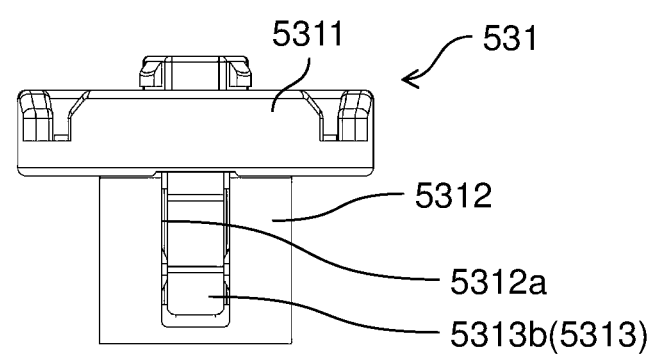
FIG. 38 is a front view schematically illustrating an example of the power transmission unit used in the example of the shaver head.
Figure 39:
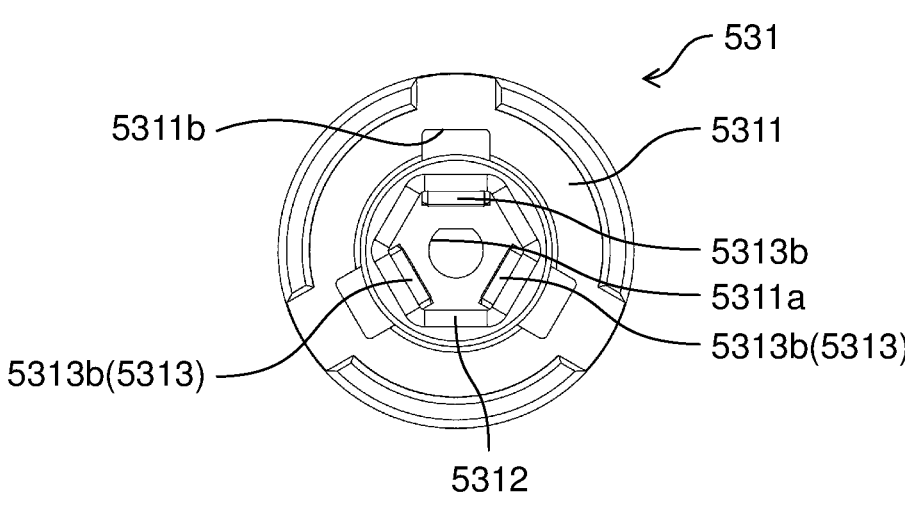
FIG. 39 is a bottom view schematically illustrating an example of the power transmission unit used in an example of the shaver head.
Figure 40:
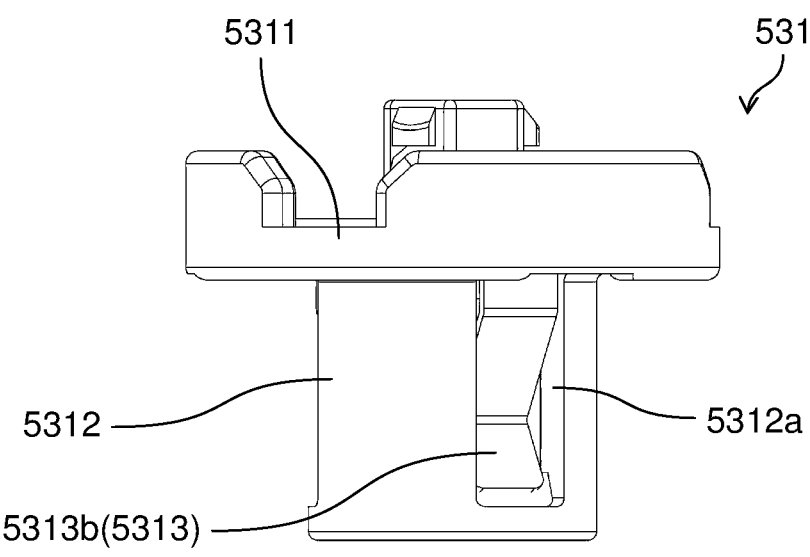
FIG. 40 is a view of an example of the power transmission unit used in an example of the shaver head from a direction different from the front.
Figure 41:
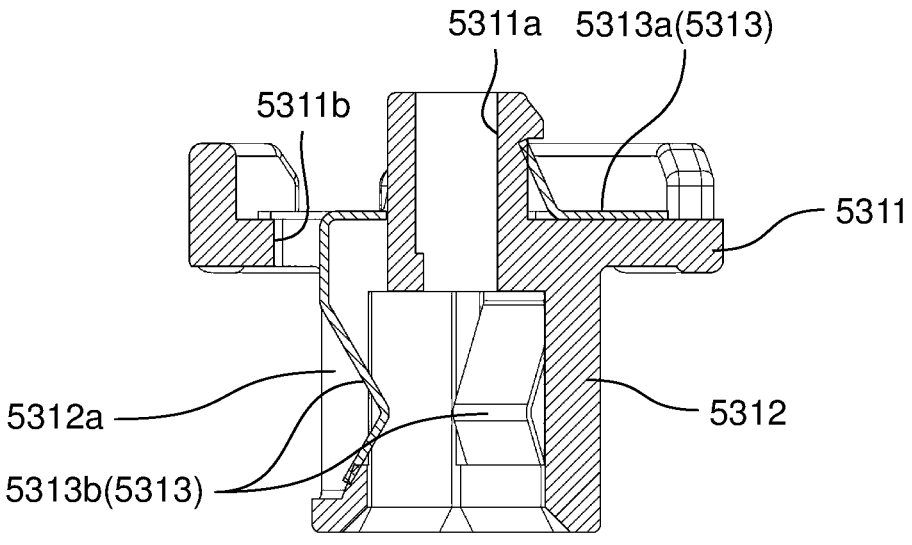
FIG. 41 is a side sectional view schematically illustrating an example of the power transmission unit used in an example of the shaver head.
Figure 42:
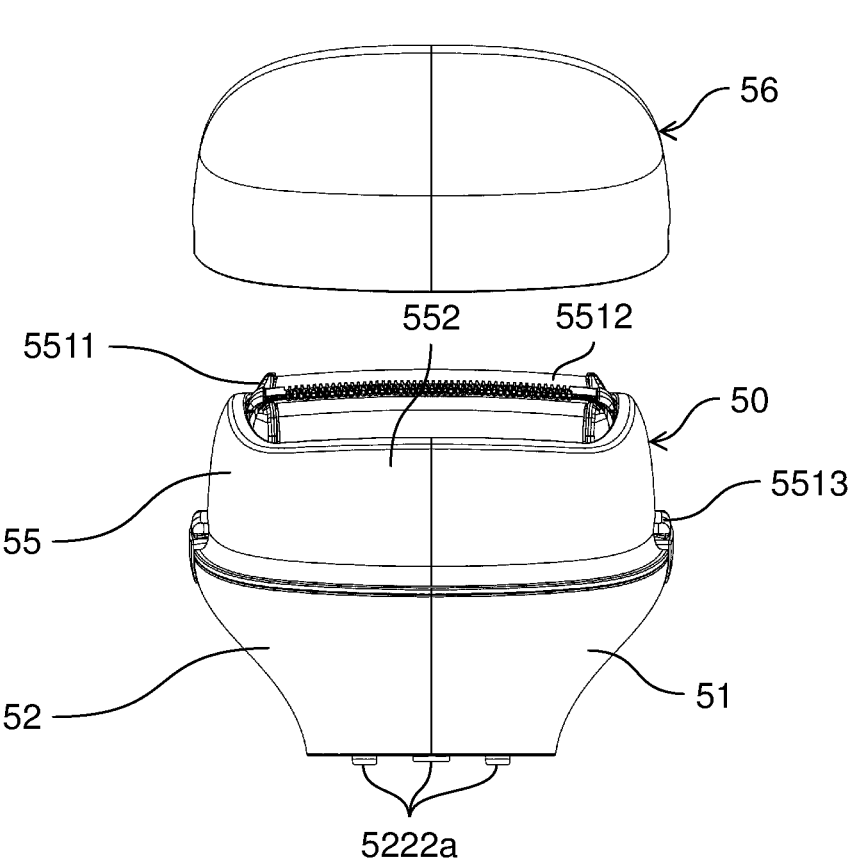
FIG. 42 is a front view schematically showing a state where a cap is to be attached to the shaver head.
Figure 43:
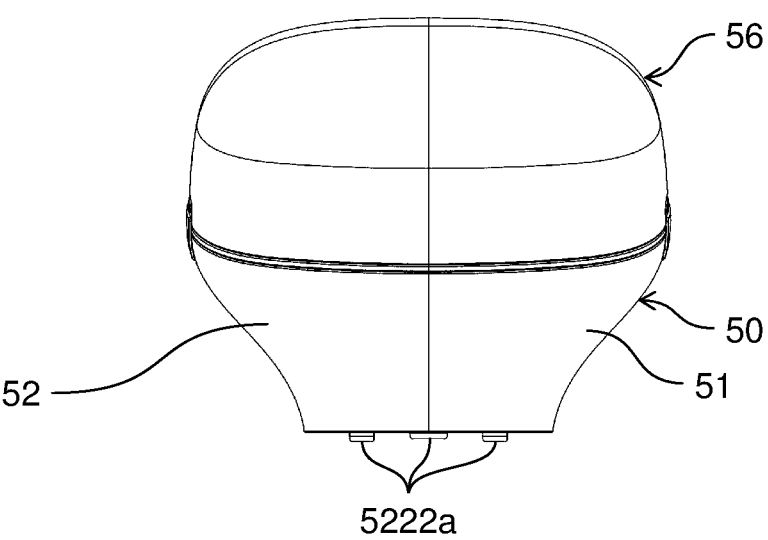
FIG. 43 is a front view schematically showing a state where the cap has been attached to the shaver head.

Hereinafter, a specific configuration of an example of shaver head 50 will be described with reference to FIGS. 33 to 43. FIG. 33 is a perspective view schematically showing a state where an example of shaver head 50 is to be attached to body 10. FIG. 34 is a front view schematically showing a state where an example of shaver head 50 has been attached to body 10. FIG. 35 is a side view schematically showing a state where an example of shaver head 50 has been attached to body 10. FIG. 36 is a side sectional view schematically showing an example of shaver head 50 attached to body 10 in an enlarged manner. FIG. 37 is a plan view schematically illustrating an example of power transmission unit 531 used in an example of shaver head 50. FIG. 38 is a front view schematically illustrating an example of power transmission unit 531 used in an example of shaver head 50. FIG. 39 is a bottom view schematically illustrating an example of power transmission unit 531 used in an example of shaver head 50. FIG. 40 is a view of an example of power transmission unit 531 used in an example of shaver head 50 from a direction different from the front. FIG. 41 is a side sectional view schematically illustrating an example of power transmission unit 531 used in an example of shaver head 50. FIG. 42 is a front view schematically showing a state where cap 56 is to be attached to shaver head 50. FIG. 43 is a front view schematically showing a state where cap 56 has been attached to shaver head 50.

As illustrated in FIG. 33, shaver head 50 includes head body 51 detachably attached to body 10, and blade frame 55 detachably attached to head body 51.

Head body 51 includes head housing 52 constituting an outer shell of head body 51. Head housing 52 may be formed using, for example, an insulating synthetic resin material.

In addition, head housing 52 is formed by joining a plurality of divided bodies, and containing space 511 is formed inside head housing 52 formed by joining the divided bodies as illustrated in FIG. 36. Conversion mechanism 534, which will be described later, is contained in containing space 511.

Specifically, head housing 52 includes cylindrical peripheral wall 521 penetrating in the up-down direction, lower lid 522 arranged so as to cover the lower opening of peripheral wall 521, and upper lid 523 arranged so as to cover the upper opening of peripheral wall 521. Further, head housing 52 further includes upper retaining plate 524 that presses upper waterproof rubber 573 sandwiched between head housing 52 and upper lid 523 from above.

Cutout 5211 is formed at the rear lower end of peripheral wall 521 so that peripheral wall 521 does not interfere with restriction wall 1331c (see FIG. 20) and vertical wall 1322 of body 10 when shaver head 50 is attached to body 10. In addition, restriction wall 1331c, vertical wall 1322, and cutout 5211 define one mounting direction of shaver head 50 when shaver head 50 is attached to body 10.

In addition, lower lid 522 is a wall arranged so as to cover the lower opening of cylindrical peripheral wall 521, and includes partition wall 5221 that defines containing space 511 and lower retaining plate 5222 that is arranged below partition wall 5221 and holds power transmission unit 531 from below.

Lower lid 522 is attached to peripheral wall 521 by fixing partition wall 5221 and lower retaining plate 5222 with screw 571 in a state where the wall protruding to the inside of peripheral wall 521 is sandwiched between partition wall 5221 and lower retaining plate 5222.

Lower retaining plate 5222 is provided three hooks 5222a (that is, one example of fitting member) so as to protrude downward. These three hooks 5222a are provided at positions corresponding to three hooks 1321 of body 10, respectively, and are each provided so that a portion to be hooked by hooking hook 1321 protrudes forward in the front-rear direction.

Then, power transmission unit 531 of power transmission mechanism 53 is held at the central portion of lower retaining plate 5222 so as to be surrounded by three hooks 5222a.

As illustrated in FIGS. 37 to 41, power transmission unit 531 includes top wall 5311 and peripheral wall 5312 which is provided continuously so as to protrude downward from the center of top wall 5311.

Insertion hole 5311a into which operation shaft 532 of power transmission mechanism 53 is inserted and fixed is formed at the center of top wall 5311.

In addition, in a bottom view of shaver head 50 (that is, in a state where the head is viewed from the lower side in the up-down direction), a polygonal space such as a regular hexagon is formed inside peripheral wall 5312 so as to open downward. The polygonal space such as a regular hexagon is formed to have substantially the same size as the outer diameter of drive shaft 16, and when shaver head 50 is attached to body 10, drive shaft 16 is inserted into the polygonal space such as a regular hexagon.

Power transmission unit 531 further includes leaf spring 5313 (that is, one example of elastic member) capable of elastically holding drive shaft 16. Leaf spring 5313 (that is, one example of elastic member) is formed separately from the main body of power transmission unit 531 including top wall 5311 and peripheral wall 5312, and power transmission unit 531 is formed by attaching leaf spring 5313 (that is, one example of elastic member) to the main body of power transmission unit 531.

Leaf spring 5313 (that is, one example of elastic member) includes top plate 5313a arranged on top wall 5311. Three spring pieces 5313b are formed on top plate 5313a so as to be arranged at equal intervals in the circumferential direction in plan view. Note that spring piece 5313b is formed by bending an outer peripheral end of top plate 5313a downward.

Insertion hole 5311b through which spring piece 5313b is inserted is formed in top wall 5311, and leaf spring 5313 (that is, one example of elastic member) is attached to the main body of power transmission unit 531 by inserting spring piece 5313b into insertion hole 5311b from above. At this time, the bent portion of each spring piece 5313b protrudes radially inward from cutout 5312a formed in peripheral wall 5312 so as to communicate with insertion hole 5311b.

In such a manner, when drive shaft 16 is inserted into a polygonal space such as a regular hexagon, the side surface of drive shaft 16 is elastically held by three spring pieces 5313b, and dimensional variations of drive shaft 16 and power transmission unit 531 are absorbed.

As illustrated in FIG. 36, shaver head 50 is provided with power transmission mechanism 53, which has power transmission unit 531 described above, and is capable of transmitting power of rotary motor 15 (that is, rotational force). Power transmission mechanism 53 is held by lower lid 522.

Power transmission mechanism 53 includes operation shaft 532 attached to power transmission unit 531 to operate. Operation shaft 532 is inserted into and fixed to insertion hole 5311a formed in the upper portion of power transmission unit 531, and rotates together with power transmission unit 531 that rotates by power of rotary motor 15 transmitted from drive shaft 16 (that is, by rotational force). Further, operation shaft 532 is held by bearing 533.

Note that, power transmission mechanism 53 is held by lower lid 522 in a state where the upper end of operation shaft 532 is arranged in containing space 511. Specifically, power transmission unit 531 is sandwiched between partition wall 5221 and lower retaining plate 5222, so that power transmission mechanism 53 is held by partition wall 5221 and lower retaining plate 5222. At this time, power transmission mechanism 53 is held in a state where a gap between operation shaft 532 and partition wall 5221 is sealed with waterproof rubber 572 and retaining plate 5223. In such a manner, water entrance from below into containing space 511 partitioned by partition wall 5221 may be suppressed.

In addition, power transmission mechanism 53 includes a conversion mechanism 534 that is attached to operation shaft 532 and converts the rotational motion into a reciprocating linear motion in the width direction, and conversion mechanism 534 is connected to a drive mechanism 54, which will be described later. That is, conversion mechanism 534 is interposed between operation shaft 532 and drive mechanism 54. In such a manner, two drivers 541 (that is, one example of acting member) included in drive mechanism 54 are reciprocated linearly in opposite phases in the width direction by the power of rotary motor 15.

Conversion mechanism 534 includes lower base 5341 attached to the upper end of operation shaft 532. Lower base 5341 is attached to operation shaft 532 so as to rotate together with operation shaft 532.

In addition, conversion mechanism 534 includes lower eccentric shaft 5342 attached to lower base 5341 in a state of being eccentric with respect to operation shaft 532, and lower connecting arm 5343 attached to lower eccentric shaft 5342 and connected to one driver 541 (that is, one example of acting member).

Further, conversion mechanism 534 includes upper base 5344 attached to lower eccentric shaft 5342. In addition, conversion mechanism 534 includes upper eccentric shaft 5345 attached to upper base 5344 in a state of being eccentric with respect to operation shaft 532, and upper connecting arm 5346 attached to upper eccentric shaft 5345 and connected to another driver 541 (that is, one example of acting member).

Drivers 541 (that is, one example of acting member) are respectively connected to lower connecting arm 5343 and upper connecting arm 5346. At this time, lower eccentric shaft 5342 and upper eccentric shaft 5345 are provided with a phase difference of 180° around the rotation axis of rotary motor 15. In such a manner, the rotational motion of rotary motor 15 is converted into reciprocating motion in opposite phases of two drivers 541 (that is, one example of acting member).

Drive mechanism 54 includes two drivers 541 (that is, one example of acting member) respectively connected to lower connecting arm 5343 and upper connecting arm 5346, and inner blade attachment portion 542 provided in each driver 541 (that is, one example of acting member) and to which inner blade 553 is detachably attached. Inner blade attachment portion 542 is respectively provided with push-up spring 574 (that is, one example of biasing member) that press inner blade 553 attached to inner blade attachment portion 542 upward (that is, biasing upward).

In a state where conversion mechanism 534 and drive mechanism 54 are arranged in containing space 511, the upper opening of cylindrical peripheral wall 521 is covered by upper lid 523.

Two through-holes 5231 into which inner blade attachment portions 542 are inserted are formed in upper lid 523, and upper lid 523 is arranged so as to cover the upper opening of cylindrical peripheral wall 521 in a state where inner blade attachment portion 542 is inserted into through-hole 5231.

At this time, the gap between through-hole 5231 and inner blade attachment portion 542 is sealed with upper waterproof rubber 573. Upper waterproof rubber 573 is sandwiched between upper lid 523 and upper retaining plate 524. Then, by sealing the gap between through-hole 5231 and inner blade attachment portion 542 with upper waterproof rubber 573, water entrance from above into containing space 511 may be suppressed.

As described above, shaver head 50 has a waterproof function so that the operations of conversion mechanism 534 and drive mechanism 54 contained in containing space 511 are not hindered. Note that portions of drive mechanism 54 are arranged in containing space 511 except for the members other than inner blade attachment portion 542. In such a manner, performance degradation of shaver head 50 can be more reliably suppressed.

Blade frame 55 is detachably attached to head body 51 having such a configuration.

As illustrated in FIGS. 34 and 35, blade frame 55 includes a substantially box-shaped outer blade cassette 551 to which three outer blades 5512 are attached, and cylindrical outer peripheral frame 552 that covers the entire circumference of outer blade frame 5511 (see FIG. 36) of outer blade cassette 551 by containing and mounting outer blade cassette 551 from below.

Outer blade cassette 551 includes three outer blades 5512 arranged parallel in the front-rear direction. Outer blade 5512 has a plurality of blade holes (not illustrated) defined therein. Outer blade cassette 551 is formed by engaging three outer blades 5512 with outer blade frame 5511 (see FIG. 36) to be vertically movable independently of one another.

On the other hand, outer peripheral frame 552 is formed so that the upper end opening is smaller than the outer shape of outer blade frame 5511 of outer blade cassette 551 (see FIG. 36) and larger than the outer shape of the entire blade surface of outer blade 5512 (that is, blade surface formed by three outer blades 5512). In addition, the lower end opening is formed so as to be larger than the outer shape of outer blade frame 5511 (see FIG. 36). In such a manner, outer blade cassette 551 is mounted on outer peripheral frame 552 in a state where removal of outer-blade cassette is suppressed.

As illustrated in FIG. 36, inner blades 553 dedicated to respective outer blades 5512 are arranged, and detachably attached to inner blade attachment portion 542 of driver 541 (that is, one example of acting member). Note that two inner blade attachment portions 542 are provided on either one driver 541 (that is, one example of acting member) of two drivers 541 (that is, one example of acting member). Inner blades 553 corresponding to outer blade 5512 arranged on one side and outer blade 5512 arranged at the center are respectively attached on two inner blade attachment portions 542 provided on one driver 541 (that is, one example of acting member). Therefore, when drive mechanism 54 is driven, three inner blades 553 reciprocate in the width direction, following the movement of drivers 541 (that is, one example of acting member) to which respective inner blades 553 are attached.

Then, when drive mechanism 54 is driven with blade frame 55 attached to head body 51, inner blades 553 arranged below outer blades 5512 (that is, inward) move relative to outer blades 5512 (that is, reciprocate in the width direction) respectively. As described above, shaver head 50 is configured to cut hair inserted into the blade holes of outer blades 5512 in collaboration with corresponding outer blade 5512 and inner blade 553.

Note that, as illustrated in FIG. 35, head housing 52 is provided with release button 5224 for releasing the attachment of head body 51 and blade frame 55. Outer blade cassette 551 is provided with release button 5513 for releasing attachment between outer blade cassette 551 and outer peripheral frame 552.

Further, as illustrated in FIGS. 42 and 43, shaver head 50 includes cap 56 capable of covering outer blade 5512 exposed to the outside. When not in use, such as when carrying, outer blade 5512, which is the functional part of shaver head 50, is protected by attaching cap 56.

Next, an example of a method of using shaver head 50 having such a configuration will be described.

First, shaver head 50 is attached to body 10, and power transmission unit 531 is attached to drive shaft 16. Then, in this state, drive shaft 16 is rotated by pressing power switch 123 to drive rotary motor 15.

In such a manner, the rotation of drive shaft 16 is transmitted to power transmission unit 531, and power transmission unit 531 rotates together with drive shaft 16. At this time, operation shaft 532 attached to power transmission unit 531, lower base 5341 attached to operation shaft 532, and lower eccentric shaft 5342 attached to lower base 5341 also rotate together with power transmission unit 531. Then, as lower eccentric shaft 5342 rotates, lower connecting arm 5343 attached to lower eccentric shaft 5342 reciprocates linearly in the width direction.

In addition, upper base 5344 attached to lower eccentric shaft 5342 and upper eccentric shaft 5345 attached to upper base 5344 also rotate, following the rotation of drive shaft 16. Then, when upper eccentric shaft 5345 rotates, upper connecting arm 5346 attached to upper eccentric shaft 5345 also reciprocates linearly in the width direction.

As described above, when lower connecting arm 5343 and upper connecting arm 5346 reciprocate linearly in the width direction, driver 541 (that is, one example of acting member) and inner blade 553 connected to lower connecting arm 5343 and upper connecting arm 5346 also reciprocate linearly in the width direction.

In such a manner, hair inserted into the blade holes of outer blades 5512 may be cut in collaboration with corresponding outer blades 5512 and inner blades 553.

Example of Beard Trimmer Head

In addition, electric toothbrush 1 may include beard trimmer head 60, which is a head having a function of cutting hair.

Figure 44:
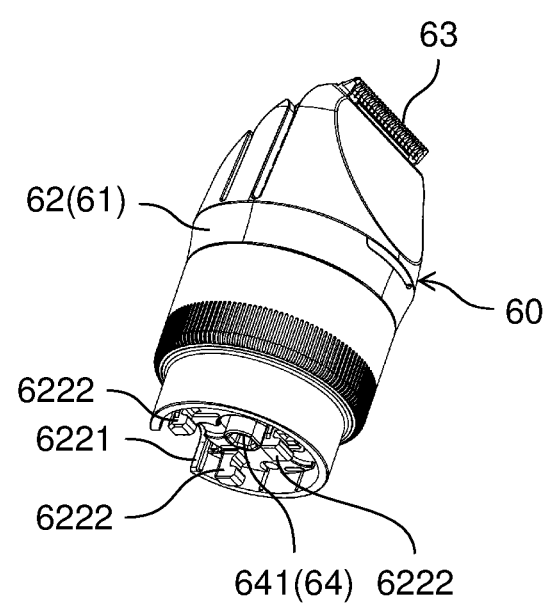
FIG. 44 is a perspective view schematically showing a state where an example of a beard trimmer head is to be attached to the body.
Figure 44:
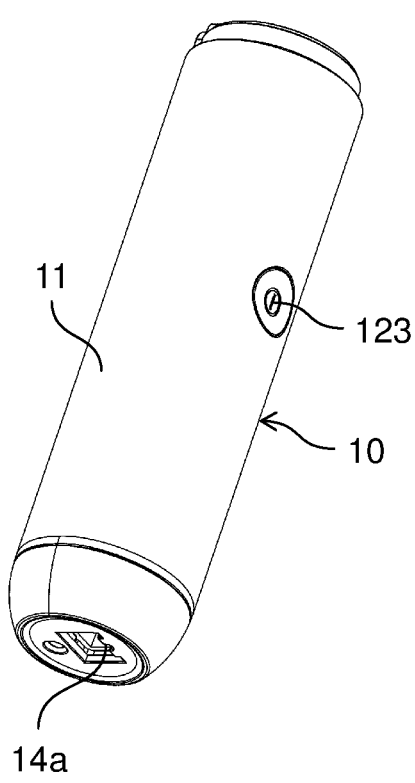
Figures 45, 46:
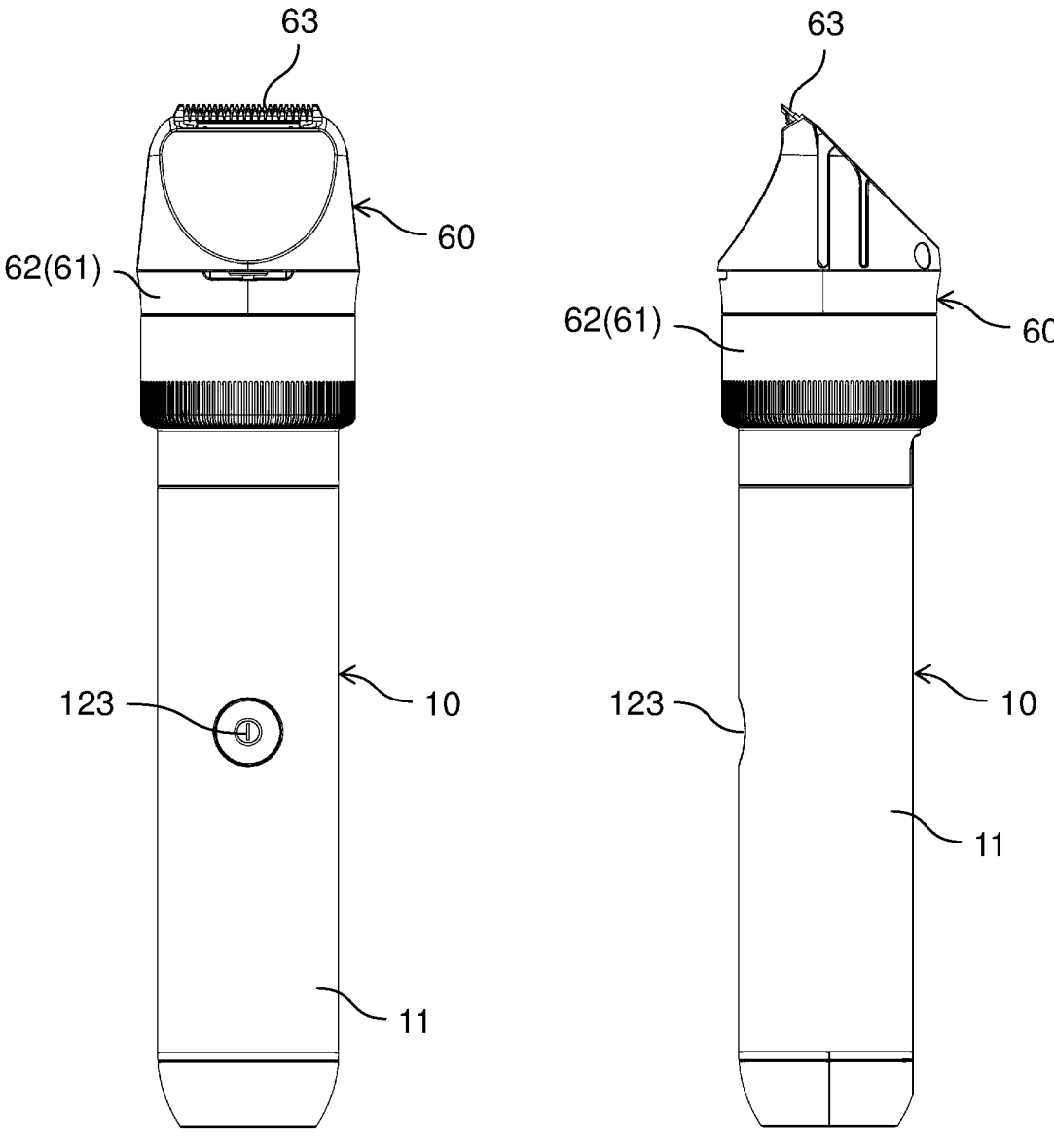
FIG. 45 is a front view schematically showing a state where an example of the beard trimmer head has been attached to the body.
FIG. 46 is a side view schematically showing a state where an example of the beard trimmer head has been attached to the body.
Figure 47:
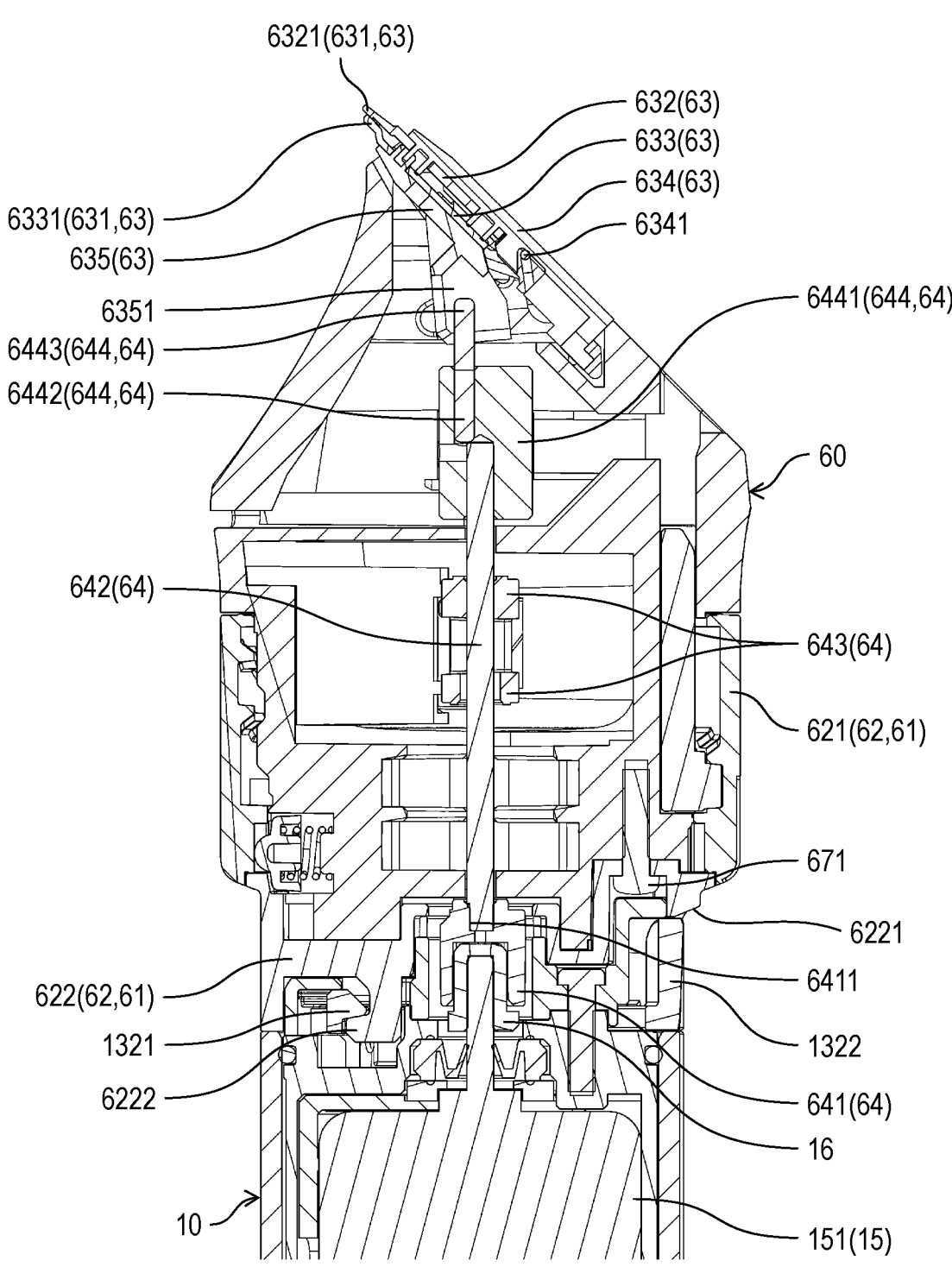
FIG. 47 is a side sectional view schematically showing an example of the beard trimmer head attached to the body in an enlarged manner.
Figures 48, 49, 50:
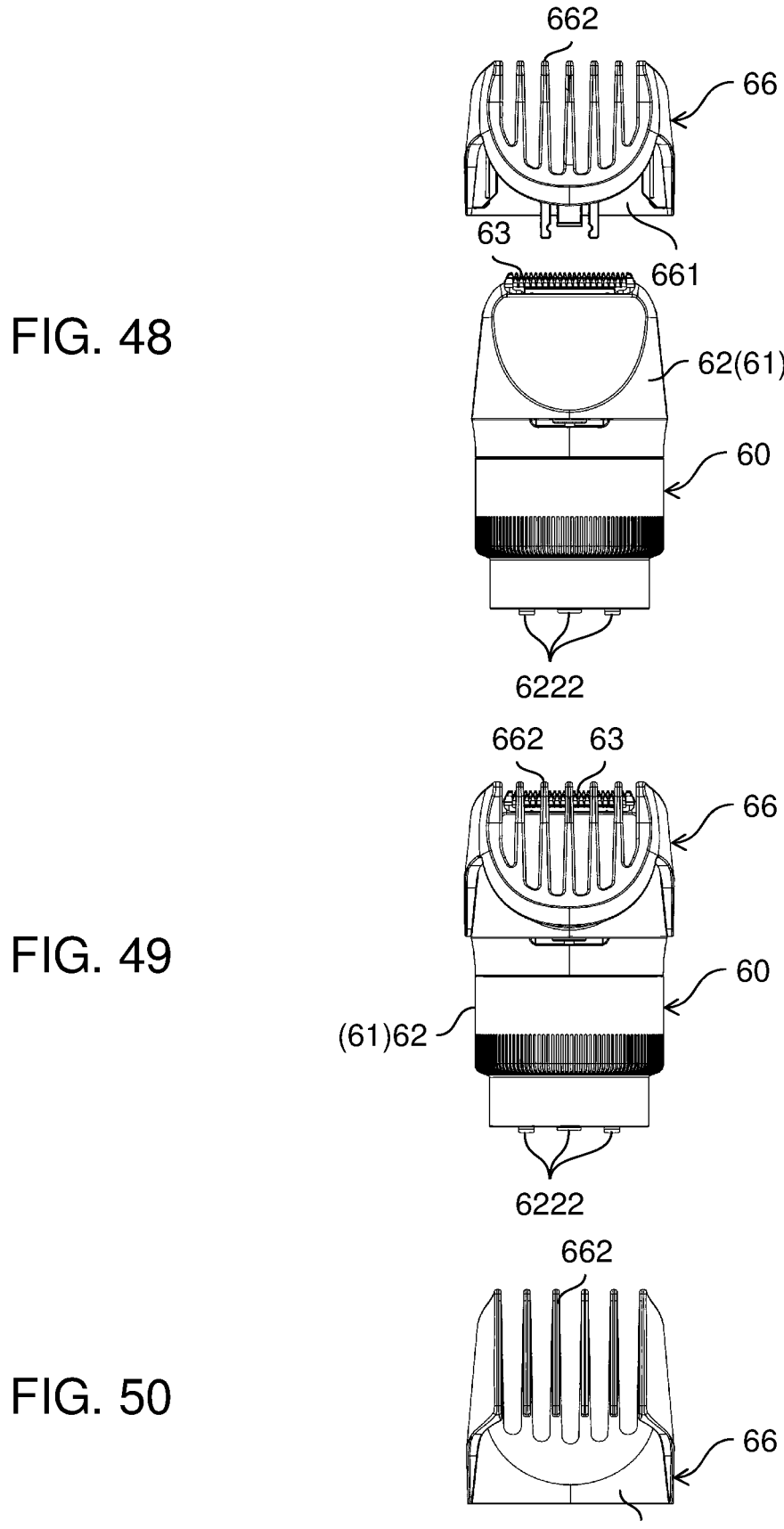
FIG. 48 is a front view schematically showing a state where an example of an attachment is to be attached to the beard trimmer head.
FIG. 49 is a front view schematically showing a state where an example of the attachment has been attached to the beard trimmer head.
FIG. 50 is a front view schematically showing another example of the attachment attached to the beard trimmer head.

Hereinafter, a specific configuration of an example of beard trimmer head 60 will be described with reference to FIGS. 44 to 50. FIG. 44 is a perspective view schematically showing a state where an example of beard trimmer head 60 is to be attached to body 10. FIG. 45 is a front view schematically showing a state where an example of beard trimmer head 60 has been attached to body 10. FIG. 46 is a side view schematically showing a state where an example of beard trimmer head 60 has been attached to body 10. FIG. 47 is a side sectional view schematically showing an example of beard trimmer head 60 attached to body 10 in an enlarged manner. FIG. 48 is a front view schematically showing a state where an example of attachment 66 is to be attached to beard trimmer head 60. FIG. 49 is a front view schematically showing a state where an example of attachment 66 has been attached to beard trimmer head 60. FIG. 50 is a front view schematically showing another example of attachment 66 attached to beard trimmer head 60.

Beard trimmer head 60 is used, for example, when cutting hair in a relatively narrow portion.

As illustrated in FIG. 44, beard trimmer head 60 includes head body 61 detachably attached to body 10, and blade unit 63 detachably attached to head body 61.

Head body 61 includes head housing 62 constituting an outer shell of head body 61. Head housing 62 may be formed using, for example, an insulating synthetic resin material.

In addition, head housing 62 is formed by joining a plurality of divided bodies, and a cavity is formed inside head housing 62 formed by joining the divided bodies. As illustrated in FIG. 47, conversion mechanism 644, which will be described later, is contained in the cavity.

Head housing 62 includes upper wall 621 that opens downward and lower lid 622 that is arranged so as to cover the lower opening of upper wall 621. Note that lower lid 622 is fixed to upper wall 621 with screw 671.

Cutout 6221 is formed at the rear lower end of lower lid 622 so that lower lid 622 does not interfere with restriction wall 1331c (see FIG. 20) and vertical wall 1322 of body 10 when beard trimmer head 60 is attached to body 10. In addition, restriction wall 1331c, vertical wall 1322, and cutout 6221 determine one attachment direction of beard trimmer head 60 when beard trimmer head 60 is attached to body 10.

Lower lid 622 is a wall arranged so as to cover the lower opening of upper wall 621, and three hooks 6222 (that is, one example of fitting member) are provided on lower lid 622 so as to protrude downward. These three hooks 6222 are provided at positions corresponding to three hooks 1321 of body 10, respectively, and are each provided so that a portion to be hooked by hooking hook 1321 protrudes forward in the front-rear direction.

Then, lower lid 622 holds power transmission unit 641 of power transmission mechanism 64 so as to be surrounded by three hooks 6222. In a bottom view of beard trimmer head 60 (that is, in a state where the head is viewed from the lower side in the up-down direction), a polygonal space such as a regular hexagon is formed inside power transmission unit 641 so as to open downward. The polygonal space such as a regular hexagon is formed to have substantially the same size as the outer diameter of drive shaft 16, and when beard trimmer head 60 is attached to body 10, drive shaft 16 is inserted into the polygonal space such as a regular hexagon.

Beard trimmer head 60 is provided with power transmission mechanism 64, which has power transmission unit 641, which will be described above, and is capable of transmitting power of rotary motor 15 (that is, rotational force).

Power transmission mechanism 64 includes operation shaft 642 attached to power transmission unit 641 to operate. Operation shaft 642 is inserted into and fixed to insertion hole 6411 formed in the upper portion of power transmission unit 641, and rotates together with power transmission unit 641 that rotates by power of rotary motor 15 transmitted from drive shaft 16 (that is, by rotational force). Further, operation shaft 642 is held by bearing 643.

Note that power transmission mechanism 64 is held by upper wall 621 in a state where the upper end of operation shaft 642 is arranged in a cavity in which conversion mechanism 644 is contained.

In addition, power transmission mechanism 64 includes conversion mechanism 644 that is attached to operation shaft 642 and converts the rotational motion into a reciprocating linear motion in the width direction, and conversion mechanism 644 is connected to holding plate 635 (that is, one example of acting member), which will be described later. That is, conversion mechanism 644 is interposed between operation shaft 642 and holding plate 635 (that is, one example of acting member). In such a manner, holding plate 635 (that is, one example of acting member) is reciprocated linearly in the width direction by the power of rotary motor 15.

Conversion mechanism 644 includes base 6441 attached to the upper end of operation shaft 642. Base 6441 is attached to operation shaft 642 so as to rotate together with operation shaft 642.

In addition, conversion mechanism 644 includes eccentric shaft 6442 attached to base 6441 in a state of being eccentric with respect to operation shaft 642, and link 6443 attached to eccentric shaft 6442 and connected to connection portion 6351 of holding plate 635 (that is, one example of acting member).

In such a manner, the rotational motion of rotary motor 15 is converted into the reciprocating motion in the width direction of holding plate 635 (that is, one example of acting member).

Then, as illustrated in FIGS. 44 to 47, blade unit 63 is detachably attached to head body 61 having such a configuration.

As illustrated in FIG. 47, blade unit 63 is provided with blade 631, and has a function of cutting hair. Note that, in beard trimmer head 60, the width of blade 631 is smaller than the diameter of body 10.

Blade 631 includes fixed blades 6321 and movable blades 6331 that reciprocate and slide with respect to fixed blades 6321. Then, movable blades 6331 are configured to reciprocate in the width direction with respect to fixed blades 6321.

Specifically, blade unit 63 includes fixing plate 632 on which a plurality of fixed blades 6321 are formed, and movable plate 633 on which a plurality of movable blades 6331 are formed. In addition, blade unit 63 includes frame 634 that supports fixing plate 632 and holding plate 635 that supports movable plate 633. Blade unit 63 further includes spring 6341 that is attached to frame 634 and presses movable plate 633 against fixing plate 632 to bring fixed blades 6321 and movable blades 6331 into contact with each other.

Fixing plate 632 and movable plate 633 are arranged to face each other in the front-rear direction. In addition, frame 634 supports fixing plate 632 from the rear side (that is, from the side opposite to the side where movable plate 633 is arranged with respect to fixing plate 632). In such a manner, positional displacement of fixing plate 632 is suppressed. In addition, holding plate 635 supports movable plate 633 from the front side (that is, from the side opposite to the side where fixing plate 632 is arranged with respect to movable plate 633). In such a manner, positional displacement of movable plate 633 is suppressed.

Note that, as spring 6341 that brings fixed blades 6321 and movable blades 6331 into contact with each other, for example, a torsion spring may be used, and spring 6341 used as the torsion spring is attached to frame 634.

In addition, holding plate 635 is provided with connection portion 6351, and link 6443 of the conversion mechanism 644 is connected to connection portion 6351 in a state where blade unit 63 is attached to head body 61. In such a manner, when rotary motor 15 is driven, only the force in the width direction of blade unit 63 is transmitted from link 6443 to connection portion 6351, and movable plate 633 reciprocates in the width direction of blade unit 63 via holding plate 635.

In addition, attachment 66 for adjusting the length of hair to be cut (hereinafter, sometimes referred to as a "cutting length") is capable of being detachably attached to beard trimmer head 60.

Attachment 66 includes wall 661 attached to head body 61, and comb 662 (that is, one example of hair straightening member) provided on wall 661 and capable of guiding hair between fixed blade 6321 and movable blade 6331. By attaching such attachment 66 to head body 61, the distance between the skin and blade 631 is set to a predetermined distance, and hair can be cut at a desired length.

Note that, instead of providing only one attachment 66, a plurality of types of attachments 66 having different lengths (that is, cutting length) of hair to be cut may be provided, and a desired attachment 66 may be selected and used.

For example, attachment 66 illustrated in FIGS. 48 and 49 and attachment 66 illustrated in FIG. 50 having a cutting length different from that of attachment 66 illustrated in FIGS. 48 and 49 can be provided.

Note that, when such attachment 66 is attached to head body 61, blade 631, which is a functional portion of beard trimmer head 60, is also protected by attachment 66.

Next, an example of a method of using beard trimmer head 60 having such a configuration will be described.

As illustrated in FIG. 47, first, beard trimmer head 60 is attached to body 10, and power transmission unit 641 is attached to drive shaft 16. Then, in this state, drive shaft 16 is rotated by pressing power switch 123 to drive rotary motor 15.

In such a manner, the rotation of drive shaft 16 is transmitted to power transmission unit 641, and power transmission unit 641 rotates together with drive shaft 16. At this time, operation shaft 642 attached to power transmission unit 641, base 6441 attached to operation shaft 642, and eccentric shaft 6442 attached to base 6441 also rotate together with power transmission unit 641. When eccentric shaft 6442 rotates, link 6443 attached to eccentric shaft 6442 reciprocates linearly in the width direction.

As described above, when link 6443 reciprocates linearly in the width direction, only the force in the width direction is transmitted from link 6443 to connection portion 6351, and holding plate 635 reciprocates linearly in the width direction. At this time, movable plate 633 supported by holding plate 635 also reciprocates linearly in the width direction, and movable blades 6331 provided on movable plate 633 reciprocate linearly (that is, slide) in the width direction in a state where abutting on fixed blades 6321.

In such a manner, movable blades 6331 and fixed blades 6321 are capable of cutting hair in collaboration.

Example of Beard/Hair Trimmer Head

In addition, electric toothbrush 1 may include beard/hair trimmer head 70, which is a head having a function of cutting hair.

Figure 51:
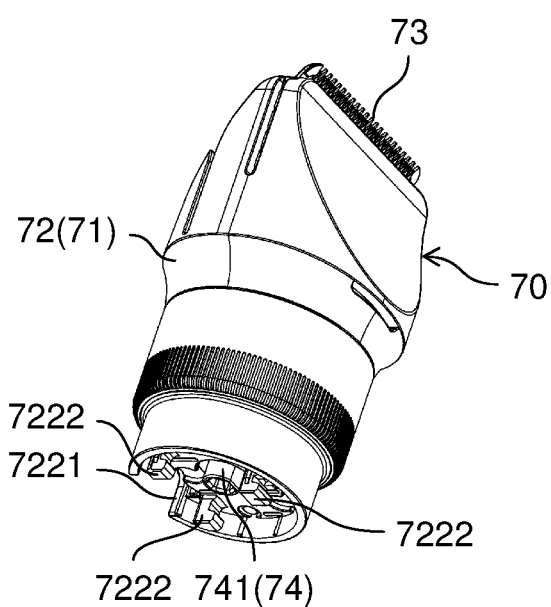
FIG. 51 is a perspective view schematically showing a state where an example of a beard/hair trimmer head is to be attached to the body.
Figure 51:
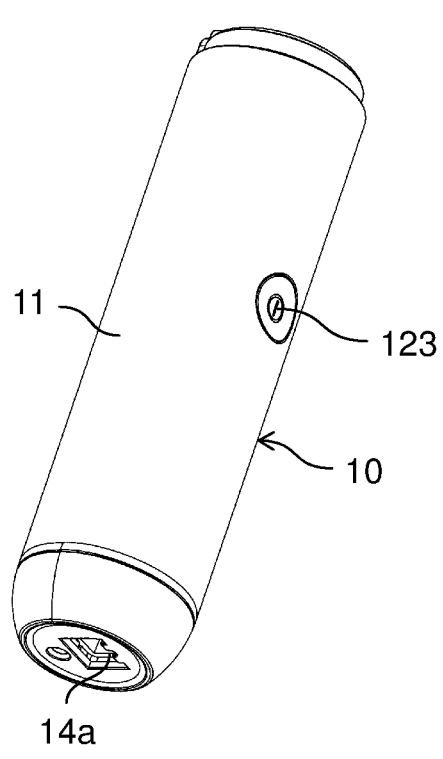
Figure 52:
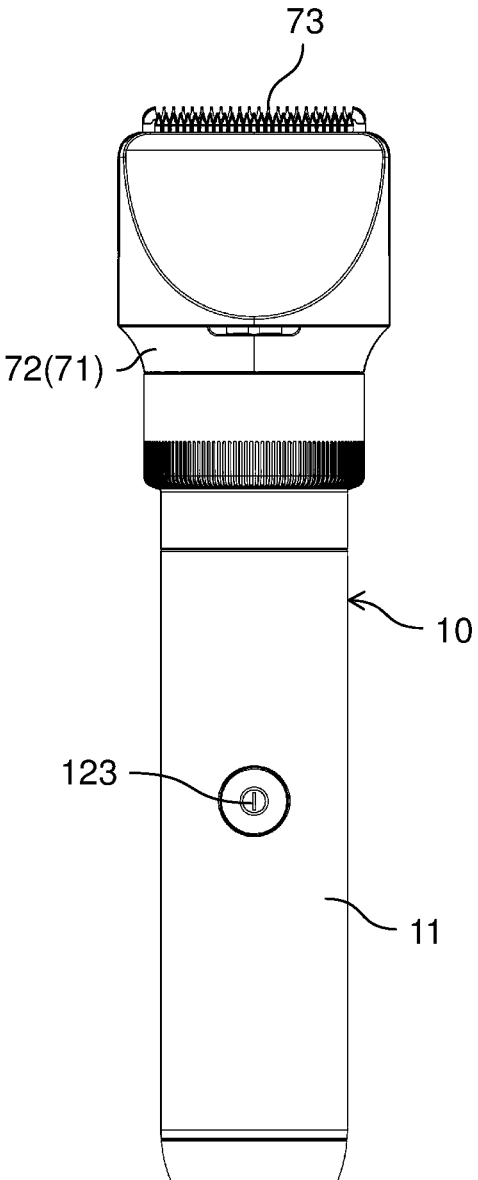
FIG. 52 is a front view schematically showing a state where an example of the beard/hair trimmer head has been attached to the body.
Figure 53:
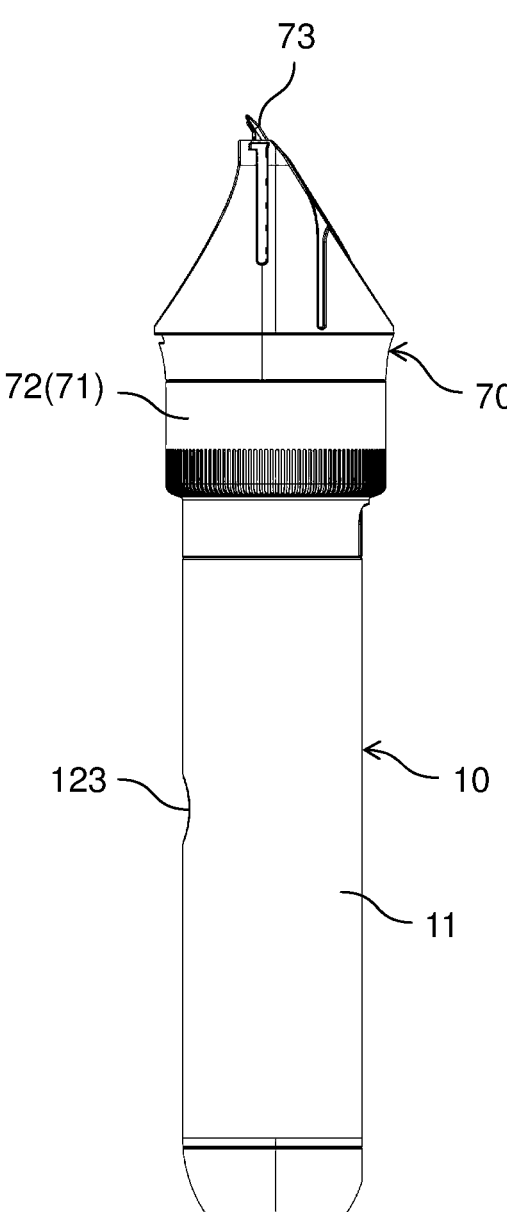
FIG. 53 is a side view schematically showing a state where an example of the beard/hair trimmer head has been attached to the body.
Figure 54:
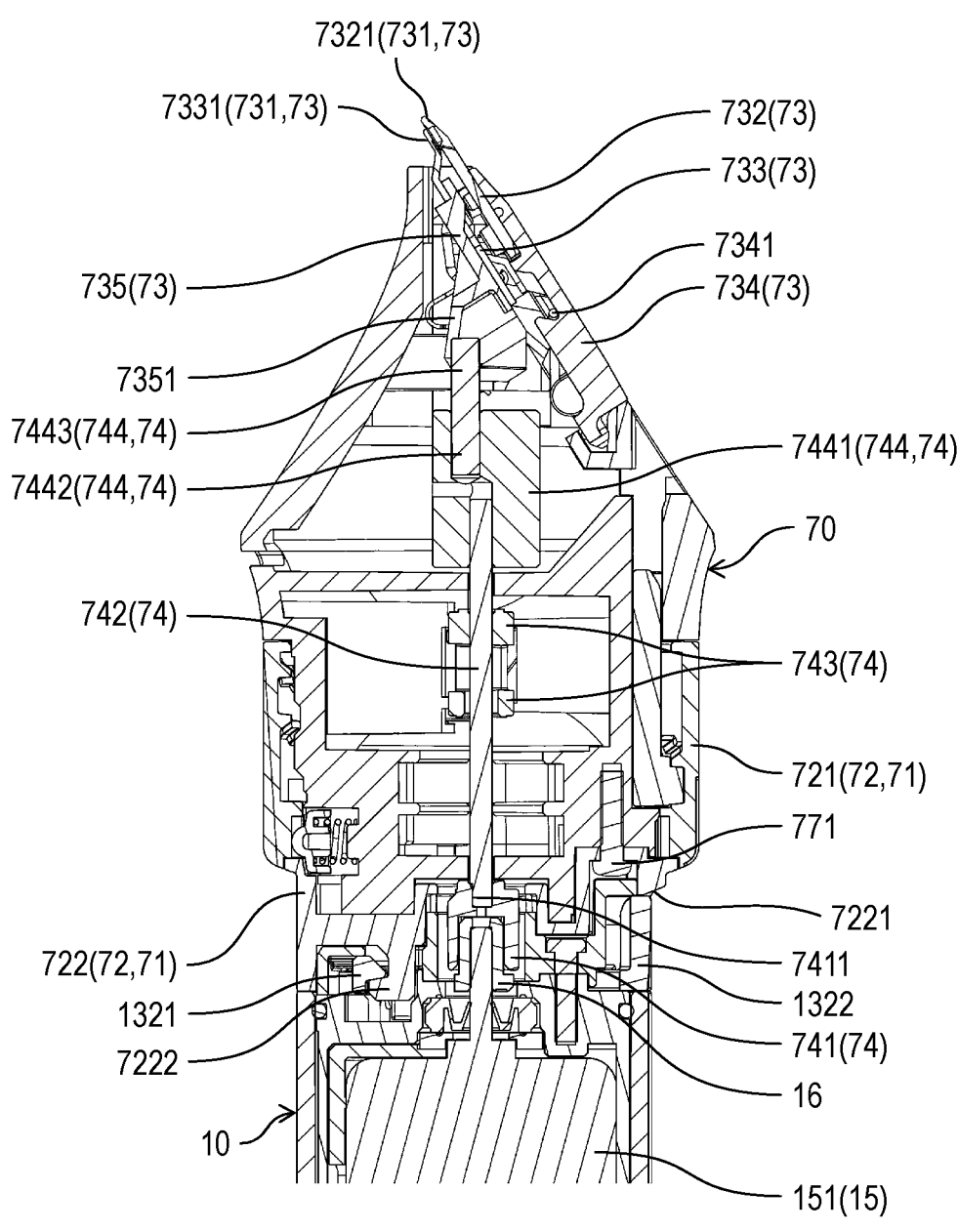
FIG. 54 is a side sectional view schematically showing an example of the beard/hair trimmer head attached to the body in an enlarged manner.
Figure 55:
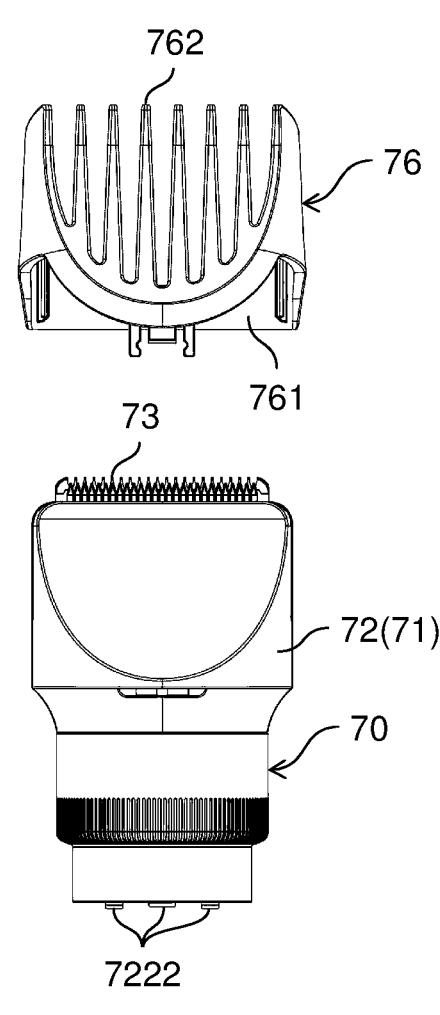
FIG. 55 is a front view schematically showing a state where an example of an attachment is to be attached to the beard/hair trimmer head.
Figure 56:
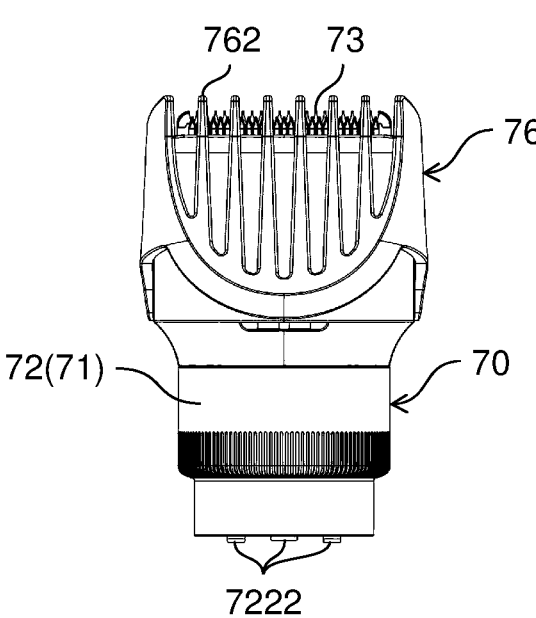
FIG. 56 is a front view schematically showing a state where an example of the attachment has been attached to the beard/hair trimmer head.
Figure 57:
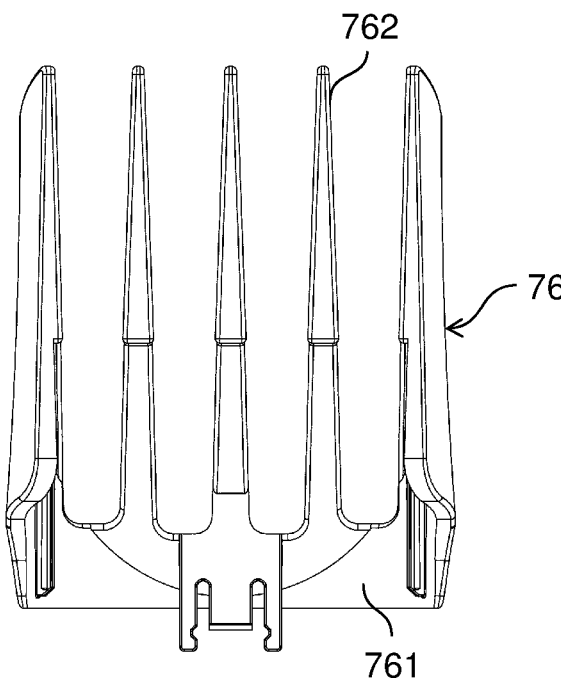
FIG. 57 is a front view schematically showing another example of the attachment attached to the beard/hair trimmer head.
Figure 58:
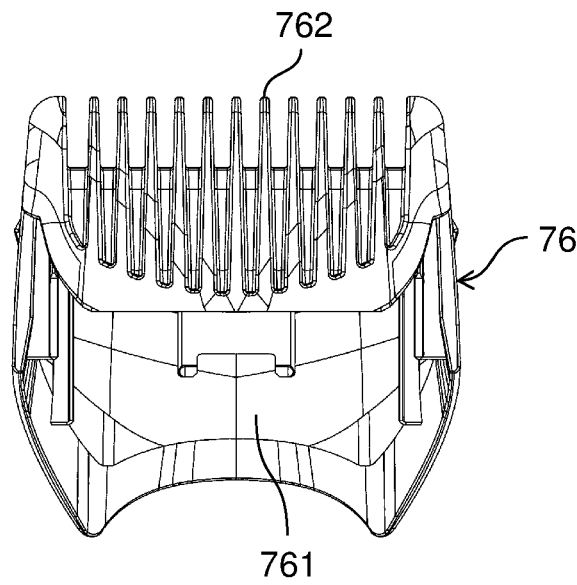
FIG. 58 is a front view schematically showing still another example of the attachment attached to the beard/hair trimmer head.

Hereinafter, a specific configuration of an example of beard/hair trimmer head 70 will be described with reference to FIGS. 51 to 58. FIG. 51 is a perspective view schematically showing a state where an example of beard/hair trimmer head 70 is to be attached to body 10. FIG. 52 is a front view schematically showing a state where an example of beard/hair trimmer head 70 has been attached to body 10. FIG. 53 is a side view schematically showing a state where an example of beard/hair trimmer head 70 has been attached to body 10. FIG. 54 is a side sectional view schematically showing an example of beard/hair trimmer head 70 attached to body 10 in an enlarged manner. FIG. 55 is a front view schematically showing a state where an example of attachment 76 is to be attached to beard/hair trimmer head 70. FIG. 56 is a front view schematically showing a state where an example of attachment 76 has been attached to beard/hair trimmer head 70. FIG. 57 is a front view schematically showing another example of attachment 76 attached to beard/hair trimmer head 70. FIG. 58 is a front view schematically showing still another example of attachment 76 attached to beard/hair trimmer head 70.

Beard/hair trimmer head 70 is used, for example, when efficiently cutting hair in a relatively wide portion.

As illustrated in FIGS. 51 to 56, beard/hair trimmer head 70 includes head body 71 detachably attached to body 10, and blade unit 73 detachably attached to head body 71.

As illustrated in FIGS. 51 to 55, head body 71 includes head housing 72 constituting an outer shell of head body 71. Head housing 72 may be formed using, for example, an insulating synthetic resin material.

In addition, head housing 72 is formed by joining a plurality of divided bodies, and a cavity is formed inside head housing 72 formed by joining the divided bodies. Then, as illustrated in FIG. 54, conversion mechanism 744, which will be described later, is contained in the cavity.

Head housing 72 includes upper wall 721 that opens downward and lower lid 722 that is arranged so as to cover the lower opening of upper wall 721. Note that lower lid 722 is fixed to upper wall 721 with screw 771.

Cutout 7221 is formed at the rear lower end of lower lid 722 so that lower lid 722 does not interfere with restriction wall 1331c (see FIG. 20) and vertical wall 1322 of body 10 when beard/hair trimmer head 70 is attached to body 10. In addition, restriction wall 1331c, vertical wall 1322, and cutout 7221 determine one attachment direction of beard/hair trimmer head 70 when beard/hair trimmer head 70 is attached to body 10.

Lower lid 722 is a wall arranged so as to cover the lower opening of upper wall 721, and three hooks 7222 (that is, one example of fitting member) are provided on lower lid 722 to protrude downward. These three hooks 7222 are provided at positions respectively corresponding to three hooks 1321 of body 10, and are each provided so that a portion to be hooked by hooking hook 1321 protrudes forward in the front-rear direction.

Lower lid 722 holds power transmission unit 741 of power transmission mechanism 74 so as to be surrounded by three hooks 7222. In a bottom view of beard/hair trimmer head 70 (that is, a state where the head is viewed from the lower side in the up-down direction), a polygonal space such as a regular hexagon is formed inside power transmission unit 741 so as to open downward. The polygonal space such as a regular hexagon is formed to have substantially the same size as the outer diameter of drive shaft 16, and when beard/hair trimmer head 70 is attached to body 10, drive shaft 16 is inserted into the polygonal space such as a regular hexagon.

Then, beard/hair trimmer head 70 is provided with power transmission mechanism 74 which has power transmission unit 741, which has been described above, and is capable of transmitting power of rotary motor 15 (that is, rotational force).

Power transmission mechanism 74 includes operation shaft 742 attached to power transmission unit 741 to operate. Operation shaft 742 is inserted into and fixed to insertion hole 7411 formed in the upper portion of power transmission unit 741, and rotates together with power transmission unit 741 that rotates by power of rotary motor 15 transmitted from drive shaft 16 (that is, by rotational force). Further, operation shaft 742 is held by bearing 743.

Note that, power transmission mechanism 74 is held by upper wall 721 in a state where the upper end of operation shaft 742 is arranged in a cavity in which conversion mechanism 744 is contained.

In addition, power transmission mechanism 74 includes conversion mechanism 744 that is attached to operation shaft 742 and converts the rotational motion into a reciprocating linear motion in the width direction, and conversion mechanism 744 is connected to holding plate 735 (that is, one example of acting member), which will be described later. That is, conversion mechanism 744 is interposed between operation shaft 742 and holding plate 735 (that is, one example of acting member). In such a manner, holding plate 735 (that is, one example of acting member) is reciprocated linearly in the width direction by the power of rotary motor 15.

Conversion mechanism 744 includes base 7441 attached to the upper end of operation shaft 742. Base 7441 is attached to operation shaft 742 so as to rotate together with operation shaft 742.

In addition, conversion mechanism 744 includes eccentric shaft 7442 attached to base 7441 in a state of being eccentric with respect to operation shaft 742, and link 7443 attached to eccentric shaft 7442 and connected to connection portion 7351 of holding plate 735 (that is, one example of acting member).

In such a manner, the rotational motion of rotary motor 15 is converted into the reciprocating motion in the width direction of holding plate 735 (that is, one example of acting member).

Blade unit 73 is detachably attached to head body 71 having such a configuration.

Blade unit 73 is provided with blade 731, and has a function of cutting hair. Note that the width of blade 731 is larger than the diameter of body 10 in beard/hair trimmer head 70.

Blade 731 includes fixed blades 7321 and movable blades 7331 that reciprocate and slide with respect to fixed blades 7321. Then, movable blades 7331 are configured to reciprocate in the width direction with respect to fixed blades 7321.

Specifically, blade unit 73 includes fixing plate 732 on which a plurality of fixed blades 7321 are formed, and movable plate 733 on which a plurality of movable blades 7331 are formed. In addition, blade unit 73 includes frame 734 that supports fixing plate 732 and holding plate 735 that supports movable plate 733. Further, blade unit 73 further includes spring 7341 that is attached to frame 734 and presses movable plate 733 against fixing plate 732 to bring fixed blades 7321 and movable blades 7331 into contact with each other.

Fixing plate 732 and movable plate 733 are arranged to face each other in the front-rear direction. In addition, frame 734 supports fixing plate 732 from the rear side (that is, from the side opposite to the side where movable plate 733 is arranged with respect to fixing plate 732). In such a manner, positional displacement of fixing plate 732 is suppressed. In addition, holding plate 735 supports movable plate 733 from the front side (that is, from the side opposite to the side where fixing plate 732 is arranged with respect to movable plate 733). In such a manner, positional displacement of movable plate 733 is suppressed.

Note that, as spring 7341 that brings fixed blades 7321 and movable blades 7331 into contact with each other, for example, a torsion spring may be used, and spring 7341 used as the torsion spring is attached to frame 734.

In addition, holding plate 735 is provided with connection portion 7351, and link 7443 of the conversion mechanism 744 is connected to connection portion 7351 in a state where blade unit 73 is attached to head body 71. In such a manner, when rotary motor 15 is driven, only the force in the width direction of blade unit 73 is transmitted from link 7443 to connection portion 7351, and movable plate 733 reciprocates in the width direction of blade unit 73 via holding plate 735.

In addition, attachment 76 for adjusting the length of hair to be cut (that is, cutting length) is capable of being detachably attached to beard/hair trimmer head 70.

Attachment 76 includes wall 761 mounted on head body 71, and comb 762 (that is, one example of hair straightening member) provided on wall 761 and capable of guiding hair between fixed blade 7321 and movable blade 7331. By attaching such attachment 76 to head body 71, the distance between the skin and blade 731 is set to a predetermined distance, and hair can be cut at a desired length.

Note that, instead of providing only one attachment 76, a plurality of types of attachments 76 having different lengths (that is, cutting length) of hair to be cut may be provided, and a desired attachment 76 may be selected and used.

For example, attachment 76 illustrated in FIGS. 55 and 56 and attachment 76 illustrated in FIG. 57 having a cutting length different from that of the attachment 76 illustrated in FIGS. 55 and 56 may be provided. In addition, attachment 76 illustrated in FIG. 58 having a cutting length different from that of attachment 76 illustrated in FIGS. 55 and 56 and having a cutting length different from that of attachment 76 illustrated in FIG. 57 may be further provided. That is, it is possible to provide at least two attachments 76 among attachment 76 illustrated in FIGS. 55 and 56, attachment 76 illustrated in FIG. 57, and attachment 76 illustrated in FIG. 58.

Note that, when such attachment 76 is attached to head body 71, blade 731, which is a functional portion of beard/hair trimmer head 70, is also protected by attachment 76.

Next, an example of a method of using beard/hair trimmer head 70 having such a configuration will be described.

As illustrated in FIG. 54, first, beard/hair trimmer head 70 is attached to body 10, and power transmission unit 741 is attached to drive shaft 16. Then, in this state, drive shaft 16 is rotated by pressing power switch 123 to drive rotary motor 15.

In such a manner, the rotation of drive shaft 16 is transmitted to power transmission unit 741, and power transmission unit 741 rotates together with drive shaft 16. At this time, operation shaft 742 attached to power transmission unit 741, base 7441 attached to operation shaft 742, and eccentric shaft 7442 attached to base 7441 also rotate together with power transmission unit 741. Then, when eccentric shaft 7442 rotates, link 7443 attached to eccentric shaft 7442 reciprocates linearly in the width direction.

As described above, when link 7443 reciprocates linearly in the width direction, only the force in the width direction is transmitted from link 7443 to connection portion 7351, and holding plate 735 reciprocates linearly in the width direction. At this time, movable plate 733 supported by holding plate 735 also reciprocates linearly in the width direction, and movable blades 7331 provided on movable plate 733 reciprocate linearly (that is, slide) in the width direction in a state where abutting on fixed blades 7321.

In such a manner, movable blades 7331 and fixed blades 7321 are capable of cutting hair in collaboration.

Example of Nose/Ear Hair Trimmer Head

In addition, electric toothbrush 1 may include nose/ear hair trimmer head 80, which is a head having a function of cutting hair (such as nose hair, ear hair, or the like).

Figure 59:
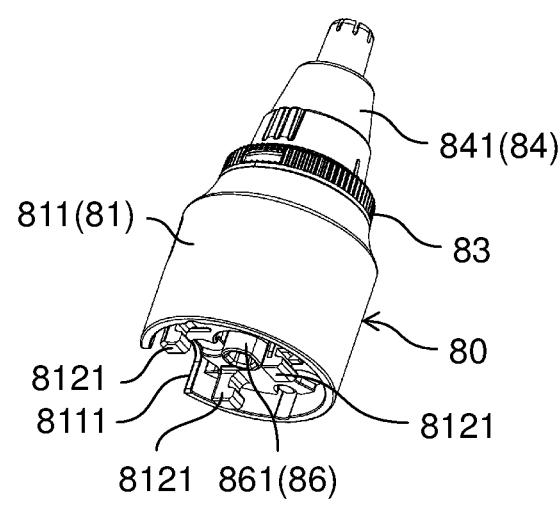
FIG. 59 is a perspective view schematically showing a state where an example of a nose/ear hair trimmer head is to be attached to the body.
Figure 59:
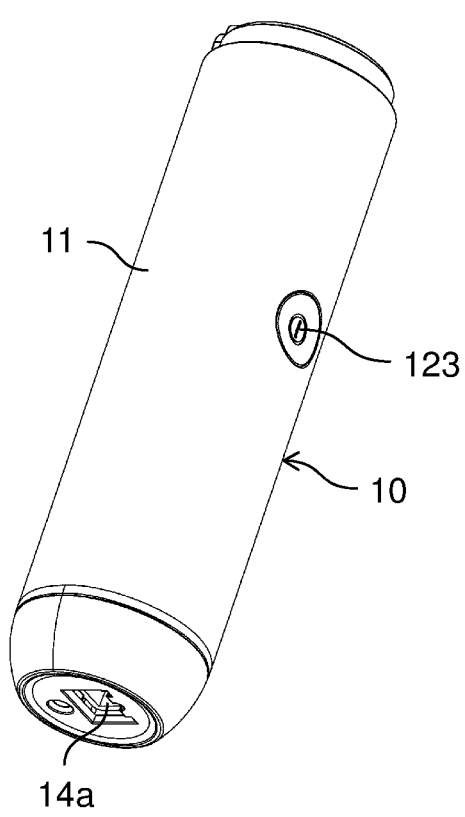
Figure 62:
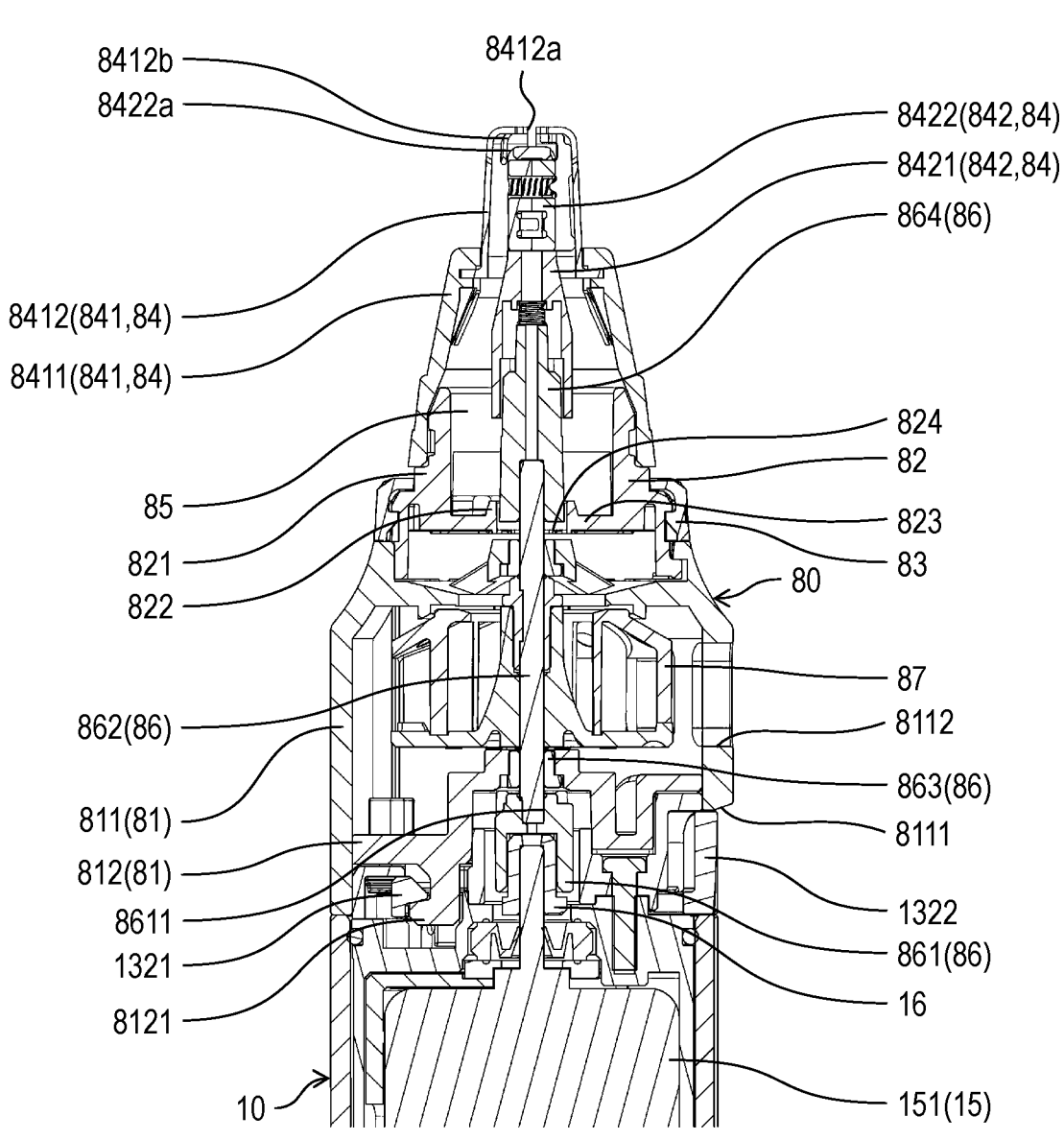
FIG. 62 is a side sectional view schematically showing an example of the nose/ear hair trimmer head attached to the body in an enlarged manner.
Figure 63:
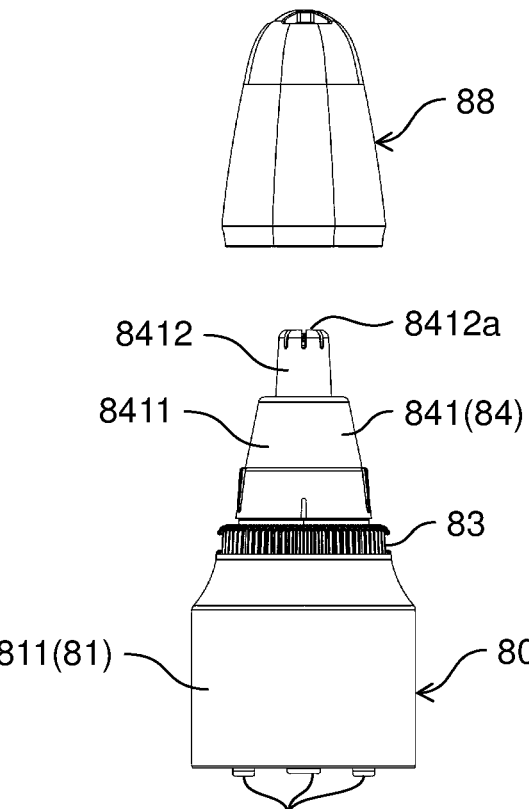
FIG. 63 is a front view schematically showing a state where a cap is to be attached to the nose/ear hair trimmer head.
Figure 64:
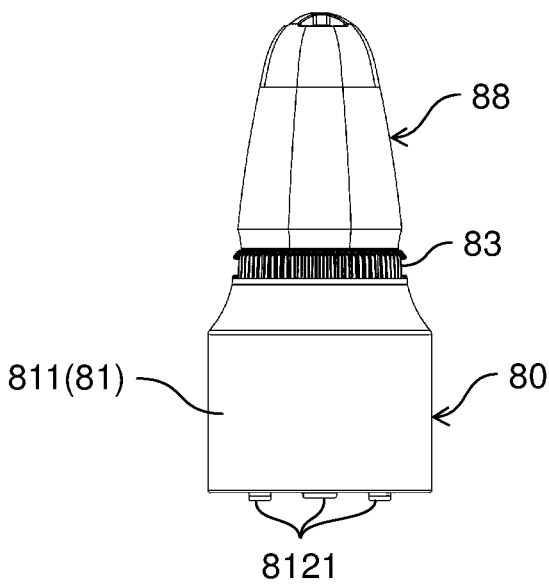
FIG. 64 is a front view schematically showing a state where the cap has been attached to the nose/ear hair trimmer head.

Hereinafter, a specific configuration of an example of nose/ear hair trimmer head 80 will be described with reference to FIGS. 59 to 64. FIG. 59 is a perspective view schematically showing a state where an example of nose/ear hair trimmer head 80 is to be attached to body 10. FIG. 60 is a front view schematically showing a state where an example of nose/ear hair trimmer head 80 has been attached to body 10. FIG. 61 is a side view schematically showing a state where an example of nose/ear hair trimmer head 80 has been attached to body 10. FIG. 62 is a side sectional view schematically showing an example of nose/ear hair trimmer head 80 attached to body 10 in an enlarged manner. FIG. 63 is a front view schematically showing a state where cap 88 is to be attached to nose/ear hair trimmer head 80. FIG. 64 is a front view schematically showing a state where cap 88 has been attached to nose/ear hair trimmer head 80.

As illustrated in FIGS. 59 to 64, nose/ear hair trimmer head 80 includes head body 81 detachably attached to body 10. Head body 81 may be formed using, for example, an insulating synthetic resin material.

In addition, head body 81 is formed by joining a plurality of divided bodies, and a cavity is formed inside head body 81 formed by joining the divided bodies. As illustrated in FIG. 62, fan 87, which will be described later, is contained in the cavity.

Further, as illustrated in FIGS. 59 to 63, nose/ear hair trimmer head 80 includes filter 82 that is detachably attached to the upper portion of head body 81 and collects chips such as nose hair and ear hair, and blade 84 that is capable of being inserted into a hole, such as a nostril or an ear hole, to cut nose hair, ear hair, and the like. Note that, retaining frame 83 is attached to the outer periphery of filter 82. In addition, blade 84 is detachably attached so as to the upper portion of filter 82.

Here, as illustrated in FIG. 62, head body 81 includes cylindrical peripheral wall 811 penetrating in the up-down direction, and lower lid 812 arranged to cover the lower opening of peripheral wall 811.

Peripheral wall 811 has a lower portion having a substantially columnar shape and an upper portion having a shape of substantially truncated cone whose diameter decreases upward. Cutout 8111 is formed at the rear lower end of peripheral wall 811 so that peripheral wall 811 does not interfere with restriction wall 1331c (see FIG. 20) and vertical wall 1322 of body 10 when nose/ear hair trimmer head 80 is attached to body 10. In addition, restriction wall 1331c, vertical wall 1322, and cutout 8111 determine one attachment direction of nose/ear hair trimmer head 80 when nose/ear hair trimmer head 80 is attached to body 10.

On the other hand, three hooks 8121 (that is, one example of fitting member) are provided on lower lid 812 to protrude downward. These three hooks 8121 are provided at positions corresponding to three hooks 1321 of body 10, and are each provided so that a portion to be hooked by hooking hook 1321 protrudes forward in the front-rear direction.

Power transmission unit 861 of power transmission mechanism 86 is held at the central portion of lower lid 812 to be surrounded by three hooks 8121. In a bottom view of nose/ear hair trimmer head 80 (that is, in a state where the head is viewed from the lower side in the up-down direction), a polygonal space such as a regular hexagon is formed inside power transmission unit 861 so as to open downward. The polygonal space such as a regular hexagon is formed to have substantially the same size as the outer diameter of drive shaft 16, and when nose/ear hair trimmer head 80 is attached to body 10, drive shaft 16 is inserted into the polygonal space such as a regular hexagon.

Power transmission mechanism 86 includes power transmission unit 861, which has been described above, and operation shaft 862 attached to power transmission unit 861 to operate. Operation shaft 862 is inserted into and fixed to insertion hole 8611 formed in the upper portion of power transmission unit 861, and rotates together with power transmission unit 861 that rotates by power of rotary motor 15 transmitted from drive shaft 16 (that is, by rotational force). Further, operation shaft 862 is held by bearing 863.

Operation shaft 862 is held by lower lid 812 in a state of protruding upward from head body 81, and fan 87 is integrally attached to a portion of operation shaft 862 arranged in a cavity formed in head body 81. In such a manner, fan 87 rotates together with operation shaft 862 when operation shaft 862 is rotated. Air port 8112 for discharging the air flow generated by fan 87 to the outside is formed in a portion of peripheral wall 811 radially facing fan 87. As described above, the cavity formed in head body 81 serves as a part of air flow path 85 through which the air flow generated by fan 87 passes.

In addition, power transmission mechanism 86 includes joint 864 for connecting inner body 842 (that is, one example of acting member) of blade 84 to operation shaft 862. Specifically, the lower end of joint 864 is attached to the upper end of operation shaft 862, and inner body 842 (that is, one example of acting member) is attached to the upper end of joint 864.

Filter 82 includes a substantially cylindrical outer frame 821 that opens in the up-down direction, and a cavity penetrating in the up-down direction is formed inside outer frame 821. In addition, filter 82 includes a substantially cylindrical inner frame 822 arranged inside the lower opening of outer frame 821, and connection rib 823 that connects outer frame 821 and inner frame 822. The opening formed between outer frame 821 and inner frame 822 is provided with mesh 824 for collecting chips such as nose hair and ear hair. Note that, the cavity formed inside filter 82 also serves as a part of air flow path 85 through which the air flow generated by fan 87 passes.

In addition, blade 84 includes a substantially cylindrical outer shell 841 having fixed blade 8412*b* and opening up and down, and inner body 842 having a movable blade 8422*a*.

Outer shell 841 can be formed, for example, by integrally attaching a metal hole insertion portion 8412 that is capable of being inserted into a hole such as a nostril or an ear hole to an upper portion of a substantially cylindrical attachment frame portion 8411 attached to filter 82 formed using an insulating synthetic resin material. Note that the cavity formed inside outer shell 841 also serves as a part of air flow path 85 through which the air flow generated by fan 87 passes.

In addition, slit 8412*a* extending from the upper end to a side portion is formed in metal hole insertion portion 8412, and nose hair, ear hair, or the like are introduced into hole insertion portion 8412 with slit 8412*a*. An edge of slit 8412*a* serves as fixed blade 8412*b*.

On the other hand, inner body 842 includes fitting portion 8421 fitted into the upper end of joint 864, and insertion protrusion 8422 attached above fitting portion 8421 and arranged inside hole insertion portion 8412. Insertion protrusion 8422 is provided with movable blade 8422*a*.

Further, as illustrated in FIGS. 63 and 64, nose/ear hair trimmer head 80 includes cap 88 capable of covering blade 84 and filter 82. By attaching cap 88 when not in use, such as when carrying, blade 84, which is the functional part of nose/ear hair trimmer head 80, is protected.

Next, an example of a method of using nose/ear hair trimmer head 80 having such a configuration will be described.

As illustrated in FIG. 62, first, nose/ear hair trimmer head 80 is attached to body 10, and power transmission unit 861 is attached to drive shaft 16. Then, in this state, drive shaft 16 is rotated by pressing power switch 123 to drive rotary motor 15.

In such a manner, the rotation of drive shaft 16 is transmitted to power transmission unit 861, and power transmission unit 861 rotates together with drive shaft 16. At this time, operation shaft 862 attached to power transmission unit 861, and fan 87 and joint 864 attached to operation shaft 862 also rotate together with power transmission unit 861. When joint 864 rotates, inner body 842 attached to joint 864 also rotates.

At this time, an air flow is generated in air flow path 85 formed inside nose/ear hair trimmer head 80 due to the rotation of fan 87. Specifically, airflow from slit 8412*a* in the upper portion of nose/ear hair trimmer head 80 towards air port 8112 is generated.

When hole insertion portion 8412 is inserted into a hole such as a nostril or an ear hole in such a state, nose hair, ear hair, or the like introduced into hole insertion portion 8412 from slit 8412*a* are cut with fixed blade 8412*b* and movable blade 8422*a* in collaboration. At this time, the cut chips are drawn towards air port 8112 by the generated air flow, and are collected by mesh 824 provided in the middle of air flow path 85. Note that, mesh 824 that collects chips such as nose hair and ear hair can be cleaned (that is, washed) by removing filter 82 from head body 81.

Example of Scalp Massage Head

It is also possible that the electric toothbrush 1 includes scalp massage head 90 which is a head having a function of massaging.

Figure 65:
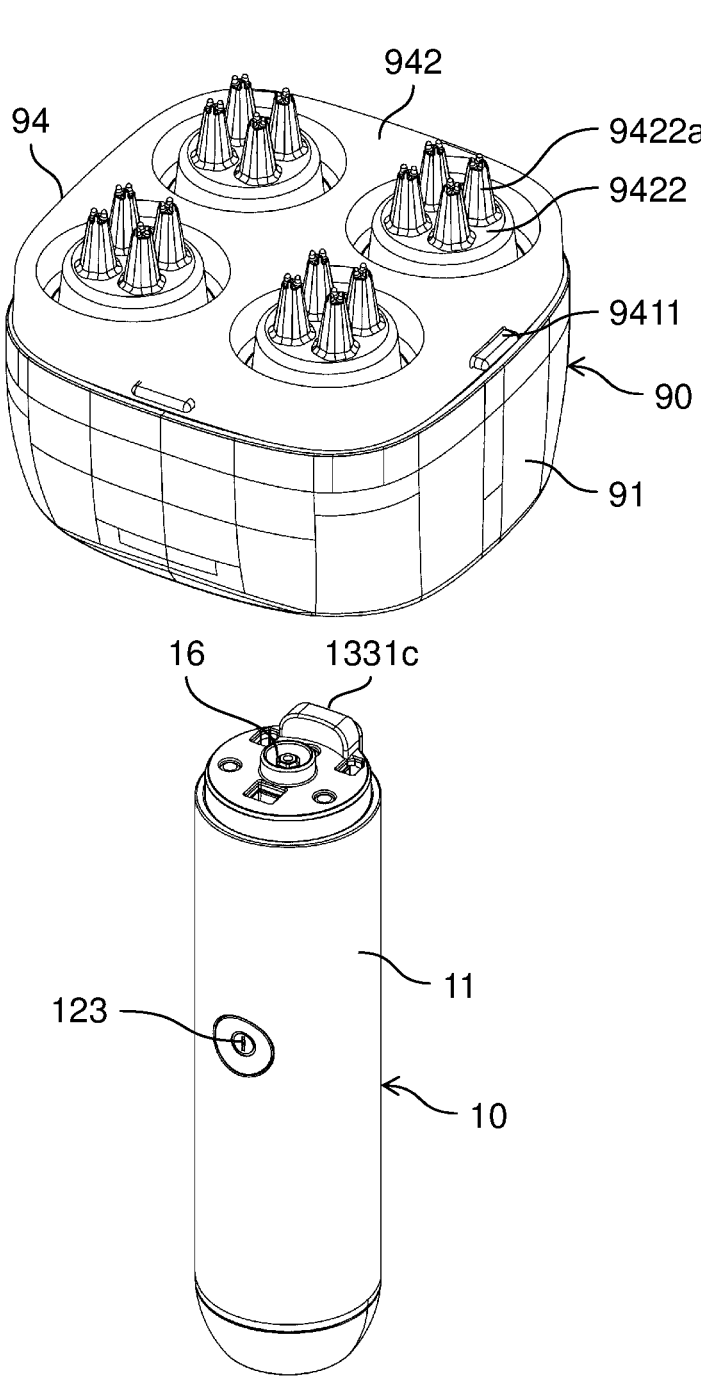
FIG. 65 is a perspective view schematically showing a state where an example of a scalp massage head to be attached to the body is viewed from one direction.
Figure 66:
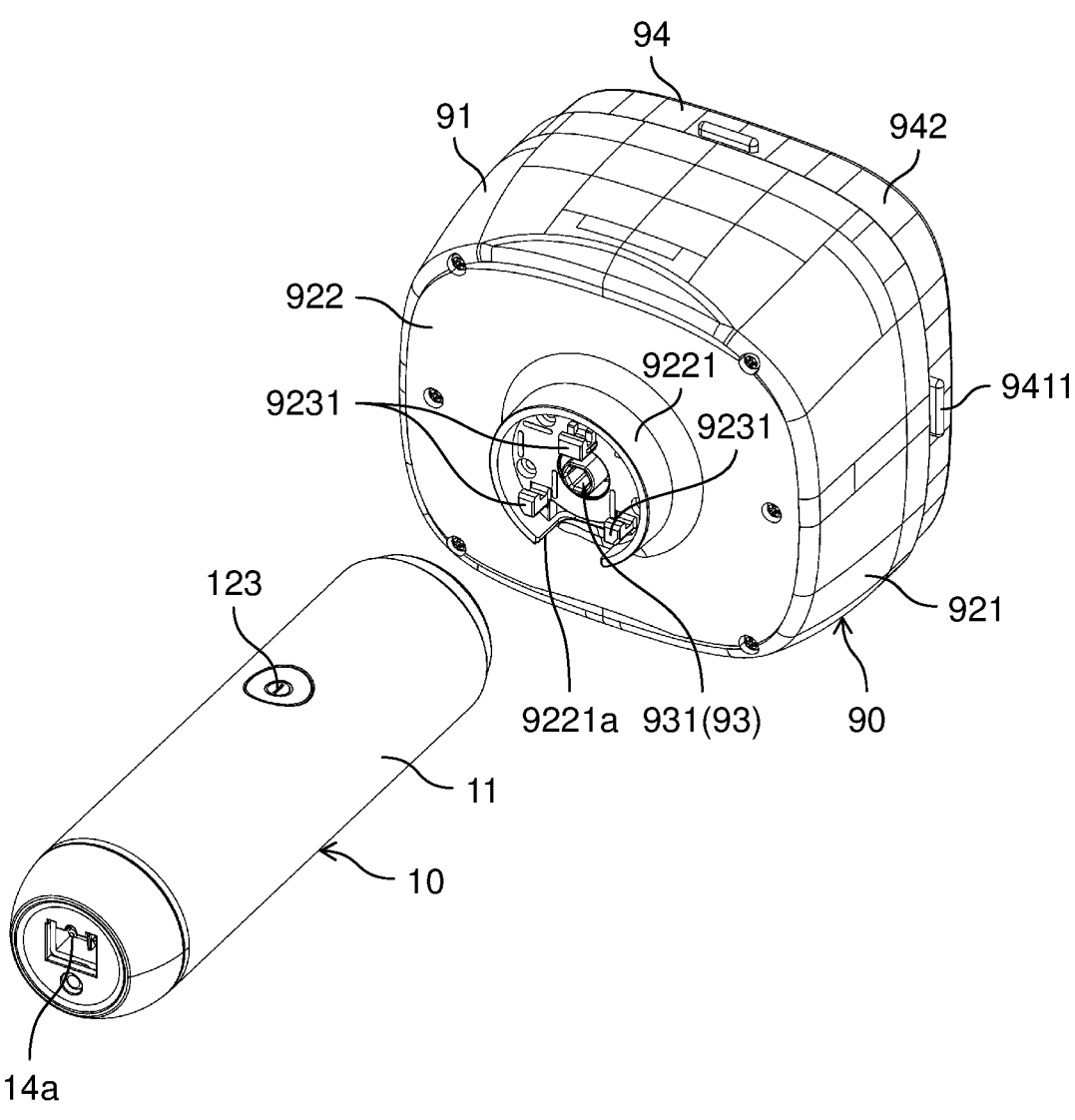
FIG. 66 is a perspective view schematically showing a state where an example of the scalp massage head to be attached to the body is viewed from another direction.
Figure 67:
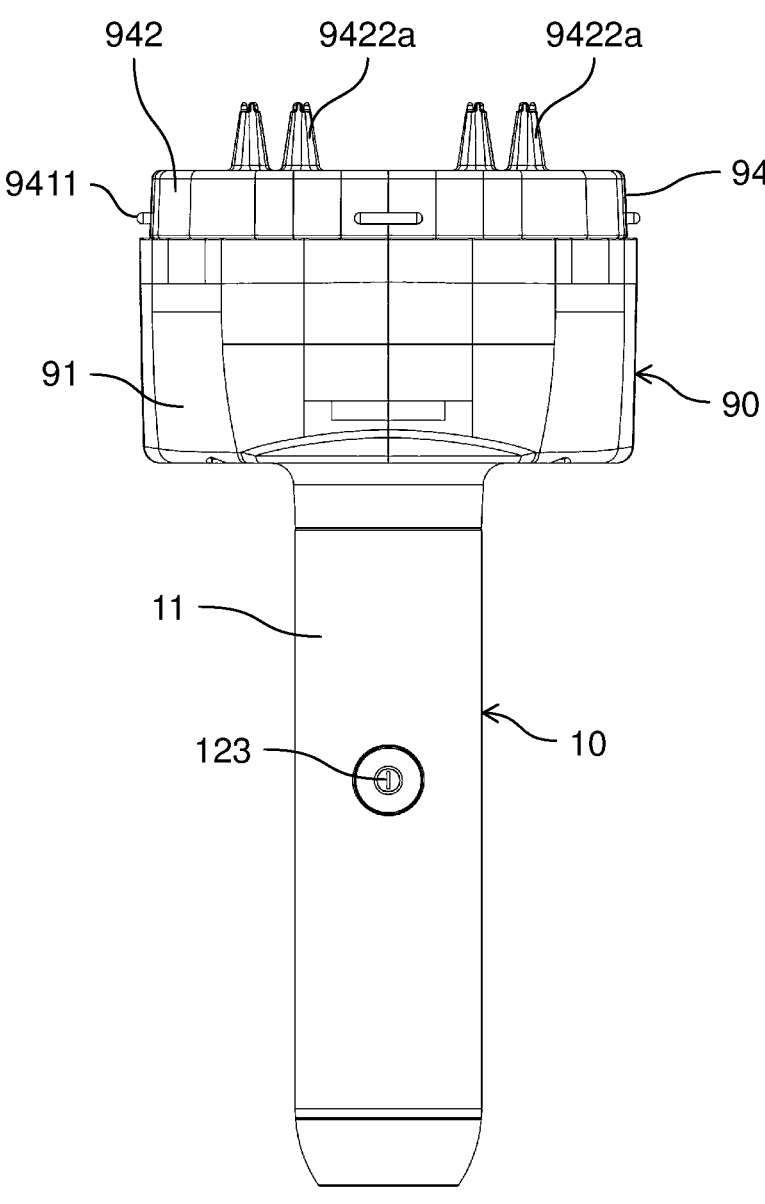
FIG. 67 is a side view schematically showing a state where an example of the scalp massage head has been attached to the body.
Figure 68:
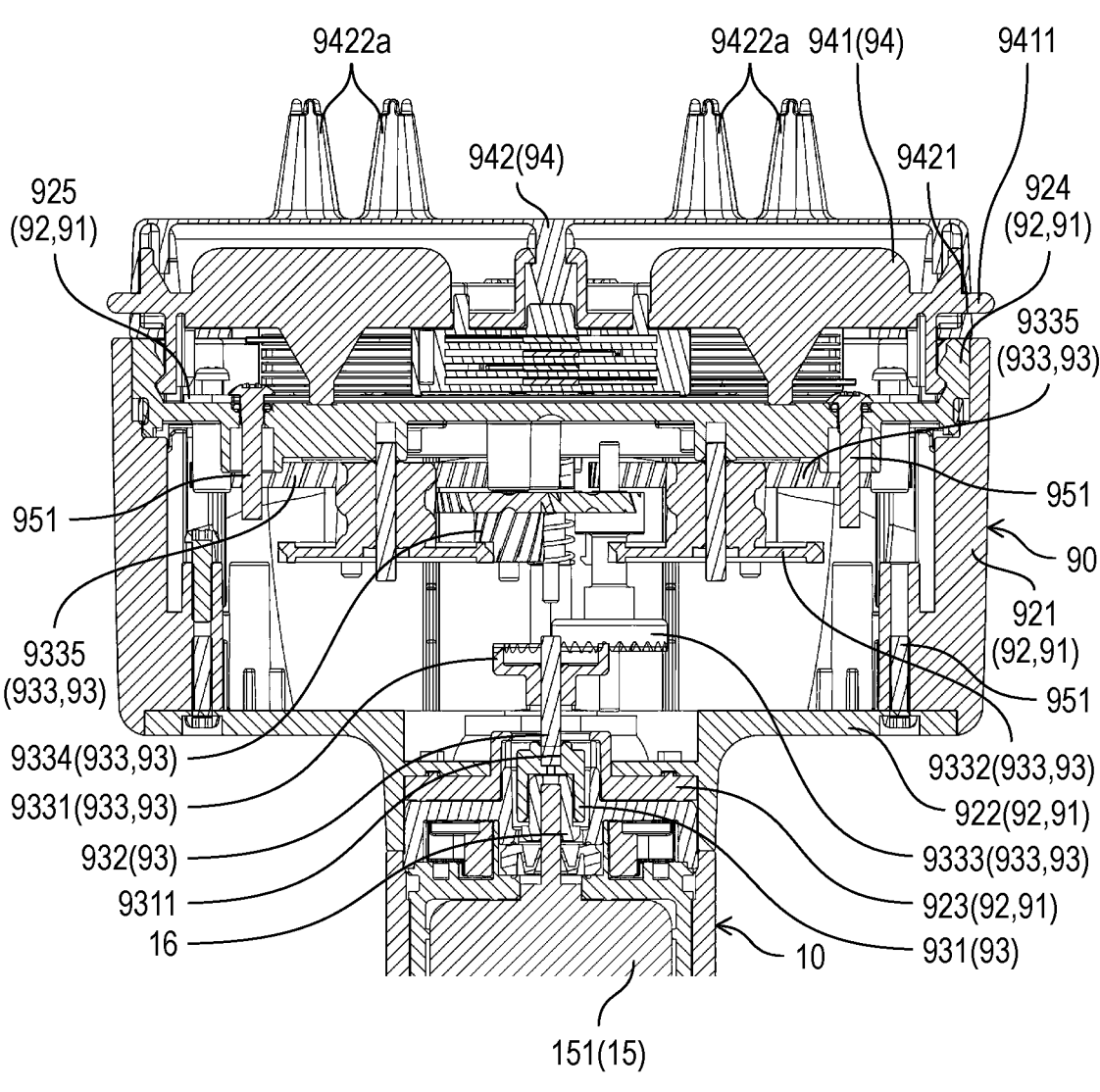
FIG. 68 is a side sectional view schematically showing an example of the scalp massage head attached to the body in an enlarged manner.

Hereinafter, a specific configuration of an example of scalp massage head 90 will be described with reference to FIGS. 65 to 68. FIG. 65 is a perspective view schematically showing a state where an example of scalp massage head 90 to be attached to body 10 is viewed from one direction. FIG. 66 is a perspective view schematically showing a state where an example of scalp massage head 90 to be attached to body 10 is viewed from another direction. FIG. 67 is a side view schematically showing a state where an example of scalp massage head 90 has been attached to body 10. FIG. 68 is a side sectional view schematically showing an example of scalp massage head 90 attached to body 10 in an enlarged manner.

As illustrated in FIGS. 65 to 68, scalp massage head 90 includes head body 91 detachably attached to body 10, and treatment unit 94 detachably attached to one end (the upper end) of head body 91.

As illustrated in FIG. 68, head body 91 includes a head housing 92 constituting an outer shell of head body 91. Head housing 92 may be formed using, for example, an insulating synthetic resin material.

In addition, as illustrated in FIGS. 65 to 67, head housing 92 is formed by joining a plurality of divided bodies, and a cavity is formed inside head housing 92 formed by joining the divided bodies. As illustrated in FIG. 68, transmission mechanism 933, which will be described later, is contained in the cavity.

Specifically, head housing 92 has a substantially quadrangular shape in plan view, and includes a peripheral wall 921 having a rectangular cylindrical shape penetrating in the up-down direction, and a bottom wall 922 arranged so as to cover the lower opening of peripheral wall 921. Peripheral wall 921 and bottom wall 922 are fixed with screw 951. In addition, a substantially cylindrical protruding wall 9221 protruding downward is formed at a substantially central portion of bottom wall 922, and peripheral wall 1332 of body 10 is inserted into protruding wall 9221 when attaching scalp massage head 90 to body 10.

Cutout 9221*a* is formed at the rear lower end of protruding wall 9221 so that protruding wall 9221 does not interfere with restriction wall 1331*c* and vertical wall 1322 of body 10 when scalp massage head 90 is attached to body 10. In addition, restriction wall 1331*c*, vertical wall 1322, and cutout 9221*a* determine one attachment direction of scalp massage head 90 when scalp massage head 90 is attached to body 10.

Further, lower lid 923 is arranged inside protruding wall 9221 so as to cover the upper opening of protruding wall 9221. That is, head housing 92 includes lower lid 923 arranged inside protruding wall 9221. Head housing 92 includes waterproof base 924 arranged so as to cover the upper opening of peripheral wall 921, and retaining plate 925 arranged above waterproof base 924. Retaining plate 925 and waterproof base 924 are fixed with screw 951. In such a manner, water entrance into the cavity formed in head housing 92 (that is, further inside the waterproof base) is suppressed.

Three hooks 9231 (that is, one example of fitting member) are provided on lower lid 923 to protrude downward. Three hooks 9231 are provided at positions corresponding to three hooks 1321 of body 10, respectively, and are each provided so that a portion to be hooked by hooking hook 1321 protrudes forward in the front-rear direction.

In addition, power transmission unit 931 of power transmission mechanism 93 is held at the central portion of lower lid 923 to be surrounded by three hooks 9231. In a bottom view of scalp massage head 90 (that is, in a state where the head is viewed from the lower side in the up-down direction), a polygonal space such as a regular hexagon is formed inside power transmission unit 931 so as to open downward. The polygonal space such as a regular hexagon is formed to have substantially the same size as the outer diameter of drive shaft 16, and when scalp massage head 90 is attached to body 10, drive shaft 16 is inserted into the polygonal space such as a regular hexagon.

Scalp massage head 90 is provided with power transmission mechanism 93 which has power transmission unit 931, which has been described above, and is capable of transmitting power of rotary motor 15 (that is, rotational force).

Power transmission mechanism 93 includes operation shaft 932 attached to power transmission unit 931 to operate. Operation shaft 932 is inserted into and fixed to insertion hole 9311 formed in the upper portion of power transmission unit 931, and rotates together with power transmission unit 931 that rotates by power of rotary motor 15 transmitted from drive shaft 16 (that is, by rotational force).

In addition, power transmission mechanism 93 includes transmission mechanism 933 that is attached to operation shaft 932 and shifts the power of rotary motor 15 (for example, decelerating), and transmission mechanism 933 is connected to four treatment actuators 9422 (that is, one example of acting member), which will be described later. That is, transmission mechanism 933 is interposed between operation shaft 932 and four treatment actuators 9422 (that is, one example of acting member). In such a manner, four treatment actuators 9422 (that is, one example of acting member) are independently rotated by the power of rotary motor 15 at a rotation speed lower than the rotation speed of the rotary motor 15.

Transmission mechanism 933 includes pinion gear 9331 attached to the upper end of operation shaft 932. Pinion gear 9331 is attached to operation shaft 932 to rotate together with operation shaft 932.

In addition, transmission mechanism 933 includes cylindrical transmission gear 9333 arranged in the vicinity of pinion gear 9331 fixed to the distal end portion of operation shaft 932.

Transmission gear 9333 has gear portions on the lower end surface and on the outer peripheral surface, and pinion gear 9331 meshes with an annular gear portion formed on the lower end surface of transmission gear 9333.

In addition, transmission mechanism 933 includes intermediate gear group 9334 that meshes with the gear portion formed on the outer peripheral surface of transmission gear 9333, and gear base 9332 to which intermediate gear group 9334 is attached. Further, transmission mechanism 933 includes four final gears 9335 to which the rotation of intermediate gear group 9334 is transmitted.

As illustrated in FIGS. 65 to 68, treatment unit 94 is detachably attached to head body 91 having such a configuration.

Treatment unit 94 includes base 941 detachably attached to head body 91 and a cover 942 attached to base 941.

Cover 942 can be made of, for example, a flexible member such as an elastomer, and is set to have substantially the same shape and size as head body 91.

Base 941 made of a material harder than cover 942, which is made of a flexible member, is attached to cover 942.

Specifically, protrusion 9411 protruding outward (that is, laterally) is provided substantially at the center of each side of base 941. Base 941 is attached to cover 942 by fitting protrusion 9411 into through-hole 9421 provided so as to penetrate laterally at substantially the center of each side of the outer peripheral edge of cover 942.

In addition, on the upper surface of cover 942, four treatment actuators 9422 (that is, one example of acting member) are provided to be movable relative to base 941 (that is, one example of element of head body 91). Each of treatment actuators 9422 is provided with four treatment protrusions 9422*a* to be brought into contact with scalp at the time of use.

Four treatment actuators 9422 (that is, one example of acting member) are respectively connected to four final gears 9335 via a connecting shaft or the like. In such a manner, four treatment actuators 9422 (that is, one example of acting member) are each independently rotated at a rotation speed lower than the rotation speed of rotary motor 15. At this time, four treatment actuators 9422 (that is, one example of acting member) eccentrically rotate at different phases from each other. In this manner, by eccentrically rotating the plurality of treatment actuators 9422 about the central axis at different phases from each other, it is possible to more effectively massage scalp with each treatment actuator 9422.

Next, an example of a method of using scalp massage head 90 having such a configuration will be described.

As illustrated in FIG. 68, first, scalp massage head 90 is attached to body 10, and power transmission unit 931 is attached to drive shaft 16. Then, in this state, drive shaft 16 is rotated by pressing power switch 123 to drive rotary motor 15.

In such a manner, the rotation of drive shaft 16 is transmitted to power transmission unit 931, and power transmission unit 931 rotates together with drive shaft 16. At this time, operation shaft 932 attached to power transmission unit 931, and pinion gear 9331 attached to operation shaft 932 also rotate together with power transmission unit 931.

Then, as pinion gear 9331 rotates, transmission gear 9333 meshing with pinion gear 9331, intermediate gear group 9334 meshing with transmission gear 9333, and four final gears 9335 to which the rotation of intermediate gear group 9334 is transmitted, rotate in a decelerated state.

As described above, when four final gears 9335 rotate, four treatment actuators 9422 (that is, one example of acting member) respectively connected to four final gears 9335 also rotate. At this time, following the rotation of four treatment actuators 9422 (that is, one example of acting member), treatment protrusions 9422a respectively provided in treatment actuators 9422 also rotate.

Then, in such a state, when treatment protrusions 9422a are brought into contact with scalp, scalp massage is performed due to the rotation of treatment protrusions 9422a.

Actions and Effects

Hereinafter, a characteristic configuration of the electric toothbrush described in the above exemplary embodiment and the modification thereof, and an effect provided by the characteristic configuration will be described.

(1) Electric toothbrush 1 according to the above exemplary embodiment and the modifications thereof includes body 10 having drive shaft 16 driven by rotary motor 15. In addition, electric toothbrush 1 further includes head 20 detachably attached to body 10, head 20 including power transmission mechanism 24 capable of transmitting power of rotary motor 15, and eccentric weight 25 (that is, one example of acting member) operated by the power transmitted from power transmission mechanism 24. Further, electric toothbrush 1 further includes brush handle 30 having bristle 3131 and detachably attached to head 20. Power transmission mechanism 24 includes a power transmission unit 241 that is attachable to drive shaft 16 in a state where idling is suppressed.

As described above, electric toothbrush 1 according to the present exemplary embodiment and the modifications thereof is capable of being divided into three parts, body 10, head 20, and brush handle 30. Therefore, the vibration generated in brush handle 30 (more precisely, bristle 3131) during the use of electric toothbrush 1 is less transmitted to the hand (that is, the hand holding body 10). As a result, usability of electric toothbrush 1 may be further improved.

As described above, electric toothbrush 1 according to the above exemplary embodiment and the modifications thereof is capable of being more reliably suppress transmission of vibration generated during use to the hand.

(2) In addition, power transmission mechanism 24 may include operation shaft 242 attached to power transmission unit 241 to operate, and bearing 243 supporting operation shaft 242.

In such a manner, swinging of operation shaft 242 in the radial direction when operation shaft 242 is rotated can be suppressed by bearing 243. As a result, power transmission loss of rotary motor 15 to eccentric weight 25 (that is, one example of acting member) may be further reduced. Further, since swinging of operation shaft 242 in the radial direction (that is, vibration of operation shaft 242) is suppressed, noise and abnormal sound generated in the head during use may be more reliably suppressed.

In addition, by providing bearings in each of the plurality of heads having different performance of acting member or function of acting member, it is possible to suppress generation of noise and abnormal sound when the head is mounted on body 10 and used regardless of the vibration direction of the acting member of the head. That is, it is possible to suppress generation of noise and abnormal sound regardless of the type of head attached to a common body 10.

(3) In addition, head 20 may also include transmission mechanism 245 that shifts the power of rotary motor 15.

In such a manner, the power performance (for example, rotation speed) transmitted to eccentric weight 25 (that is, one example of the acting member) can be changed without changing the performance (for example, rotation speed) of rotary motor 15.

(4) In addition, head 20 may include a plurality of types of head 20 having different operation performances of eccentric weights 25 (that is, one example of acting member).

For example, a plurality of types of head 20 having different transmission ratios may be provided, and any head 20 may be attached to body 10.

In such a manner, electric toothbrush 1 having various performances (for example, rotation speed) can be provided only by changing head 20 attached to a common body 10.

In addition, a plurality of types of head 20 having different weights of eccentric weights 25 (that is, one example of acting member) may be provided, and any head 20 may be attached to body 10.

In such a manner, electric toothbrush 1 having various performances (for example, having various amplitudes) can be provided only by changing head 20 attached to a common body 10.

As described above, when a plurality of types of heads 20 having different performances (for example, rotation speed, amplitude, and the like) are prepared, electric toothbrushes 1 having various performances (for example, rotation speed, amplitude, and the like) can be provided only by changing the head.

(5) In addition, other heads having different functions of acting member may be further included.

For example, in addition to the head to which brush handle 30 is attached, any one or more types of heads among a head having a hair cutting function, a head having an oral cavity washing function, a head having a massage function, a head having a face washing function, and the like, may be further included.

Note that a head having a function of cutting hair includes, for example, a hair clipper head, a shaver head, a trimmer head, and the like. In addition, the trimmer head includes a beard trimmer head, a face trimmer head, a body trimmer head, and the like.

In addition, the head having the oral cavity cleaning function includes, for example, an oral cavity cleaning head, and the like. In addition, the head having the massaging function includes, for example, a scalp massage head, and the like. In addition, the head having the face cleaning function include, for example, a face cleaning brush head, and the like.

However, the other heads may be any head capable of driving acting member due to the rotation of rotary motor 15. The other heads is not limited to heads having the functions described above.

When electric toothbrush 1 includes the heads described above, for example, the electric toothbrush and the shaver may be used using a common body 10. Therefore, for example, for a user who needs both an electric toothbrush and a shaver, the number of parts can be reduced as compared with a case where each device is purchased separately. As a result, the purchase cost can be reduced, and the storage space can be saved. Further, the portability during use outside home, such as on a trip, going to work, or the like, can also be improved.

In addition, when a plurality of types of heads having various functions (that is, a personal care kit) are prepared and available for purchase in units of heads, it is possible to select and purchase only necessary heads so that the user can select his/her desired heads for customization.

(6) In addition, power transmission unit 531 may also have an elastic member that is capable of elastically holding drive shaft 16.

In such a manner, any variation of the dimensions of drive shaft 16 or power transmission unit 531 can be absorbed by the elastic member, so that power transmission unit 531 is more reliably attached to drive shaft 16.

Note that, in the above exemplary embodiment and the modifications thereof, a configuration wherein power transmission unit 531 of shaver head 50 includes an elastic member is exemplified, but such a configuration can be applied not only to head 20 to which brush handle 30 is attached but also to other heads.

(7) In addition, body 10 and head 20 may also be provided with vibration receivers (for example, hook 1321 and hook 2221, respectively) capable of receiving vibration in three or more directions intersecting each other on a plane orthogonal to drive shaft 16.

In such a manner, vibration can be reduced when any of the various heads vibrating in different directions is attached to body 10.

(8) In addition, both of body 10 and head 20 may be provided with at least one fitting member (for example, hook 1321 and hook 2221, respectively) capable of being releasably fitted. In addition, the fitting member (for example, hook 1321 and hook 2221) may also serve as the vibration receiver.

In such a manner, it is unnecessary to provide a vibration receiver separately from the fitting member, so that the configuration can be simplified and vibration may be alleviated.

(9) In addition, the at least one fitting member (for example, hook 1321 and hook 2221) may comprise three or more fitting members. Each of the three fitting members may be provided in the body and the head is fitted to each other. The three or more fitting members may be provided in three or more positions in body 10 and head 20. At this time, the fitting member (for example, hook 1321 and hook 2221) may be arranged so that at least one virtual triangle T1 in which drive shaft 16 is arranged is formed in region R1 when viewed from the axial direction of drive shaft 16.

In such a manner, the vibration of head 20 can be received by three or more fitting members (for example, hook 1321 and hook 2221) arranged so as to surround drive shaft 16, so that the vibration of head 20 can be alleviated more reliably.

(10) In addition, communication hole 27 communicating with eccentric weight 25 (that is, one example of acting member) is formed in head 20.

In such a manner, it is possible to more reliably wash away food debris or the like adhering to head 20 after using electric toothbrush 1, so that head 20 can be maintained in a cleaner state. Therefore, when a plurality of types of heads having different functions are attached to a common body 10, each head can be used while being maintained in a clean state.

(11) In addition, cap 32 covering bristle 3131 may be further provided.

In such a manner, the portability during use outside home, such as on a trip, going to work, or the like, may be improved.

(12) In addition, contour shape D of body 10 when viewed from the axial direction of drive shaft 16 may have a first line D1 having an arc shape and a second line D2 having a curvature different from that of first line D1.

In such a manner, at least one of the mounting direction of the head and the use direction at the time of use can be visually confirmed, so that usability can be further improved. At this time, as long as the curvature of second line D2 is reduced to be close to a straight line, body 10 can be prevented from rolling when placed on a wash basin or the like.

(13) In addition, in a state where body 10, head 20, and brush handle 30 are attached, center of gravity G may be located close to body 10, and the entire bristle 3131 may be present in the region of body 10 (that is, the inner side of the contour shape D) when viewed from the axial direction of drive shaft 16.

In such a manner, when electric toothbrush 1 is placed on a wash basin or the like, the electric toothbrush 1 prevents bristle 3131 from inclining downward. In addition, even when electric toothbrush 1 placed on a wash basin or the like rotates, the tip of bristle 3131 is prevented from being brought into contact with the ground. Therefore, with such a configuration, electric toothbrush 1 can be used in a cleaner state.

(14) In addition, the electric toothbrush may include shaver head 50 having an acting member with a function of cutting body hair, and shaver head 50 may have a waterproof function.

In such a manner, performance degradation of shaver head 50 can be more reliably suppressed.

Others

Although the contents of the electric toothbrush according to the present disclosure have been described above, the present disclosure is not limited to these descriptions, and it is obvious to those skilled in the art that various modifications and improvements may be made.

For example, it is possible to appropriately combine the configurations described in each of the above exemplary embodiment and the modifications thereof to form an electric razor.

In addition, In the above exemplary embodiment and the modifications thereof, configurations of attaching various heads to one body 10 are exemplified, but a plurality of types of bodies having different performance of rotary motor or different capacity of rechargeable battery may also be provided. That is, electric toothbrush 1 may include a plurality of types of body 10 having common hook 1321 and drive shaft 16.

In addition, In the above exemplary embodiment and the modifications thereof, a configuration wherein inner blade 553 is reciprocated in the width direction to serve as shaver head 50 is exemplified, but the shaver head may also be a head that rotates the inner blade.

In addition, head, brush handle or other detailed specifications (such as shape, dimension, layout, and the like) can also be changed as appropriate.

INDUSTRIAL APPLICABILITY

As described above, since the electric toothbrush according to the present disclosure is capable of more reliably suppressing transmission of vibration generated during use to the hand, the electric toothbrush may be used alone or as a part of various heads for a personal care kit.

REFERENCE MARKS IN THE DRAWINGS 1 electric toothbrush
10 body
11 housing
12 cylindrical wall
121 first surface
122 second surface
123 power supply switch
13 upper lid
131 rotary motor holding wall
1311 through-hole
132 movable wall
1321 hook
1322 vertical wall
133 retaining wall
1331 top wall
1331a through-hole
1331b cylindrical rib
1331c restriction wall
1332 peripheral wall
14 lower lid
14a connector
141 outer wall
142 inner wall
15 rotary motor
151 rotary motor body
152 rotary motor shaft
16 drive shaft
171 rechargeable battery
172 control board
173 screw
174 packing
175 waterproof rubber
176 cap
20 head
21 base
22 base housing
221 peripheral wall
221a cutout
222 holding wall
2221 hook
23 shaft
231 shaft housing
2311 engagement protrusion
2312 bearing protrusion
232 space
24 power transmission mechanism
241 power transmission unit
2411 insertion hole
242 operation shaft
243 bearing
244 joint
245 transmission mechanism
2451 first gear
2452 second gear
2453 horizontal shaft
2454 third gear
2455 connecting shaft
25 eccentric weight
251 lower end
252 upper end
261 screw 262 packing
2621 first packing
2622 second packing
27 communication hole
30 brush handle
31 handle housing
311 space
312 engagement hole
313 distal end portion
3131 bristle
32 cap
321 hole
40 oral cavity cleaning head
41 head body
411 flow path
42 head housing
421 cylindrical wall
4211 nozzle lock release button
422 upper lid
4221 nozzle insertion portion
423 lower lid
4231 liquid supply tube insertion portion
4232 hook
424 partition wall
425 retaining plate
4241 space
43 power transmission mechanism
431 power transmission unit
4311 insertion hole
432 operation shaft
433 bearing
434 conversion mechanism
4341 first gear
4342 second gear
4343 horizontal shaft
4344 cam
4345 connecting rod
4346 connecting shaft
44 pump
441 pump chamber
4411 suction valve
4412 discharge valve
442 piston
45 nozzle
451 insertion end
452 discharge end
453 flow path
46 liquid supply tube
461 flow path
47 spring
481 packing
484 waterproof rubber
50 shaver head
51 head body
511 containing space
52 head housing
521 peripheral wall
5211 cutout
522 lower lid
5221 partition wall
5222 lower retaining plate
5222a hook
5223 retaining plate
5224 release button
523 upper lid
5231 through-hole
524 upper retaining plate 53 power transmission mechanism
531 power transmission unit
5311 top wall
5311*a* insertion hole
5311*b* insertion hole
5312 peripheral wall
5312*a* cutout
5313 leaf spring
5313*a* top plate
5313*b* spring piece
532 operation shaft
533 bearing
534 conversion mechanism
5341 lower base
5342 lower eccentric shaft
5343 lower connecting arm
5344 upper base
5345 upper eccentric shaft
5346 upper connecting arm
54 drive mechanism
541 driver
542 inner blade attachment portion
55 blade frame
551 outer blade cassette
5511 outer blade frame
5512 outer blade
5513 release button
552 outer peripheral frame
553 inner blade
56 cap
571 screw
572 lower waterproof rubber
573 upper waterproof rubber
574 push-up spring
60 beard trimmer head
61 head body
62 head housing
621 upper wall
622 lower lid
6221 cutout
6222 hook
63 blade unit
631 blade
632 fixing plate
6321 fixed blade
633 movable plate
6331 movable blade
634 frame
6341 spring
635 holding plate
6351 connection portion
64 power transmission mechanism
641 power transmission unit
6411 insertion hole
642 operation shaft
643 bearing
644 conversion mechanism
6441 base
6442 eccentric shaft
6443 link
66 attachment
661 wall
662 comb
671 screw
70 beard/hair trimmer head
71 head body
72 head housing 721 upper wall
722 lower lid
7221 cutout
7222 hook
73 blade unit
731 blade
732 fixing plate
7321 fixed blade
733 movable plate
7331 movable blade
734 frame
7341 spring
735 holding plate
7351 connection portion
74 power transmission mechanism
741 power transmission unit
742 operation shaft
7411 insertion hole
743 bearing
744 conversion mechanism
7441 base
7442 eccentric shaft
7443 link
76 attachment
771 screw
761 wall
762 comb
80 nose/ear hair trimmer head
81 head body
811 peripheral wall
8111 cutout
8112 air port
812 lower lid
8121 hook
82 filter
821 outer frame
822 inner frame
823 connecting rib
824 mesh
83 holding frame
84 blade
841 outer shell
8411 attachment frame
8412 hole insertion portion
8412*a* slit
8412*b* fixed blade
842 inner body
8421 fitting portion
8422 insertion protrusion
8422*a* movable blade
85 air flow path
86 power transmission mechanism
861 power transmission unit
8611 insertion hole
862 operation shaft
863 bearing
864 joint
87 fan
88 cap
90 scalp massage head
91 head body
92 head housing
921 peripheral wall
922 bottom wall
9221 protruding wall
9221*a* cutout
923 lower lid

9231 hook
924 waterproof base
925 retaining plate
93 power transmission mechanism
931 power transmission unit
9311 insertion hole
932 operation shaft
933 transmission mechanism
9331 pinion gear
9332 gear base
9333 transmission gear
9334 intermediate gear group
9335 final gear
94 treatment unit
941 base
9411 protrusion
942 cover
9421 through-hole
9422 treatment actuator
9422*a* treatment protrusion
951 screw
D contour shape
D1 first line
D2 second line
G center of gravity
L1 straight line
L2 straight line
P1 vertex
R1 region
R2 region
T1 triangle

The invention claimed is:

1. An electric toothbrush comprising:

a body comprising a drive shaft driven by a rotary motor;

a head detachably attached to the body, the head comprising a power transmission mechanism capable of transmitting power of the rotary motor and an acting member operated by the power transmitted from the power transmission mechanism; and a brush handle comprising bristles and detachably attached to the head, wherein the power transmission mechanism includes a power transmission unit attachable to the drive shaft in a state where idling is suppressed, the body and the head comprise a vibration receiver capable of receiving vibration in three or more directions intersecting each other on a plane orthogonal to the drive shaft, both of the body and the head are provided with at least one fitting member capable of being releasably fitted, the fitting member also serves as the vibration receiver, the at least one fitting member comprises three or more fitting members, each of the three or more fitting members provided in the body and the head is fitted to each other, the three or more fitting members are provided in three or more positions in the body and the head, and the at least one fitting member is arranged so as to form at least one virtual triangle in which the drive shaft is arranged in a region when viewed from an axial direction of the drive shaft.

2. The electric toothbrush according to claim 1, wherein the power transmission mechanism includes an operation shaft that is attached to the power transmission unit to operate, and a bearing that supports the operation shaft.

3. The electric toothbrush according to claim 1, wherein the head comprises a transmission mechanism that shifts power of the rotary motor.

4. The electric toothbrush according to claim 1, wherein the head comprises a plurality of types of heads having different operation performances of the acting member.

5. The electric toothbrush according to claim 1, further comprising other heads having different functions of the acting member.

6. The electric toothbrush according to claim 1, wherein the power transmission unit comprises an elastic member capable of elastically holding the drive shaft.

7. The electric toothbrush according to claim 1, wherein a communication hole communicating with the acting member is formed in the head.

8. The electric toothbrush according to claim 1, further comprising a cap that covers the bristles.

9. The electric toothbrush according to claim 1, wherein a contour shape of the body when viewed from an axial direction of the drive shaft comprises a first line having an arc shape and a second line having a curvature different from a curvature of the first line.

10. The electric toothbrush according to claim 1, wherein center of gravity is located close to the body in a state where the body, the head, and the brush handle are attached, and entirety of the bristles is present in an region of the body when viewed from an axial direction of the drive shaft.

11. The electric toothbrush according to claim 1, further comprising a shaver head that includes the acting member having a function of cutting body hair, wherein the shaver head has a waterproof function.

\* \* \* \* \*